(12) United States Patent
Rosewarne

(10) Patent No.: US 12,284,361 B2
(45) Date of Patent: Apr. 22, 2025

(54) METHOD, APPARATUS AND SYSTEM FOR ENCODING AND DECODING A TREE OF BLOCKS OF VIDEO SAMPLES

(71) Applicant: CANON KABUSHIKI KAISHA, Tokyo (JP)

(72) Inventor: Christopher James Rosewarne, Concord West (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/680,483

(22) Filed: May 31, 2024

(65) Prior Publication Data

US 2024/0323393 A1 Sep. 26, 2024

Related U.S. Application Data

(63) Continuation of application No. 17/435,952, filed as application No. PCT/AU2020/050028 on Jan. 20, 2020, now Pat. No. 12,088,822.

(30) Foreign Application Priority Data

Mar. 11, 2019 (AU) ................................ 2019201653

(51) Int. Cl.
*H04N 19/146* (2014.01)
*H04N 19/132* (2014.01)
(Continued)

(52) U.S. Cl.
CPC ......... *H04N 19/146* (2014.11); *H04N 19/132* (2014.11); *H04N 19/176* (2014.11); *H04N 19/186* (2014.11)

(58) Field of Classification Search
CPC .. H04N 19/146; H04N 19/132; H04N 19/176; H04N 19/18; H04N 19/186; H04N 19/122; H04N 19/96; H04N 19/124
See application file for complete search history.

(56) References Cited

U.S. PATENT DOCUMENTS

2017/0188000 A1 6/2017 Rosewarne
2017/0272748 A1* 9/2017 Seregin ............... H04N 19/159
2017/0330349 A1 11/2017 Kolesnikov

OTHER PUBLICATIONS

Tianyang Zhou, et al., Non-CE3: Intra chroma partitioning and prediction restriction, Joint Video Exploration Team (JVET) of ITU-T SG 16 WP 3 and ISO/IEC JTC 1/SC 29/WG 11, 13th Meeting, Marrakesh, MA, Jan. 9-18, 2019, Doc. No. JVET-M0065.

(Continued)

*Primary Examiner* — Kathleen V Nguyen
(74) *Attorney, Agent, or Firm* — Canon U.S.A., Inc. IP Division

(57) ABSTRACT

A system and method of decoding a transform block for a colour channel of an image frame from a video bitstream. The method comprises determining a chroma format of the image frame, the chroma format having chroma channels of the image frame being subsampled relative to a luma channel of the image frame; determining a coefficient group size of the transform block, the coefficient group size being a largest area of the transform block of up to 16 samples, the coefficient group size being determined based only on the transform block size and independent of both (i) a colour plane of the transform block and (ii) colour plane subsampling due to the determined chroma format; and decoding the transform block using coefficient groups of the determined size from the video bitstream.

10 Claims, 19 Drawing Sheets

(51) Int. Cl.
*H04N 19/176* (2014.01)
*H04N 19/186* (2014.01)

(56) References Cited

OTHER PUBLICATIONS

Jianle Chen et al., Algorithm description for Versatile Video Coding and Test Model 3 (VTM 3), Joint Video Experts Team (JVET) of ITU-T SG 16 WP 3 and ISO/IEC JTC 1/SC 29/WG 11, 12th meeting, Oct. 2018, China, Macao, Doc. No. JVET-L1002-v1.

* cited by examiner

METHOD, APPARATUS AND SYSTEM FOR ENCODING AND DECODING A TREE OF BLOCKS OF VIDEO SAMPLES

REFERENCE TO RELATED PATENT APPLICATION(S)

This application is a continuation of U.S. patent application Ser. No. 17/435,952, filed on Sep. 2, 2021, which is the National Phase application of PCT Application No. PCT/AU2020/050028, filed on Jan. 20, 2020, and titled METHOD, APPARATUS AND SYSTEM FOR ENCODING AND DECODING A TREE OF BLOCKS OF VIDEO SAMPLES. This application claims the benefit under 35 U.S.C. § 119 of the filing date of Australian Patent Application No. 2019201653, filed Mar. 11, 2019. Each of the above-cited patent applications is hereby incorporated by reference in its entirety as if fully set forth herein.

TECHNICAL FIELD

The present invention relates generally to digital video signal processing and, in particular, to a method, apparatus and system for encoding and decoding a tree of blocks of video samples. The present invention also relates to a computer program product including a computer readable medium having recorded thereon a computer program for encoding and decoding a tree of blocks of video samples.

BACKGROUND

Many applications for video coding currently exist, including applications for transmission and storage of video data. Many video coding standards have also been developed and others are currently in development. Recent developments in video coding standardisation have led to the formation of a group called the "Joint Video Experts Team" (JVET). The Joint Video Experts Team (JVET) includes members of Study Group 16, Question 6 (SG16/Q6) of the Telecommunication Standardisation Sector (ITU-T) of the International Telecommunication Union (ITU), also known as the "Video Coding Experts Group" (VCEG), and members of the International Organisations for Standardisation/International Electrotechnical Commission Joint Technical Committee 1/Subcommittee 29/Working Group 11 (ISO/IEC JTC1/SC29/WG11), also known as the "Moving Picture Experts Group" (MPEG).

The Joint Video Experts Team (JVET) issued a Call for Proposals (CfP), with responses analysed at its $10^{th}$ meeting in San Diego, USA. The submitted responses demonstrated video compression capability significantly outperforming that of the current state-of-the-art video compression standard, i.e.: "high efficiency video coding" (HEVC). On the basis of this outperformance it was decided to commence a project to develop a new video compression standard, to be named 'versatile video coding' (VVC). VVC is anticipated to address ongoing demand for ever-higher compression performance, especially as video formats increase in capability (e.g., with higher resolution and higher frame rate) and address increasing market demand for service delivery over WANs, where bandwidth costs are relatively high. At the same time, VVC must be implementable in contemporary silicon processes and offer an acceptable trade-off between the achieved performance versus the implementation cost (for example, in terms of silicon area, CPU processor load, memory utilisation and bandwidth).

Video data includes a sequence of frames of image data, each of which include one or more colour channels. Generally one primary colour channel and two secondary colour channels are needed. The primary colour channel is generally referred to as the 'luma' channel and the secondary colour channel(s) are generally referred to as the 'chroma' channels. Although video data is typically displayed in an RGB (red-green-blue) colour space, this colour space has a high degree of correlation between the three respective components. The video data representation seen by an encoder or a decoder is often using a colour space such as YCbCr. YCbCr concentrates luminance, mapped to 'luma' according to a transfer function, in a Y (primary) channel and chroma in Cb and Cr (secondary) channels. Moreover, the Cb and Cr channels may be sampled spatially at a lower rate (subsampled) compared to the luma channel, for example half horizontally and half vertically—known as a '4:2:0 chroma format'. The 4:2:0 chroma format is commonly used in 'consumer' applications, such as internet video streaming, broadcast television, and storage on Blu-Ray™ disks. Subsampling the Cb and Cr channels at half-rate horizontally and not subsampling vertically is known as a '4:2:2 chroma format'. The 4:2:2 chroma format is typically used in professional applications, including capture of footage for cinematic production and the like. The higher sampling rate of the 4:2:2 chroma format makes the resulting video more resilient to editing operations such as colour grading. Prior to distribution to consumers, 4:2:2 chroma format material is often converted to the 4:2:0 chroma format and then encoded for distribution to consumers. In addition to chroma format, video is also characterised by resolution and frame rate. Example resolutions are ultra-high definition (UHD) with a resolution of 3840×2160 or '8K' with a resolution of 7680×4320 and example frame rates are 60 or 120 Hz. Luma sample rates may range from approximately 500 mega samples per second to several giga samples per second. For the 4:2:0 chroma format, the sample rate of each chroma channel is one quarter the luma sample rate and for the 4:2:2 chroma format, the sample rate of each chroma channel is one half the luma sample rate.

The VVC standard is a 'block based' codec, in which frames are firstly divided into a square array of regions known as 'coding tree units' (CTUs). CTUs generally occupy a relatively large area, such as 128×128 luma samples. However, CTUs at the right and bottom edge of each frame may be smaller in area. Associated with each CTU is a 'coding tree' for the luma channel and an additional coding tree for the chroma channels. A coding tree defines a decomposition of the area of the CTU into a set of blocks, also referred to as 'coding blocks' (CBs). It is also possible for a single coding tree to specify blocks both for the luma channel and the chroma channels, in which case the collections of collocated coding blocks are referred to as 'coding units' (CUs), i.e., each CU having a coding block for each colour channel. The CBs are processed for encoding or decoding in a particular order. As a consequence of the use of the 4:2:0 chroma format, a CTU with a luma coding tree for a 128×128 luma sample area has a corresponding chroma coding tree for a 64×64 chroma sample area, collocated with the 128×128 luma sample area. When a single coding tree is in use for the luma channel and the chroma channels, the collections of collocated blocks for a given area are generally referred to as 'units', for example the above-mentioned CUs, as well as 'prediction units' (PUs), and 'transform units' (TUs). When separate coding trees are used for a given area, the above-mentioned CBs, as well as 'prediction blocks' (PBs), and 'transform blocks' (TBs) are used.

Notwithstanding the above distinction between 'units' and 'blocks', the term 'block' may be used as a general term for areas or regions of a frame for which operations are applied to all colour channels.

For each CU a prediction unit (PU) of the contents (sample values) of the corresponding area of frame data is generated (a 'prediction unit'). Further, a representation of the difference (or 'residual' in the spatial domain) between the prediction and the contents of the area as seen at input to the encoder is formed. The difference in each colour channel may be transformed and coded as a sequence of residual coefficients, forming one or more TUs for a given CU. The applied transform may be a Discrete Cosine Transform (DCT) or other transform, applied to each block of residual values. This transform is applied separably, i.e. that is the two dimensional transform is performed in two passes. The block is firstly transformed by applying a one-dimensional transform to each row of samples in the block. Then, the partial result is transformed by applying a one-dimensional transform to each column of the partial result to produce a final block of transform coefficients that substantially decorrelates the residual samples. Transforms of various sizes are supported by the VVC standard, including transforms of rectangular-shaped blocks, with each side dimension being a power of two. Transform coefficients are quantised for entropy encoding into a bitstream.

When spatial prediction ('intra prediction') is used to generate PBs, a set of reference samples is used to generate predicted samples for the current PB. The reference samples include samples adjacent to the PB that have already been 'reconstructed' (the addition of residual samples to intra predicted samples). These adjacent samples form a row above the PB and a column to the left of the PB. The row and column also extend beyond the PB boundary to include additional nearby samples. Due to scanning blocks in a Z-order scan, some of the reference samples will have been reconstructed in the immediately preceding block. The use of samples from the immediately preceding block results in a feedback dependency that may limit the throughput of blocks through a video encoder or decoder. Additionally, where relatively small blocks are predicted from other frames ("inter prediction"), the memory bandwidth for fetching reference samples may become excessive, especially considering the additional samples needed to accommodate sub-pixel interpolation filtering.

SUMMARY

It is an object of the present invention to substantially overcome, or at least ameliorate, one or more disadvantages of existing arrangements.

One aspect of the present disclosure provides a method of decoding a transform block for a colour channel of an image frame from a video bitstream, the method comprising: determining a chroma format of the image frame, the chroma format having chroma channels of the image frame being subsampled relative to a luma channel of the image frame; determining a coefficient group size of the transform block, the coefficient group size being a largest area of the transform block of up to 16 samples, the coefficient group size being determined based only on the transform block size and independent of both (i) a colour plane of the transform block and (ii) colour plane subsampling due to the determined chroma format; and decoding the transform block using coefficient groups of the determined size from the video bitstream.

According to another aspect, a single table is used for transform blocks belonging to luma and chroma colour planes of image frames of the bitstream.

According to another aspect, the coefficient group size is selected to have an aspect ratio closest to 1:1 within the constraints of the transform block width and height.

Another aspect of the present disclosure provides a non-transitory computer-readable medium having a computer program stored thereon to implement a method of decoding a transform block for a colour channel of an image frame from a video bitstream, the program comprising: code for determining a chroma format of the image frame, the chroma format having chroma channels of the image frame being subsampled relative to a luma channel of the image frame; code for determining a coefficient group size of the transform block, the coefficient group size being a largest area of the transform block of up to 16 samples, the coefficient group size being determined based only on the transform block size and independent of both (i) a colour plane of the transform block and (ii) colour plane subsampling due to the determined chroma format; and code for decoding the transform block using coefficient groups of the determined size from the video bitstream.

Another aspect of the present disclosure provides a video decoder, configured to: receive a transform block for a colour channel of an image frame from a video bitstream; determine a chroma format of the image frame, the chroma format having chroma channels of the image frame being subsampled relative to a luma channel of the image frame; determine a coefficient group size of the transform block, the coefficient group size being a largest area of the transform block of up to 16 samples, the coefficient group size being determined based only on the transform block size and independent of both (i) a colour plane of the transform block and (ii) colour plane subsampling due to the determined chroma format; and decode the transform block using coefficient groups of the determined size from the video bitstream.

Another aspect of the present disclosure provides a system, comprising: a memory; and a processor, wherein the processor is configured to execute code stored on the memory for implementing a method of decoding a transform block for a colour channel of an image frame from a video bitstream, the method comprising: determining a chroma format of the image frame, the chroma format having chroma channels of the image frame being subsampled relative to a luma channel of the image frame; determining a coefficient group size of the transform block, the coefficient group size being a largest area of the transform block of up to 16 samples, the coefficient group size being determined based only on the transform block size and independent of both (i) a colour plane of the transform block and (ii) colour plane subsampling due to the determined chroma format; and decoding the transform block using coefficient groups of the determined size from the video bitstream.

Other aspects are also disclosed.

BRIEF DESCRIPTION OF THE DRAWINGS

At least one example embodiment of the present invention will now be described with reference to the following drawings and appendices, in which.

DETAILED DESCRIPTION INCLUDING BEST MODE

Figure 1:
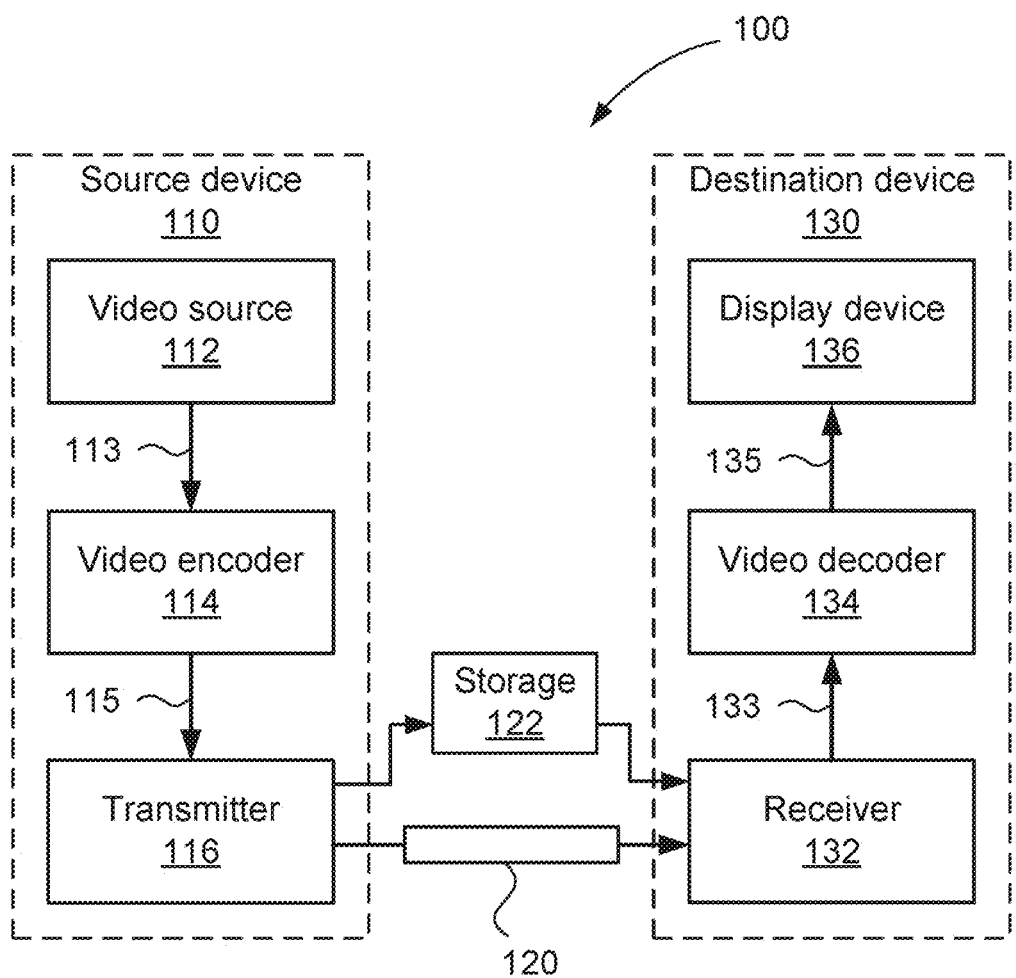
FIG. 1 is a schematic block diagram showing a video encoding and decoding system.

Where reference is made in any one or more of the accompanying drawings to steps and/or features, which have the same reference numerals, those steps and/or features have for the purposes of this description the same function (s) or operation(s), unless the contrary intention appears.

As described above, use of samples from the immediately preceding block results in a feedback dependency that may limit the throughput of blocks through a video encoder or decoder. Methods to alleviate the severity of the resultant feedback dependency loop are desirable to ensure a high rate of processing blocks can be sustained, as needed for typical real-time encoding and decoding applications. The feedback dependency loop is particularly problematic for the high sample rates of contemporary video formats, for example from 500-4000 samples per second, whereas ASIC (application-specific integrated circuits) clock frequencies are typically in the hundreds of MHz.

FIG. 1 is a schematic block diagram showing functional modules of a video encoding and decoding system 100. The system 100 may utilise different rules for allowed subdivisions of regions in the luma and chroma coding trees to reduce the worst case block processing rate encountered. For example, the system 100 may operate such that blocks are always sized as a multiple of 16 (sixteen) samples, regardless of the aspect ratio of the block. Moreover, where a coding tree includes a split indicating the presence of small luma coding blocks, the split may be prohibited in the chroma channel, resulting in a single chroma CB being collocated with multiple luma CBs. The chroma CB may use a single prediction mode, such as one intra prediction mode, independently of the prediction modes of each of the collocated luma CBs (including where one or more luma CBs uses inter prediction). Residual coefficient coding may also exploit the multiple of 16 block size, including in the case of blocks having a width or height of two samples.

The system 100 includes a source device 110 and a destination device 130. A communication channel 120 is used to communicate encoded video information from the source device 110 to the destination device 130. In some arrangements, the source device 110 and destination device 130 may either or both comprise respective mobile telephone handsets or "smartphones", in which case the communication channel 120 is a wireless channel. In other arrangements, the source device 110 and destination device 130 may comprise video conferencing equipment, in which case the communication channel 120 is typically a wired channel, such as an internet connection. Moreover, the source device 110 and the destination device 130 may comprise any of a wide range of devices, including devices supporting over-the-air television broadcasts, cable television applications, internet video applications (including streaming) and applications where encoded video data is captured on some computer-readable storage medium, such as hard disk drives in a file server.

As shown in FIG. 1, the source device 110 includes a video source 112, a video encoder 114 and a transmitter 116. The video source 112 typically comprises a source of captured video frame data (shown as 113), such as an image capture sensor, a previously captured video sequence stored on a non-transitory recording medium, or a video feed from a remote image capture sensor. The video source 112 may also be an output of a computer graphics card, for example displaying the video output of an operating system and various applications executing upon a computing device, for example a tablet computer. Examples of source devices 110 that may include an image capture sensor as the video source 112 include smart-phones, video camcorders, professional video cameras, and network video cameras.

Figure 3:
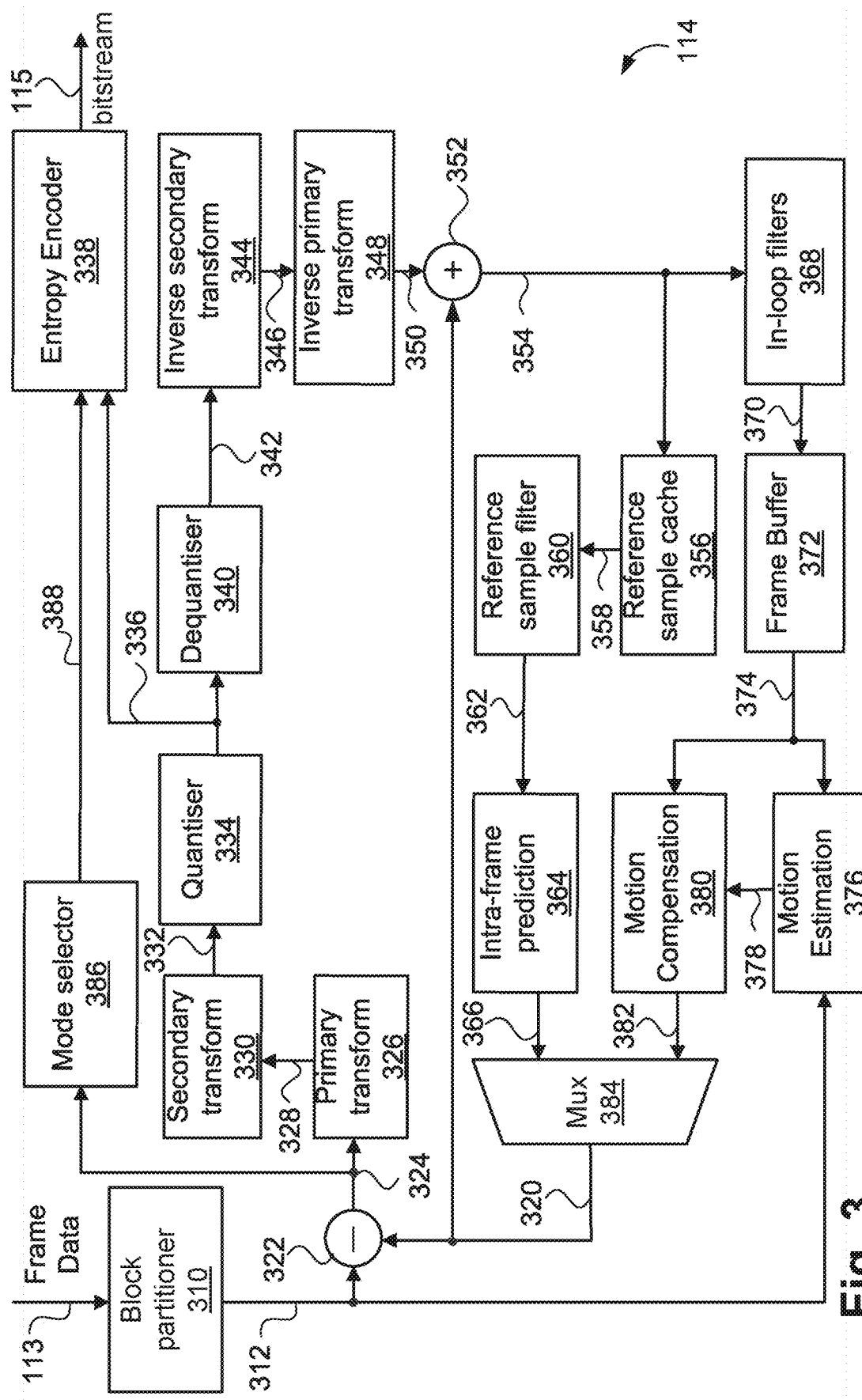
FIG. 3 is a schematic block diagram showing functional modules of a video encoder.

The video encoder 114 converts (or 'encodes') the captured frame data (indicated by an arrow 113) from the video source 112 into a bitstream (indicated by an arrow 115) as described further with reference to FIG. 3. The bitstream 115 is transmitted by the transmitter 116 over the communication channel 120 as encoded video data (or "encoded video information"). It is also possible for the bitstream 115 to be stored in a non-transitory storage device 122, such as a "Flash" memory or a hard disk drive, until later being transmitted over the communication channel 120, or in-lieu of transmission over the communication channel 120.

The destination device 130 includes a receiver 132, a video decoder 134 and a display device 136. The receiver 132 receives encoded video data from the communication channel 120 and passes received video data to the video decoder 134 as a bitstream (indicated by an arrow 133). The video decoder 134 then outputs decoded frame data (indicated by an arrow 135) to the display device 136. The decoded frame data 135 has the same chroma format as the frame data 113. Examples of the display device 136 include a cathode ray tube, a liquid crystal display, such as in smart-phones, tablet computers, computer monitors or in stand-alone television sets. It is also possible for the functionality of each of the source device 110 and the destination device 130 to be embodied in a single device, examples of which include mobile telephone handsets and tablet computers.

Figure 2A:
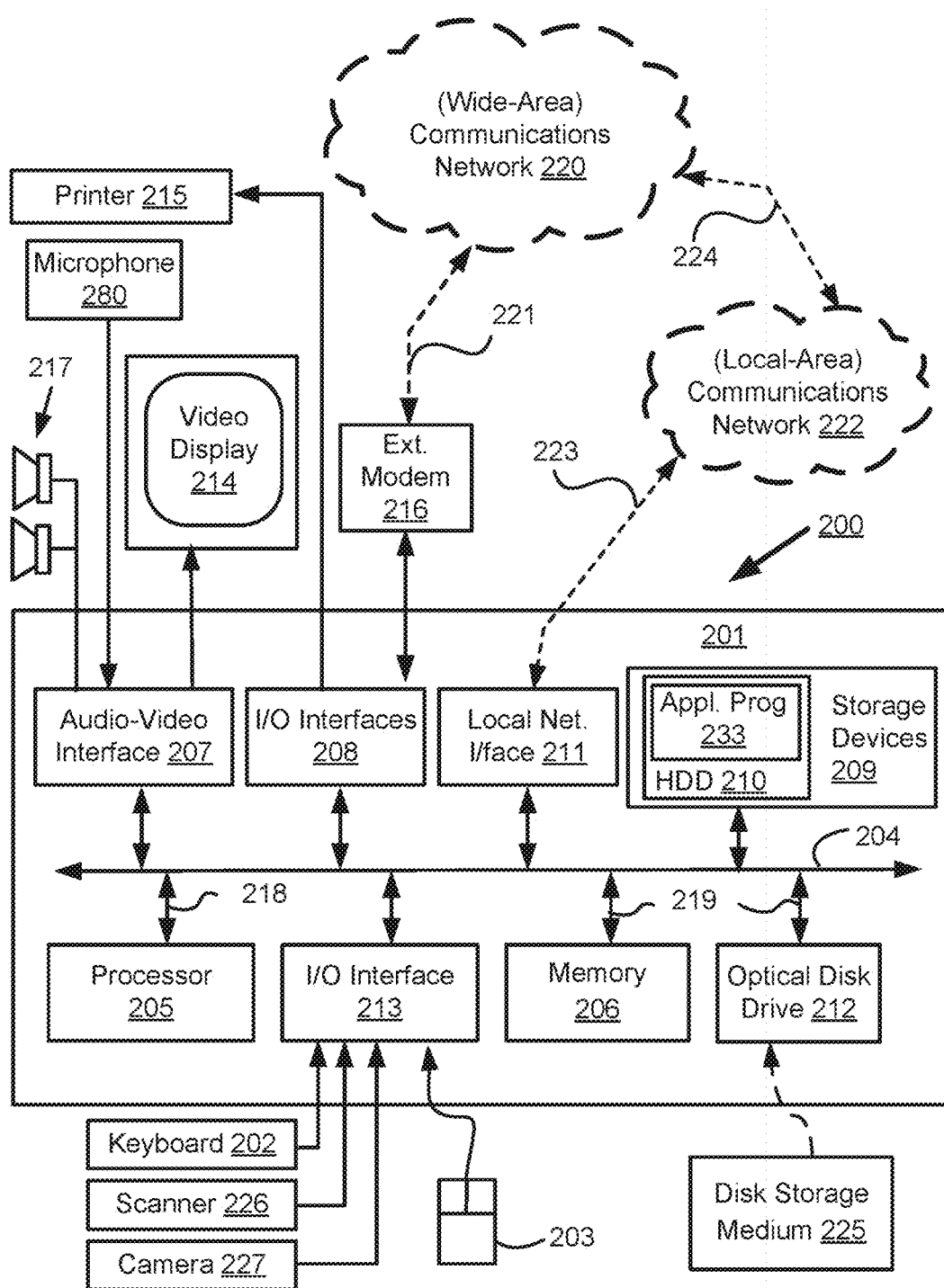
FIGS. 2A and 2B form a schematic block diagram of a general purpose computer system upon which one or both of the video encoding and decoding system of FIG. 1 may be practiced.

Notwithstanding the example devices mentioned above, each of the source device 110 and destination device 130 may be configured within a general purpose computing system, typically through a combination of hardware and software components. FIG. 2A illustrates such a computer system 200, which includes: a computer module 201; input devices such as a keyboard 202, a mouse pointer device 203, a scanner 226, a camera 227, which may be configured as the video source 112, and a microphone 280; and output devices including a printer 215, a display device 214, which may be configured as the display device 136, and loudspeakers 217. An external Modulator-Demodulator (Modem) transceiver device 216 may be used by the computer module 201 for communicating to and from a communications network 220 via a connection 221. The communications network 220, which may represent the communication channel 120, may be a wide-area network (WAN), such as the Internet, a cellular telecommunications network, or a private WAN. Where the connection 221 is a telephone line, the modem 216 may be a traditional "dial-up" modem. Alternatively, where the connection 221 is a high capacity (e.g., cable or optical) connection, the modem 216 may be a broadband modem. A wireless modem may also be used for wireless connection to the communications network 220. The transceiver device 216 may provide the functionality of the transmitter 116 and the receiver 132 and the communication channel 120 may be embodied in the connection 221.

The computer module 201 typically includes at least one processor unit 205, and a memory unit 206. For example, the memory unit 206 may have semiconductor random access memory (RAM) and semiconductor read only memory (ROM). The computer module 201 also includes an number of input/output (I/O) interfaces including: an audio-video interface 207 that couples to the video display 214, loudspeakers 217 and microphone 280; an I/O interface 213 that couples to the keyboard 202, mouse 203, scanner 226, camera 227 and optionally a joystick or other human interface device (not illustrated); and an interface 208 for the external modem 216 and printer 215. The signal from the audio-video interface 207 to the computer monitor 214 is generally the output of a computer graphics card. In some implementations, the modem 216 may be incorporated within the computer module 201, for example within the interface 208. The computer module 201 also has a local network interface 211, which permits coupling of the computer system 200 via a connection 223 to a local-area communications network 222, known as a Local Area Network (LAN). As illustrated in FIG. 2A, the local communications network 222 may also couple to the wide network 220 via a connection 224, which would typically include a so-called "firewall" device or device of similar functionality. The local network interface 211 may comprise an Ethernet™ circuit card, a Bluetooth™ wireless arrangement or an IEEE 802.11 wireless arrangement; however, numerous other types of interfaces may be practiced for the interface 211. The local network interface 211 may also provide the functionality of the transmitter 116 and the receiver 132 and communication channel 120 may also be embodied in the local communications network 222.

The I/O interfaces 208 and 213 may afford either or both of serial and parallel connectivity, the former typically being implemented according to the Universal Serial Bus (USB) standards and having corresponding USB connectors (not illustrated). Storage devices 209 are provided and typically include a hard disk drive (HDD) 210. Other storage devices such as a floppy disk drive and a magnetic tape drive (not illustrated) may also be used. An optical disk drive 212 is typically provided to act as a non-volatile source of data. Portable memory devices, such optical disks (e.g. CD-ROM, DVD, Blu ray Disc™), USB-RAM, portable, external hard drives, and floppy disks, for example, may be used as appropriate sources of data to the computer system 200. Typically, any of the HDD 210, optical drive 212, networks 220 and 222 may also be configured to operate as the video source 112, or as a destination for decoded video data to be stored for reproduction via the display 214. The source device 110 and the destination device 130 of the system 100 may be embodied in the computer system 200.

The components 205 to 213 of the computer module 201 typically communicate via an interconnected bus 204 and in a manner that results in a conventional mode of operation of the computer system 200 known to those in the relevant art. For example, the processor 205 is coupled to the system bus 204 using a connection 218. Likewise, the memory 206 and optical disk drive 212 are coupled to the system bus 204 by connections 219. Examples of computers on which the described arrangements can be practised include IBM-PC's and compatibles, Sun SPARCstations, Apple Mac™ or alike computer systems.

Where appropriate or desired, the video encoder 114 and the video decoder 134, as well as methods described below, may be implemented using the computer system 200. In particular, the video encoder 114, the video decoder 134 and methods to be described, may be implemented as one or more software application programs 233 executable within the computer system 200. In particular, the video encoder 114, the video decoder 134 and the steps of the described methods are effected by instructions 231 (see FIG. 2B) in the software 233 that are carried out within the computer system 200. The software instructions 231 may be formed as one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software is loaded into the computer system 200 from the computer readable medium, and then executed by the computer system 200. A computer readable medium having such software or computer program recorded on the computer readable medium is a computer program product. The use of the computer program product in the computer system 200 preferably effects an advantageous apparatus for implementing the video encoder 114, the video decoder 134 and the described methods.

The software 233 is typically stored in the HDD 210 or the memory 206. The software is loaded into the computer system 200 from a computer readable medium, and executed by the computer system 200. Thus, for example, the software 233 may be stored on an optically readable disk storage medium (e.g., CD-ROM) 225 that is read by the optical disk drive 212.

In some instances, the application programs 233 may be supplied to the user encoded on one or more CD-ROMs 225 and read via the corresponding drive 212, or alternatively may be read by the user from the networks 220 or 222. Still further, the software can also be loaded into the computer system 200 from other computer readable media. Computer readable storage media refers to any non-transitory tangible storage medium that provides recorded instructions and/or data to the computer system 200 for execution and/or processing. Examples of such storage media include floppy disks, magnetic tape, CD-ROM, DVD, Blu-ray Disc™, a hard disk drive, a ROM or integrated circuit, USB memory, a magneto-optical disk, or a computer readable card such as a PCMCIA card and the like, whether or not such devices are internal or external of the computer module 201. Examples of transitory or non-tangible computer readable transmission media that may also participate in the provision of the software, application programs, instructions and/or video data or encoded video data to the computer module 401 include radio or infra-red transmission channels, as well as a network connection to another computer or networked device, and the Internet or Intranets including e-mail transmissions and information recorded on Websites and the like.

The second part of the application program 233 and the corresponding code modules mentioned above may be executed to implement one or more graphical user interfaces (GUIs) to be rendered or otherwise represented upon the display 214. Through manipulation of typically the keyboard 202 and the mouse 203, a user of the computer system 200 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 217 and user voice commands input via the microphone 280.

Figure 2B:
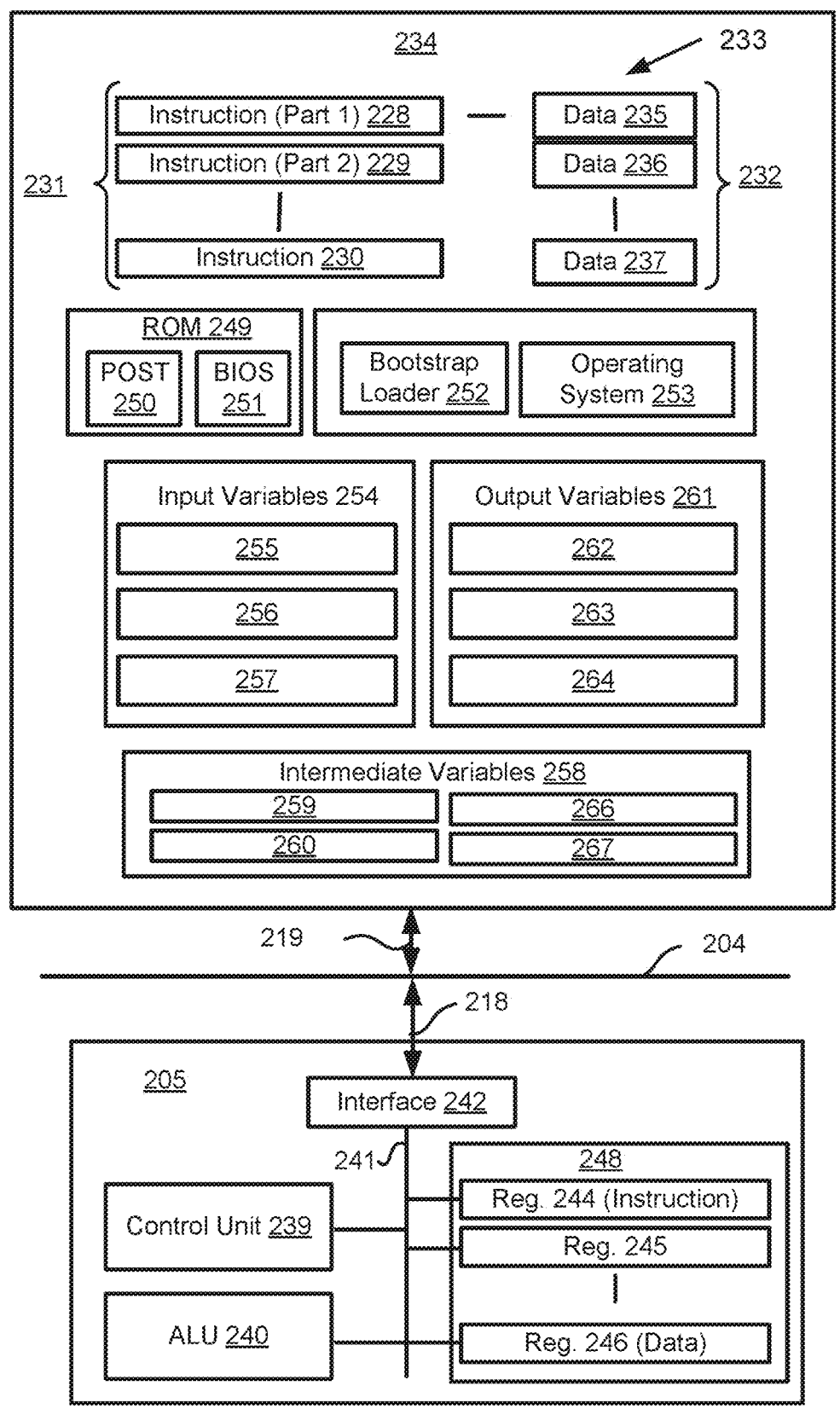

FIG. 2B is a detailed schematic block diagram of the processor 205 and a "memory" 234. The memory 234 represents a logical aggregation of all the memory modules (including the HDD 209 and semiconductor memory 206) that can be accessed by the computer module 201 in FIG. 2A.

When the computer module 201 is initially powered up, a power-on self-test (POST) program 250 executes. The POST program 250 is typically stored in a ROM 249 of the semiconductor memory 206 of FIG. 2A. A hardware device such as the ROM 249 storing software is sometimes referred to as firmware. The POST program 250 examines hardware within the computer module 201 to ensure proper functioning and typically checks the processor 205, the memory 234 (209, 206), and a basic input-output systems software (BIOS) module 251, also typically stored in the ROM 249, for correct operation. Once the POST program 250 has run successfully, the BIOS 251 activates the hard disk drive 210 of FIG. 2A. Activation of the hard disk drive 210 causes a bootstrap loader program 252 that is resident on the hard disk drive 210 to execute via the processor 205. This loads an operating system 253 into the RAM memory 206, upon which the operating system 253 commences operation. The operating system 253 is a system level application, executable by the processor 205, to fulfil various high level functions, including processor management, memory management, device management, storage management, software application interface, and generic user interface.

The operating system 253 manages the memory 234 (209, 206) to ensure that each process or application running on the computer module 201 has sufficient memory in which to execute without colliding with memory allocated to another process. Furthermore, the different types of memory available in the computer system 200 of FIG. 2A must be used properly so that each process can run effectively. Accordingly, the aggregated memory 234 is not intended to illustrate how particular segments of memory are allocated (unless otherwise stated), but rather to provide a general view of the memory accessible by the computer system 200 and how such is used.

As shown in FIG. 2B, the processor 205 includes a number of functional modules including a control unit 239, an arithmetic logic unit (ALU) 240, and a local or internal memory 248, sometimes called a cache memory. The cache memory 248 typically includes a number of storage registers 244-246 in a register section. One or more internal busses 241 functionally interconnect these functional modules. The processor 205 typically also has one or more interfaces 242 for communicating with external devices via the system bus 204, using a connection 218. The memory 234 is coupled to the bus 204 using a connection 219.

The application program 233 includes a sequence of instructions 231 that may include conditional branch and loop instructions. The program 233 may also include data 232 which is used in execution of the program 233. The instructions 231 and the data 232 are stored in memory locations 228, 229, 230 and 235, 236, 237, respectively. Depending upon the relative size of the instructions 231 and the memory locations 228-230, a particular instruction may be stored in a single memory location as depicted by the instruction shown in the memory location 230. Alternately, an instruction may be segmented into a number of parts each of which is stored in a separate memory location, as depicted by the instruction segments shown in the memory locations 228 and 229.

In general, the processor 205 is given a set of instructions which are executed therein. The processor 205 waits for a subsequent input, to which the processor 205 reacts to by executing another set of instructions. Each input may be provided from one or more of a number of sources, including data generated by one or more of the input devices 202, 203, data received from an external source across one of the networks 220, 202, data retrieved from one of the storage devices 206, 209 or data retrieved from a storage medium 225 inserted into the corresponding reader 212, all depicted in FIG. 2A. The execution of a set of the instructions may in some cases result in output of data. Execution may also involve storing data or variables to the memory 234.

The video encoder 114, the video decoder 134 and the described methods may use input variables 254, which are stored in the memory 234 in corresponding memory locations 255, 256, 257. The video encoder 114, the video decoder 134 and the described methods produce output variables 261, which are stored in the memory 234 in corresponding memory locations 262, 263, 264. Intermediate variables 258 may be stored in memory locations 259, 260, 266 and 267.

Referring to the processor 205 of FIG. 2B, the registers 244, 245, 246, the arithmetic logic unit (ALU) 240, and the control unit 239 work together to perform sequences of micro-operations needed to perform "fetch, decode, and execute" cycles for every instruction in the instruction set making up the program 233. Each fetch, decode, and execute cycle comprises:

a fetch operation, which fetches or reads an instruction 231 from a memory location 228, 229, 230;

a decode operation in which the control unit 239 determines which instruction has been fetched; and an execute operation in which the control unit 239 and/or the ALU 240 execute the instruction.

Thereafter, a further fetch, decode, and execute cycle for the next instruction may be executed. Similarly, a store cycle may be performed by which the control unit 239 stores or writes a value to a memory location 232.

Figure 10:
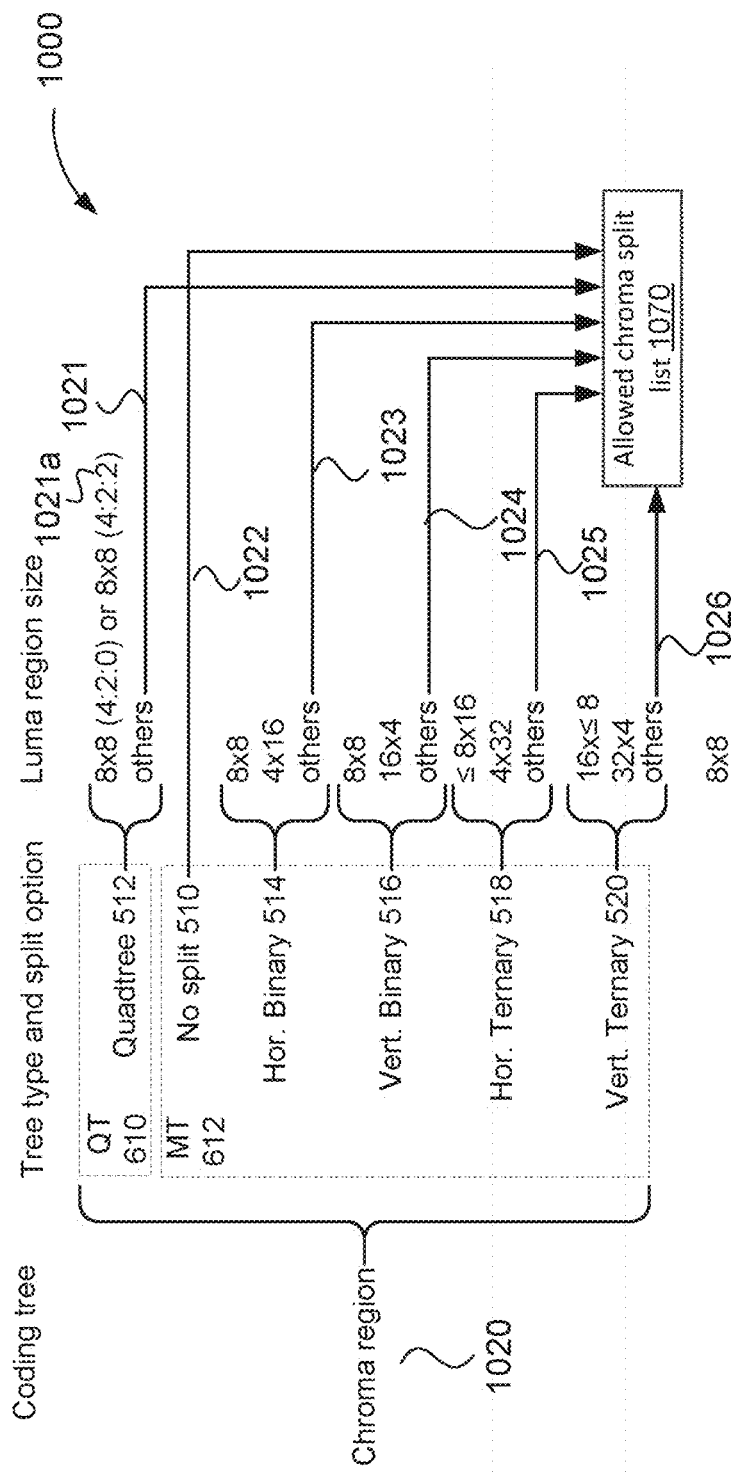
FIG. 10 shows a set of rules for generating lists of allowed splits in a luma coding tree and a chroma coding tree.
Figure 11:
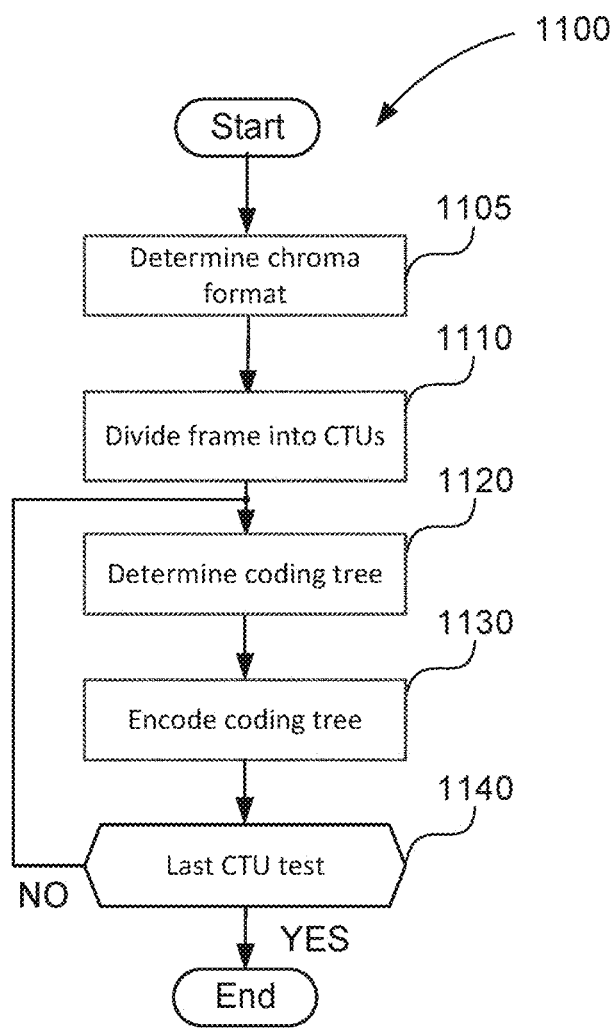
FIG. 11 shows a method for encoding coding trees of an image frame into a video bitstream.

Each step or sub-process in the method of FIGS. 10 and 11, to be described, is associated with one or more segments of the program 233 and is typically performed by the register section 244, 245, 247, the ALU 240, and the control unit 239 in the processor 205 working together to perform the fetch, decode, and execute cycles for every instruction in the instruction set for the noted segments of the program 233.

Figure 4:
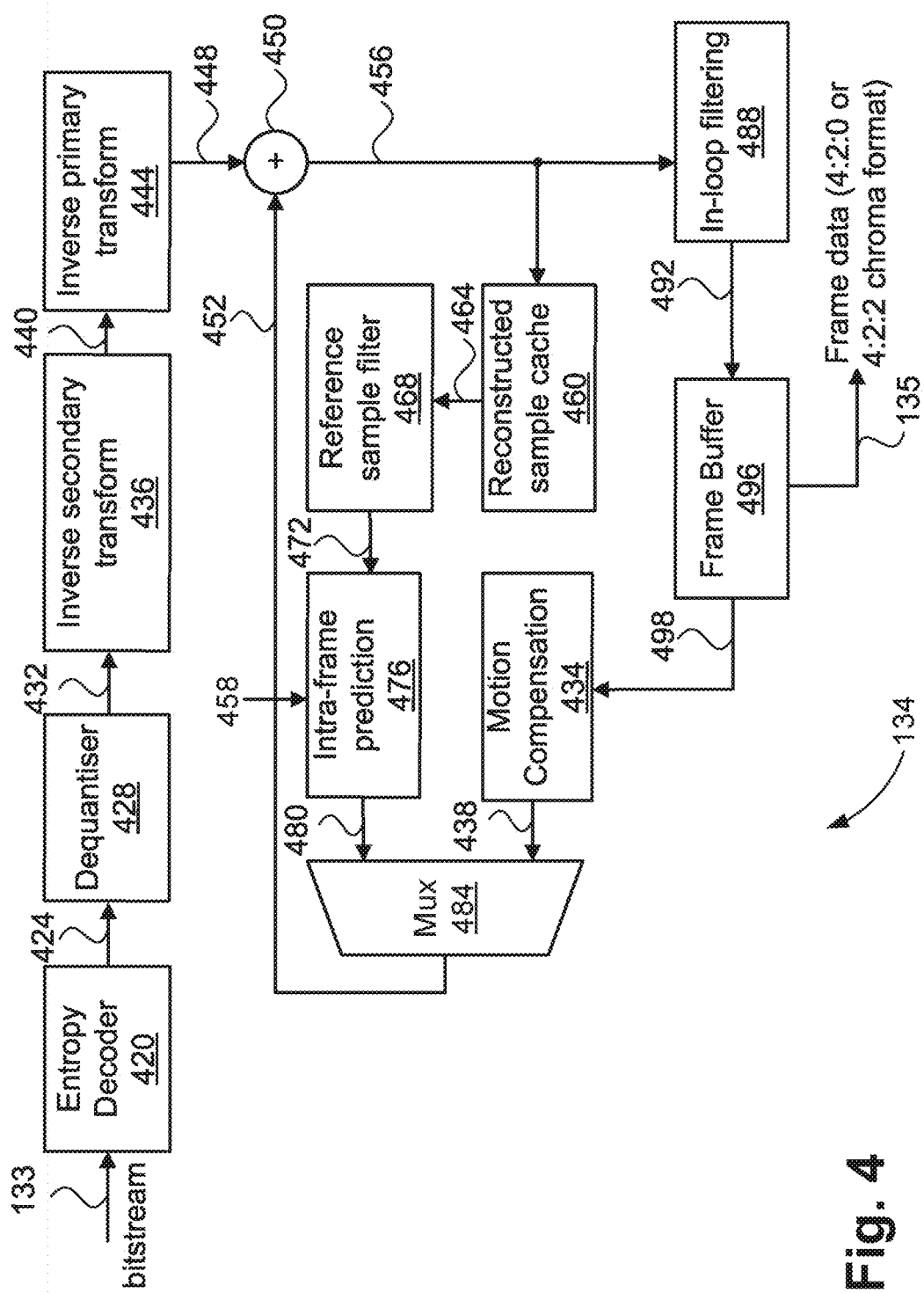
FIG. 4 is a schematic block diagram showing functional modules of a video decoder.

FIG. 3 is a schematic block diagram showing functional modules of the video encoder 114. FIG. 4 is a schematic block diagram showing functional modules of the video decoder 134. Generally, data passes between functional modules within the video encoder 114 and the video decoder 134 in groups of samples or coefficients, such as divisions of blocks into sub-blocks of a fixed size, or as arrays. The video encoder 114 and video decoder 134 may be implemented using a general-purpose computer system 200, as shown in FIGS. 2A and 2B, where the various functional modules may be implemented by dedicated hardware within the computer system 200, by software executable within the computer system 200 such as one or more software code modules of the software application program 233 resident on the hard disk drive 205 and being controlled in its execution by the processor 205. Alternatively the video encoder 114 and video decoder 134 may be implemented by a combination of dedicated hardware and software executable within the computer system 200. The video encoder 114, the video decoder 134 and the described methods may alternatively be implemented in dedicated hardware, such as one or more integrated circuits performing the functions or sub functions of the described methods. Such dedicated hardware may include graphic processing units (GPUs), digital signal processors (DSPs), application-specific standard products (ASSPs), application-specific integrated circuits (ASICs), field programmable gate arrays (FPGAs) or one or more microprocessors and associated memories. In particular, the video encoder 114 comprises modules 310-386 and the video decoder 134 comprises modules 420-496 which may each be implemented as one or more software code modules of the software application program 233.

Although the video encoder 114 of FIG. 3 is an example of a versatile video coding (VVC) video encoding pipeline, other video codecs may also be used to perform the processing stages described herein. The video encoder 114 receives captured frame data 113, such as a series of frames, each frame including one or more colour channels. The frame data 113 may be in a 4:2:0 chroma format or a 4:2:2 chroma format. A block partitioner 310 firstly divides the frame data 113 into CTUs, generally square in shape and configured such that a particular size for the CTUs is used. The size of the CTUs may be 64×64, 128×128, or 256×256 luma samples for example. The block partitioner 310 further divides each CTU into one or more CBs according to a luma coding tree and a chroma coding tree. The CBs have a variety of sizes, and may include both square and non-square aspect ratios. Operation of the block partitioner 310 is further described with reference to FIG. 10. However, in the VVC standard, CBs, CUs, PUs, and TUs always have side lengths that are powers of two. Thus, a current CB, represented as 312, is output from the block partitioner 310, progressing in accordance with an iteration over the one or more blocks of the CTU, in accordance with the luma coding tree and the chroma coding tree of the CTU. Options for partitioning CTUs into CBs are further described below with reference to FIGS. 5 and 6.

The CTUs resulting from the first division of the frame data 113 may be scanned in raster scan order and may be grouped into one or more 'slices'. A slice may be an 'intra' (or 'I') slice An intra slice (I slice) indicates that every CU in the slice is intra predicted. Alternatively, a slice may be uni- or bi-predicted ('P' or 'B' slice, respectively), indicating additional availability of uni- and bi-prediction in the slice, respectively.

For each CTU, the video encoder 114 operates in two stages. In the first stage (referred to as a 'search' stage), the block partitioner 310 tests various potential configurations of a coding tree. Each potential configuration of a coding tree has associated 'candidate' CBs. The first stage involves testing various candidate CBs to select CBs providing high compression efficiency with low distortion. The testing generally involves a Lagrangian optimisation whereby a candidate CB is evaluated based on a weighted combination of the rate (coding cost) and the distortion (error with respect to the input frame data 113). The 'best' candidate CBs (the CBs with the lowest evaluated rate/distortion) are selected for subsequent encoding into the bitstream 115. Included in evaluation of candidate CBs is an option to use a CB for a given area or to further split the area according to various splitting options and code each of the smaller resulting areas with further CBs, or split the areas even further. As a consequence, both the CBs and the coding tree themselves are selected in the search stage.

The video encoder 114 produces a prediction block (PB), indicated by an arrow 320, for each CB, for example the CB 312. The PB 320 is a prediction of the contents of the associated CB 312. A subtracter module 322 produces a difference, indicated as 324 (or 'residual', referring to the difference being in the spatial domain), between the PB 320 and the CB 312. The difference 324 is a block-size difference between corresponding samples in the PB 320 and the CB 312. The difference 324 is transformed, quantised and represented as a transform block (TB), indicated by an arrow 336. The PB 320 and associated TB 336 are typically chosen from one of many possible candidate CBs, for example based on evaluated cost or distortion.

A candidate coding block (CB) is a CB resulting from one of the prediction modes available to the video encoder 114 for the associated PB and the resulting residual. Each candidate CB results in one or more corresponding TBs, as described hereafter with reference to FIG. 8. The TB 336 is a quantised and transformed representation of the difference 324. When combined with the predicted PB in the video decoder 114, the TB 336 reduces the difference between decoded CBs and the original CB 312 at the expense of additional signalling in a bitstream.

Each candidate coding block (CB), that is prediction block (PB) in combination with a transform block (TB), thus has an associated coding cost (or 'rate') and an associated difference (or 'distortion'). The rate is typically measured in bits. The distortion of the CB is typically estimated as a difference in sample values, such as a sum of absolute differences (SAD) or a sum of squared differences (SSD). The estimate resulting from each candidate PB is determined by a mode selector 386 using the difference 324 to determine an intra prediction mode (represented by an arrow 388). Estimation of the coding costs associated with each candidate prediction mode and corresponding residual coding can be performed at significantly lower cost than entropy coding of the residual. Accordingly, a number of candidate modes can be evaluated to determine an optimum mode in a rate-distortion sense.

Determining an optimum mode in terms of rate-distortion is typically achieved using a variation of Lagrangian optimisation. Selection of the intra prediction mode 388 typically involves determining a coding cost for the residual data resulting from application of a particular intra prediction mode. The coding cost may be approximated by using a 'sum of absolute transformed differences' (SATD) whereby a relatively simple transform, such as a Hadamard transform, is used to obtain an estimated transformed residual cost. In some implementations using relatively simple transforms, the costs resulting from the simplified estimation method are monotonically related to the actual costs that would otherwise be determined from a full evaluation. In implementations with monotonically related estimated costs, the simplified estimation method may be used to make the same decision (i.e. intra prediction mode) with a reduction in complexity in the video encoder 114. To allow for possible non-monotonicity in the relationship between estimated and actual costs, the simplified estimation method may be used to generate a list of best candidates. The non-monotonicity may result from further mode decisions available for the coding of residual data, for example. The list of best candidates may be of an arbitrary number. A more complete search may be performed using the best candidates to establish optimal mode choices for coding the residual data for each of the candidates, allowing a final selection of the intra prediction mode along with other mode decisions.

The other mode decisions include an ability to skip a forward transform, known as 'transform skip'. Skipping the transforms is suited to residual data that lacks adequate correlation for reduced coding cost via expression as transform basis functions. Certain types of content, such as relatively simple computer generated graphics may exhibit similar behaviour. For a 'skipped transform', residual coefficients are still coded even though the transform itself is not performed.

Lagrangian or similar optimisation processing can be employed to both select an optimal partitioning of a CTU into CBs (by the block partitioner 310) as well as the selection of a best prediction mode from a plurality of possibilities. Through application of a Lagrangian optimisation process of the candidate modes in the mode selector module 386, the intra prediction mode with the lowest cost measurement is selected as the 'best' mode. The lowest cost mode is the selected intra prediction mode 388 and is also encoded in the bitstream 115 by an entropy encoder 338. The selection of the intra prediction mode 388 by operation of the mode selector module 386 extends to operation of the block partitioner 310. For example, candidates for selection of the intra prediction mode 388 may include modes applicable to a given block and additionally modes applicable to multiple smaller blocks that collectively are collocated with the given block. In cases including modes applicable to a given block and smaller collocated blocks, the process of selection of candidates implicitly is also a process of determining the best hierarchical decomposition of the CTU into CBs.

In the second stage of operation of the video encoder 114 (referred to as a 'coding' stage), an iteration over the selected luma coding tree and the selected chroma coding tree, and hence each selected CB, is performed in the video encoder 114. In the iteration, the CBs are encoded into the bitstream 115, as described further herein.

The entropy encoder 338 supports both variable-length coding of syntax elements and arithmetic coding of syntax elements. Arithmetic coding is supported using a context-adaptive binary arithmetic coding process. Arithmetically coded syntax elements consist of sequences of one or more 'bins'. Bins, like bits, have a value of '0' or '1'. However bins are not encoded in the bitstream 115 as discrete bits. Bins have an associated predicted (or 'likely' or 'most probable') value and an associated probability, known as a 'context'. When the actual bin to be coded matches the predicted value, a 'most probable symbol' (MPS) is coded. Coding a most probable symbol is relatively inexpensive in terms of consumed bits. When the actual bin to be coded mismatches the likely value, a 'least probable symbol' (LPS) is coded. Coding a least probable symbol has a relatively high cost in terms of consumed bits. The bin coding techniques enable efficient coding of bins where the probability of a '0' versus a '1' is skewed. For a syntax element with two possible values (that is, a 'flag'), a single bin is adequate. For syntax elements with many possible values, a sequence of bins is needed.

The presence of later bins in the sequence may be determined based on the value of earlier bins in the sequence. Additionally, each bin may be associated with more than one context. The selection of a particular context can be dependent on earlier bins in the syntax element, the bin values of neighbouring syntax elements (i.e. those from neighbouring blocks) and the like. Each time a context-coded bin is encoded, the context that was selected for that bin (if any) is updated in a manner reflective of the new bin value. As such, the binary arithmetic coding scheme is said to be adaptive.

Also supported by the video encoder 114 are bins that lack a context ('bypass bins'). Bypass bins are coded assuming an equiprobable distribution between a '0' and a '1'. Thus, each bin occupies one bit in the bitstream 115. The absence of a context saves memory and reduces complexity, and thus bypass bins are used where the distribution of values for the particular bin is not skewed. One example of an entropy coder employing context and adaption is known in the art as CABAC (context adaptive binary arithmetic coder) and many variants of this coder have been employed in video coding.

The entropy encoder 338 encodes the intra prediction mode 388 using a combination of context-coded and bypass-coded bins. Typically, a list of 'most probable modes' is generated in the video encoder 114. The list of most probable modes is typically of a fixed length, such as three or six modes, and may include modes encountered in earlier blocks. A context-coded bin encodes a flag indicating if the intra prediction mode is one of the most probable modes. If the intra prediction mode 388 is one of the most probable modes, further signalling, using bypass-coded bins, is encoded. The encoded further signalling is indicative of which most probable mode corresponds with the intra prediction mode 388, for example using a truncated unary bin string. Otherwise, the intra prediction mode 388 is encoded as a 'remaining mode'. Encoding as a remaining mode uses an alternative syntax, such as a fixed-length code, also coded using bypass-coded bins, to express intra prediction modes other than those present in the most probable mode list.

A multiplexer module 384 outputs the PB 320 according to the determined best intra prediction mode 388, selecting from the tested prediction mode of each candidate CB. The candidate prediction modes need not include every conceivable prediction mode supported by the video encoder 114.

Prediction modes fall broadly into two categories. A first category is 'intra-frame prediction' (also referred to as 'intra prediction'). In intra-frame prediction, a prediction for a block is generated, and the generation method may use other samples obtained from the current frame. For an intra-predicted PB, it is possible for different intra-prediction modes to be used for luma and chroma, and thus intra prediction is described primarily in terms of operation upon PBs.

The second category of prediction modes is 'inter-frame prediction' (also referred to as 'inter prediction'). In inter-frame prediction a prediction for a block is produced using samples from one or two frames preceding the current frame in an order of coding frames in the bitstream. Moreover, for inter-frame prediction, a single coding tree is typically used for both the luma channel and the chroma channels. The order of coding frames in the bitstream may differ from the order of the frames when captured or displayed. When one frame is used for prediction, the block is said to be 'uni-predicted' and has one associated motion vector. When two frames are used for prediction, the block is said to be 'bi-predicted' and has two associated motion vectors. For a P slice, each CU may be intra predicted or uni-predicted. For a B slice, each CU may be intra predicted, uni-predicted, or bi-predicted. Frames are typically coded using a 'group of picture' structure, enabling a temporal hierarchy of frames. A temporal hierarchy of frames allows a frame to reference a preceding and a subsequent picture in the order of displaying the frames. The images are coded in the order necessary to ensure the dependencies for decoding each frame are met.

A subcategory of inter prediction is referred to as 'skip mode'. Inter prediction and skip modes are described as two distinct modes. However, both inter prediction mode and skip mode involve motion vectors referencing blocks of samples from preceding frames. Inter prediction involves a coded motion vector delta, specifying a motion vector relative to a motion vector predictor. The motion vector predictor is obtained from a list of one or more candidate motion vectors, selected with a 'merge index'. The coded motion vector delta provides a spatial offset to a selected motion vector prediction. Inter prediction also uses a coded residual in the bitstream 133. Skip mode uses only an index (also named a 'merge index') to select one out of several motion vector candidates. The selected candidate is used without any further signalling. Also, skip mode does not support coding of any residual coefficients. The absence of coded residual coefficients when the skip mode is used means that there is no need to perform transforms for the skip mode. Therefore, skip mode does not typically result in pipeline processing issues. Pipeline processing issues may be the case for intra predicted CUs and inter predicted CUs. Due to the limited signalling of the skip mode, skip mode is useful for achieving very high compression performance when relatively high quality reference frames are available. Bi-predicted CUs in higher temporal layers of a random-access group-of-picture structure typically have high quality reference pictures and motion vector candidates that accurately reflect underlying motion.

The samples are selected according to a motion vector and reference picture index. The motion vector and reference picture index applies to all colour channels and thus inter prediction is described primarily in terms of operation upon PUs rather than PBs. Within each category (that is, intra- and inter-frame prediction), different techniques may be applied to generate the PU. For example, intra prediction may use values from adjacent rows and columns of previously reconstructed samples, in combination with a direction to generate a PU according to a prescribed filtering and generation process. Alternatively, the PU may be described using a small number of parameters. Inter prediction methods may vary in the number of motion parameters and their precision. Motion parameters typically comprise a reference frame index, indicating which reference frame(s) from lists of reference frames are to be used plus a spatial translation for each of the reference frames, but may include more frames, special frames, or complex affine parameters such as scaling and rotation. In addition, a predetermined motion refinement process may be applied to generate dense motion estimates based on referenced sample blocks.

Having determined and selected the PB 320, and subtracted the PB 320 from the original sample block at the subtractor 322, a residual with lowest coding cost, represented as 324, is obtained and subjected to lossy compression. The lossy compression process comprises the steps of transformation, quantisation and entropy coding. A forward primary transform module 326 applies a forward transform to the difference 324, converting the difference 324 from the spatial domain to the frequency domain, and producing primary transform coefficients represented by an arrow 328. The primary transform coefficients 328 are passed to a forward secondary transform module 330 to produce transform coefficients represented by an arrow 332 by performing a non-separable secondary transform (NSST) operation. The forward primary transform is typically separable, transforming a set of rows and then a set of columns of each block, typically using a DCT-2, although a DST-7 and DCT-8 may also be available, for example horizontally for block widths not exceeding 16 samples and vertically for block heights not exceeding 16 samples. The transformation of each set of rows and columns is performed by applying one-dimensional transforms firstly to each row of a block to produce a partial result and then to each column of the partial result to produce a final result. The forward secondary transform is generally a non-separable transform, which is only applied for the residual of intra-predicted CUs and may nonetheless also be bypassed. The forward secondary transform operates either on 16 samples (arranged as the upper-left 4×4 sub-block of the primary transform coefficients 328) or 64 samples (arranged as the upper-left 8×8 coefficients, arranged as four 4×4 sub-blocks of the primary transform coefficients 328). Moreover, the matrix coefficients of the forward secondary transform are selected from multiple sets according to the intra prediction mode of the CU such that two sets of coefficients are available for use. The use of one of the sets of matrix coefficients, or the bypassing of the forward secondary transform, is signalled with an "nsst_index" syntax element, coded using a truncated unary binarisation to express the values zero (secondary transform not applied), one (first set of matrix coefficients selected), or two (second set of matrix coefficients selected).

The transform coefficients 332 are passed to a quantiser module 334. At the module 334, quantisation in accordance with a 'quantisation parameter' is performed to produce residual coefficients, represented by the arrow 336. The quantisation parameter is constant for a given TB and thus results in a uniform scaling for the production of residual coefficients for a TB. A non-uniform scaling is also possible by application of a 'quantisation matrix', whereby the scaling factor applied for each residual coefficient is derived from a combination of the quantisation parameter and the corresponding entry in a scaling matrix, typically having a size equal to that of the TB. The residual coefficients 336 are supplied to the entropy encoder 338 for encoding in the bitstream 115. Typically, the residual coefficients of each TB with at least one significant residual coefficient of the TU are scanned to produce an ordered list of values, according to a scan pattern. The scan pattern generally scans the TB as a sequence of 4×4 'sub-blocks', providing a regular scanning operation at the granularity of 4×4 sets of residual coefficients, with the arrangement of sub-blocks dependent on the size of the TB. Additionally, the prediction mode 388 and the corresponding block partitioning are also encoded in the bitstream 115.

As described above, the video encoder 114 needs access to a frame representation corresponding to the frame representation seen in the video decoder 134. Thus, the residual coefficients 336 are also inverse quantised by a dequantiser module 340 to produce inverse transform coefficients, represented by an arrow 342. The inverse transform coefficients 342 are passed through an inverse secondary transform module 344 to produce intermediate inverse transform coefficients, represented by an arrow 346. The intermediate inverse transform coefficients 346 are passed to a inverse primary transform module 348 to produce residual samples, represented by an arrow 350, of the TU. The types of inverse transform performed by the inverse secondary transform module 344 correspond with the types of forward transform performed by the forward secondary transform module 330. The types of inverse transform performed by the inverse primary transform module 348 correspond with the types of primary transform performed by the primary transform module 326. A summation module 352 adds the residual samples 350 and the PU 320 to produce reconstructed samples (indicated by an arrow 354) of the CU.

The reconstructed samples 354 are passed to a reference sample cache 356 and an in-loop filters module 368. The reference sample cache 356, typically implemented using static RAM on an ASIC (thus avoiding costly off-chip memory access) provides minimal sample storage needed to satisfy the dependencies for generating intra-frame PBs for subsequent CUs in the frame. The minimal dependencies typically include a 'line buffer' of samples along the bottom of a row of CTUs, for use by the next row of CTUs and column buffering the extent of which is set by the height of the CTU. The reference sample cache 356 supplies reference samples (represented by an arrow 358) to a reference sample filter 360. The sample filter 360 applies a smoothing operation to produce filtered reference samples (indicated by an arrow 362). The filtered reference samples 362 are used by an intra-frame prediction module 364 to produce an intra-predicted block of samples, represented by an arrow 366. For each candidate intra prediction mode the intra-frame prediction module 364 produces a block of samples, that is 366.

The in-loop filters module 368 applies several filtering stages to the reconstructed samples 354. The filtering stages include a 'deblocking filter' (DBF) which applies smoothing aligned to the CU boundaries to reduce artefacts resulting from discontinuities. Another filtering stage present in the in-loop filters module 368 is an 'adaptive loop filter' (ALF), which applies a Wiener-based adaptive filter to further reduce distortion. A further available filtering stage in the in-loop filters module 368 is a 'sample adaptive offset' (SAO) filter. The SAO filter operates by firstly classifying reconstructed samples into one or multiple categories and, according to the allocated category, applying an offset at the sample level.

Filtered samples, represented by an arrow 370, are output from the in-loop filters module 368. The filtered samples 370 are stored in a frame buffer 372. The frame buffer 372 typically has the capacity to store several (for example up to 16) pictures and thus is stored in the memory 206. The frame buffer 372 is not typically stored using on-chip memory due to the large memory consumption required. As such, access to the frame buffer 372 is costly in terms of memory bandwidth. The frame buffer 372 provides reference frames (represented by an arrow 374) to a motion estimation module 376 and a motion compensation module 380.

The motion estimation module 376 estimates a number of 'motion vectors' (indicated as 378), each being a Cartesian spatial offset from the location of the present CB, referencing a block in one of the reference frames in the frame buffer 372. A filtered block of reference samples (represented as 382) is produced for each motion vector. The filtered reference samples 382 form further candidate modes available for potential selection by the mode selector 386. Moreover, for a given CU, the PU 320 may be formed using one reference block ('uni-predicted') or may be formed using two reference blocks ('bi-predicted'). For the selected motion vector, the motion compensation module 380 produces the PB 320 in accordance with a filtering process supportive of sub-pixel accuracy in the motion vectors. As such, the motion estimation module 376 (which operates on many candidate motion vectors) may perform a simplified filtering process compared to that of the motion compensation module 380 (which operates on the selected candidate only) to achieve reduced computational complexity.

Although the video encoder 114 of FIG. 3 is described with reference to versatile video coding (VVC), other video coding standards or implementations may also employ the processing stages of modules 310-386. The frame data 113 (and bitstream 115) may also be read from (or written to) memory 206, the hard disk drive 210, a CD-ROM, a Blu-ray disk™ or other computer readable storage medium. Additionally, the frame data 113 (and bitstream 115) may be received from (or transmitted to) an external source, such as a server connected to the communications network 220 or a radio-frequency receiver.

The video decoder 134 is shown in FIG. 4. Although the video decoder 134 of FIG. 4 is an example of a versatile video coding (VVC) video decoding pipeline, other video codecs may also be used to perform the processing stages described herein. As shown in FIG. 4, the bitstream 133 is input to the video decoder 134. The bitstream 133 may be read from memory 206, the hard disk drive 210, a CD-ROM, a Blu-ray disk™ or other non-transitory computer readable storage medium. Alternatively, the bitstream 133 may be received from an external source such as a server connected to the communications network 220 or a radio-frequency receiver. The bitstream 133 contains encoded syntax elements representing the captured frame data to be decoded.

The bitstream 133 is input to an entropy decoder module 420. The entropy decoder module 420 extracts syntax elements from the bitstream 133 by decoding sequences of 'bins' and passes the values of the syntax elements to other modules in the video decoder 134. The entropy decoder module 420 uses an arithmetic decoding engine to decode each syntax element as a sequence of one or more bins. Each bin may use one or more 'contexts', with a context describing probability levels to be used for coding a 'one' and a 'zero' value for the bin. Where multiple contexts are available for a given bin, a 'context modelling' or 'context selection' step is performed to choose one of the available contexts for decoding the bin. The process of decoding bins forms a sequential feedback loop. The number of operations in the feedback loop is preferably minimised to enable the entropy decoder 420 to achieve a high throughput in bins/second. Context modelling depends on other properties of the bitstream known to the video decoder 134 at the time of selecting the context, that is, properties preceding the current bin. For example, a context may be selected based on the quad-tree depth of the current CU in the coding tree. Dependencies are preferably based on properties that are known well in advance of decoding a bin, or are determined without requiring long sequential processes. A quadtree depth of a coding tree is an example of a dependency for context modelling that is easily known. An intra prediction mode is an example of a dependency for context modelling that is relatively difficult or computationally intensive to determine. Intra prediction modes are coded as either an index into a list of 'most probable modes' (MPMs) or an index into a list of 'remaining modes', with the selection between MPMs and remaining modes according to a decoded 'intra_luma_mpm_flag'. When an MPM is in use an 'intra_luma_mpm_idx' syntax element is decoded to select which one of the most probable modes is to be used. Generally there are six MPMs. When a remaining mode is in use an 'intra_luma_remainder' syntax element is decoded to select which one of the remaining (non-MPM) modes is to be used. Determining both the most probable modes and the remaining modes requires a substantial number of operations and includes dependencies on the intra prediction modes of neighbouring blocks. For example, the neighbouring blocks can be the block(s) above and to the left of the current block. Desirably, the contexts of the bins of each CU can determined, enabling parsing by the arithmetic coding engine, without knowing the intra prediction mode being signalled. The feedback loop present in the arithmetic coding engine for sequential bin decoding thus avoids a dependency on the intra prediction mode. The intra prediction mode determination can be deferred to a subsequent processing stage, with a separate feedback loop due to the dependency of MPM list construction on the intra prediction modes of neighbouring blocks. Accordingly, the arithmetic decoding engine of the entropy decoder module 420 is able to parse the intra_luma_mpm_flag, intra_luma_mpm_idx, intra_luma_remainder without needing to know the intra prediction modes of any earlier (e.g. neighbouring) block. The entropy decoder module 420 applies an arithmetic coding algorithm, for example 'context adaptive binary arithmetic coding' (CABAC), to decode syntax elements from the bitstream 133. The decoded syntax elements are used to reconstruct parameters within the video decoder 134. Parameters include residual coefficients (represented by an arrow 424) and mode selection information such as an intra prediction mode (represented by an arrow 458). The mode selection information also includes information such as motion vectors, and the partitioning of each CTU into one or more CBs. Parameters are used to generate PBs, typically in combination with sample data from previously decoded CBs.

The residual coefficients 424 are input to a dequantiser module 428. The dequantiser module 428 performs inverse quantisation (or 'scaling') on the residual coefficients 424 to create reconstructed intermediate transform coefficients, represented by an arrow 432, according to a quantisation parameter. The reconstructed intermediate transform coefficients 432 are passed to an inverse secondary transform module 436 where a secondary transform is applied or no operation (bypass), in accordance with a decoded "nsst_index" syntax element. The "nsst_index" is decoded from the bitstream 133 by the entropy decoder 420, under execution of the processor 205. As described with reference to FIG. 3, the "nsst_index" is decoded from the bitstream 133 as a truncated unary syntax element with a values zero to two. The inverse secondary transform module 436 produces reconstructed transform coefficients 440. Should use of a non-uniform inverse quantisation matrix be indicated in the bitstream 133, the video decoder 134 reads a quantisation matrix from the bitstream 133 as a sequence of scaling factors and arranges the scaling factors into a matrix. The inverse scaling uses the quantisation matrix in combination with the quantisation parameter to create the reconstructed intermediate transform coefficients 432.

The reconstructed transform coefficients 440 are passed to an inverse primary transform module 444. The module 444 transforms the coefficients from the frequency domain back to the spatial domain. The TB is effectively based on significant residual coefficients and non-significant residual coefficient values. The result of operation of the module 444 is a block of residual samples, represented by an arrow 448. The residual samples 448 are equal in size to the corresponding CU. The residual samples 448 are supplied to a summation module 450. At the summation module 450 the residual samples 448 are added to a decoded PB (represented as 452) to produce a block of reconstructed samples, represented by an arrow 456. The reconstructed samples 456 are supplied to a reconstructed sample cache 460 and an in-loop filtering module 488. The in-loop filtering module 488 produces reconstructed blocks of frame samples, represented as 492. The frame samples 492 are written to a frame buffer 496.

The reconstructed sample cache 460 operates similarly to the reconstructed sample cache 356 of the video encoder 114. The reconstructed sample cache 460 provides storage for reconstructed sample needed to intra predict subsequent CBs without the memory 206 (for example by using the data 232 instead, which is typically on-chip memory). Reference samples, represented by an arrow 464, are obtained from the reconstructed sample cache 460 and supplied to a reference sample filter 468 to produce filtered reference samples indicated by arrow 472. The filtered reference samples 472 are supplied to an intra-frame prediction module 476. The module 476 produces a block of intra-predicted samples, represented by an arrow 480, in accordance with the intra prediction mode parameter 458 signalled in the bitstream 133 and decoded by the entropy decoder 420.

When the prediction mode of a CB is indicated to be intra prediction in the bitstream 133, the intra-predicted samples 480 form the decoded PB 452 via a multiplexor module 484. Intra prediction produces a prediction block (PB) of samples, that is, a block in one colour component, derived using 'neighbouring samples' in the same colour component. The neighbouring samples are samples adjacent to the current block and by virtue of being preceding in the block decoding order have already been reconstructed. Where luma and chroma blocks are collocated the luma and chroma blocks may use different intra prediction modes. However, the two chroma channels each share the same intra prediction mode. Intra prediction falls into three types. "DC intra prediction" involves populating a PB with a single value representing the average of the neighbouring samples. "Planar intra prediction" involves populating a PB with samples according to a plane, with a DC offset and a vertical and horizontal gradient being derived from the neighbouring samples. "Angular intra prediction involves populating a PB with neighbouring samples filtered and propagated across the PB in a particular direction (or 'angle'). In VVC 65 angles are supported, with rectangular blocks able to utilise additional angles, not available to square blocks, to produce a total of 87 angles. A fourth type of intra prediction is available to chroma PBs, whereby the PB is generated from collocated luma reconstructed samples according to a 'cross-component linear model' (CCLM) mode. Three different CCLM modes are available, each of which uses a different model derived from the neighbouring luma and chroma samples. The derived model is then used to generate a block of samples for the chroma PB from the collocated luma samples.

When the prediction mode of a CB is indicated to be inter prediction in the bitstream 133, a motion compensation module 434 produces a block of inter-predicted samples, represented as 438, using a motion vector and reference frame index to select and filter a block of samples from a frame buffer 496. The block of samples 498 is obtained from a previously decoded frame stored in the frame buffer 496. For bi-prediction, two blocks of samples are produced and blended together to produce samples for the decoded PB 452. The frame buffer 496 is populated with filtered block data 492 from an in-loop filtering module 488. As with the in-loop filtering module 368 of the video encoder 114, the in-loop filtering module 488 applies any, at least, or all of the DBF, the ALF and SAO filtering operations. Generally, the motion vector is applied to both the luma and chroma channels, although the filtering processes for sub-sample interpolation luma and chroma channel are different. When a split in the coding tree results in a collection of relatively small luma blocks and the corresponding chroma region is not divided into corresponding small chroma blocks, the blocks are encoded and decoded as described with reference to FIGS. 13 and 14 respectively. In particular, if any of the small luma blocks are predicted using inter prediction, the inter prediction operation is only performed for the luma CB(s), and not for any portion of the corresponding chroma CB. The in-loop filtering module 368 produces the filtered block data 492 from the reconstructed samples 456.

Figure 5:
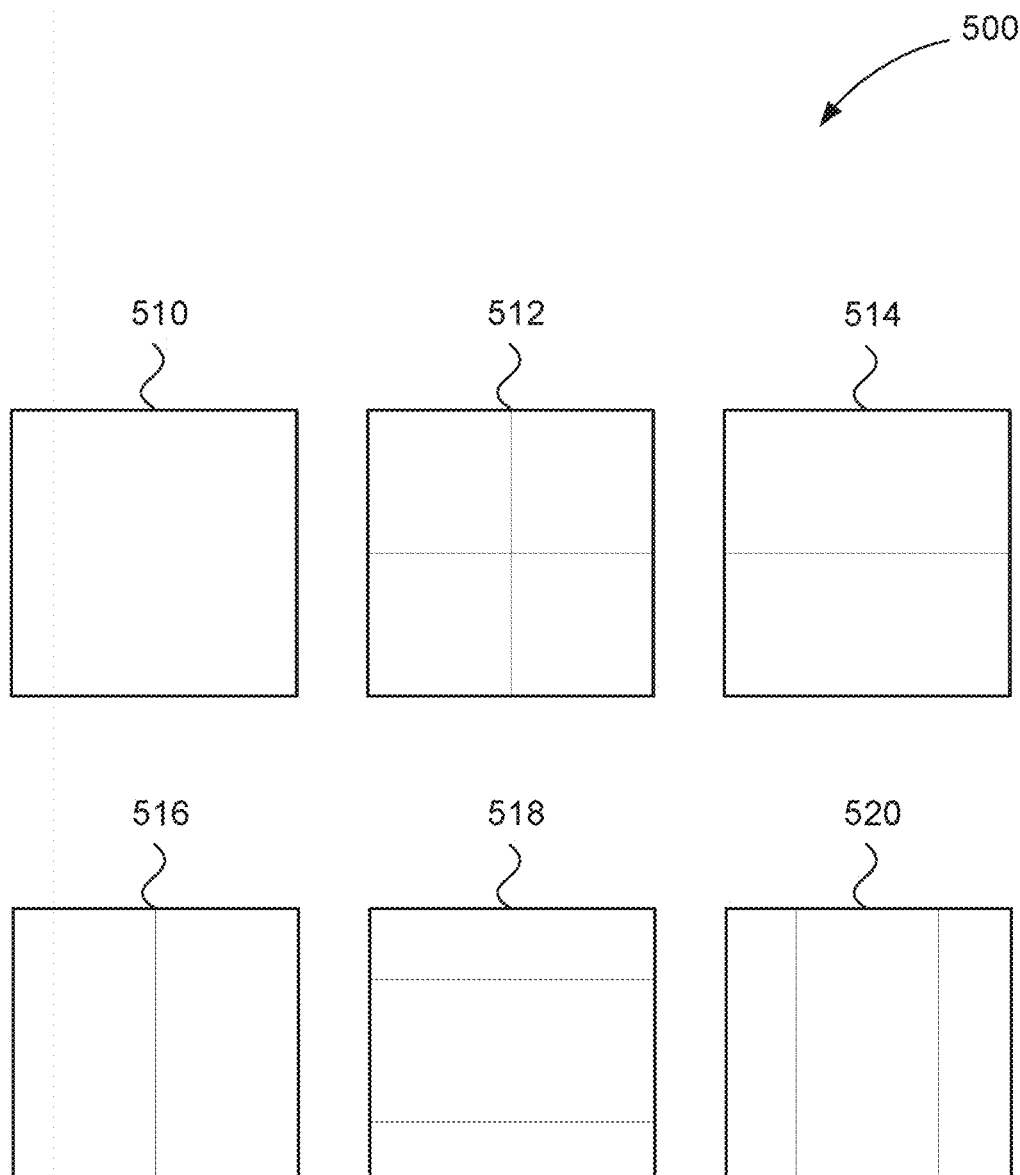
FIG. 5 is a schematic block diagram showing the available divisions of a block into one or more blocks in the tree structure of versatile video coding.

FIG. 5 is a schematic block diagram showing a collection 500 of available divisions or splits of a region into one or more sub-regions in the tree structure of versatile video coding. The divisions shown in the collection 500 are available to the block partitioner 310 of the encoder 114 to divide each CTU into one or more CUs or CBs according to a coding tree, as determined by the Lagrangian optimisation, as described with reference to FIG. 3.

Although the collection 500 shows only square regions being divided into other, possibly non-square sub-regions, it should be understood that the diagram 500 is showing the potential divisions but not requiring the containing region to be square. If the containing region is non-square, the dimensions of the blocks resulting from the division are scaled according to the aspect ratio of the containing block. Once a region is not further split, that is, at a leaf node of the coding tree, a CU occupies that region. The particular subdivision of a CTU into one or more CUs by the block partitioner 310 is referred to as the 'coding tree' of the CTU.

The process of subdividing regions into sub-regions must terminate when the resulting sub-regions reach a minimum CU size. In addition to constraining CUs to prohibit block areas smaller than a predetermined minimum size, for example 16 samples, CUs are constrained to have a minimum width or height of four. Other minimums, both in terms of width and height or in terms of width or height are also possible. The process of subdivision may also terminate prior to the deepest level of decomposition, resulting in a CU larger than the minimum CU size. It is possible for no splitting to occur, resulting in a single CU occupying the entirety of the CTU. A single CU occupying the entirety of the CTU is the largest available coding unit size. Moreover, CUs where no splitting occurs are larger than the processing region size. As a result of binary or ternary splitting at the highest level of a coding tree, CU sizes such as 64×128, 128×64, 32×128, and 128×32 are possible, each of which are also larger than the processing region size. Examples of CUS larger than the processing region size described further with reference to FIGS. 10A-10F. Due to use of subsampled chroma formats, such as 4:2:0, arrangements of the video encoder 114 and the video decoder 134 may terminate splitting of regions in the chroma channels earlier than in the luma channels.

At the leaf nodes of the coding tree exist CUs, with no further subdivision. For example, a leaf node 510 contains one CU. At the non-leaf nodes of the coding tree exist either a split into two or more further nodes, each of which could either contain a leaf node that thus one CU or contain further splits into smaller regions. At each leaf node of the coding tree, one coding block exists for each colour channel. Splitting terminating at the same depth for both luma and chroma results in three collocated CBs. Splitting terminating at a deeper depth for luma than for chroma results in a plurality of luma CBs being collocated with the CBs of the chroma channels.

A quad-tree split 512 divides the containing region into four equal-size regions as shown in FIG. 5. Compared to HEVC, versatile video coding (VVC) achieves additional flexibility with the addition of a horizontal binary split 514 and a vertical binary split 516. Each of the splits 514 and 516 divides the containing region into two equal-size regions. The division is either along a horizontal boundary (514) or a vertical boundary (516) within the containing block.

Further flexibility is achieved in versatile video coding with the addition of a ternary horizontal split 518 and a ternary vertical split 520. The ternary splits 518 and 520 divide the block into three regions, bounded either horizontally (518) or vertically (520) along ¼ and ¾ of the containing region width or height. The combination of the quad tree, binary tree, and ternary tree is referred to as 'QTBTTT'. The root of the tree includes zero or more quadtree splits (the 'QT' section of the tree). Once the QT section terminates, zero or more binary or ternary splits may occur (the 'multi-tree' or 'MT' section of the tree), finally ending in CBs or CUs at leaf nodes of the tree. Where the tree describes all colour channels, the tree leaf nodes are CUs. Where the tree describes the luma channel or the chroma channels, the tree leaf nodes are CBs.

Compared to HEVC, which supports only the quad tree and thus only supports square blocks, the QTBTTT results in many more possible CU sizes, particularly considering possible recursive application of binary tree and/or ternary tree splits. The potential for unusual (non-square) block sizes can be reduced by constraining split options to eliminate splits that would result in a block width or height either being less than four samples or in not being a multiple of four samples. Generally, the constraint would apply in considering luma samples. However, in the arrangements described, the constraint can be applied separately to the blocks for the chroma channels. Application of the constraint to split options to chroma channels can result in differing minimum block sizes for luma versus chroma, for example when the frame data is in the 4:2:0 chroma format or the 4:2:2 chroma format. Each split produces sub-regions with a side dimension either unchanged, halved or quartered, with respect to the containing region. Then, since the CTU size is a power of two, the side dimensions of all CUs are also powers of two.

Figure 6:
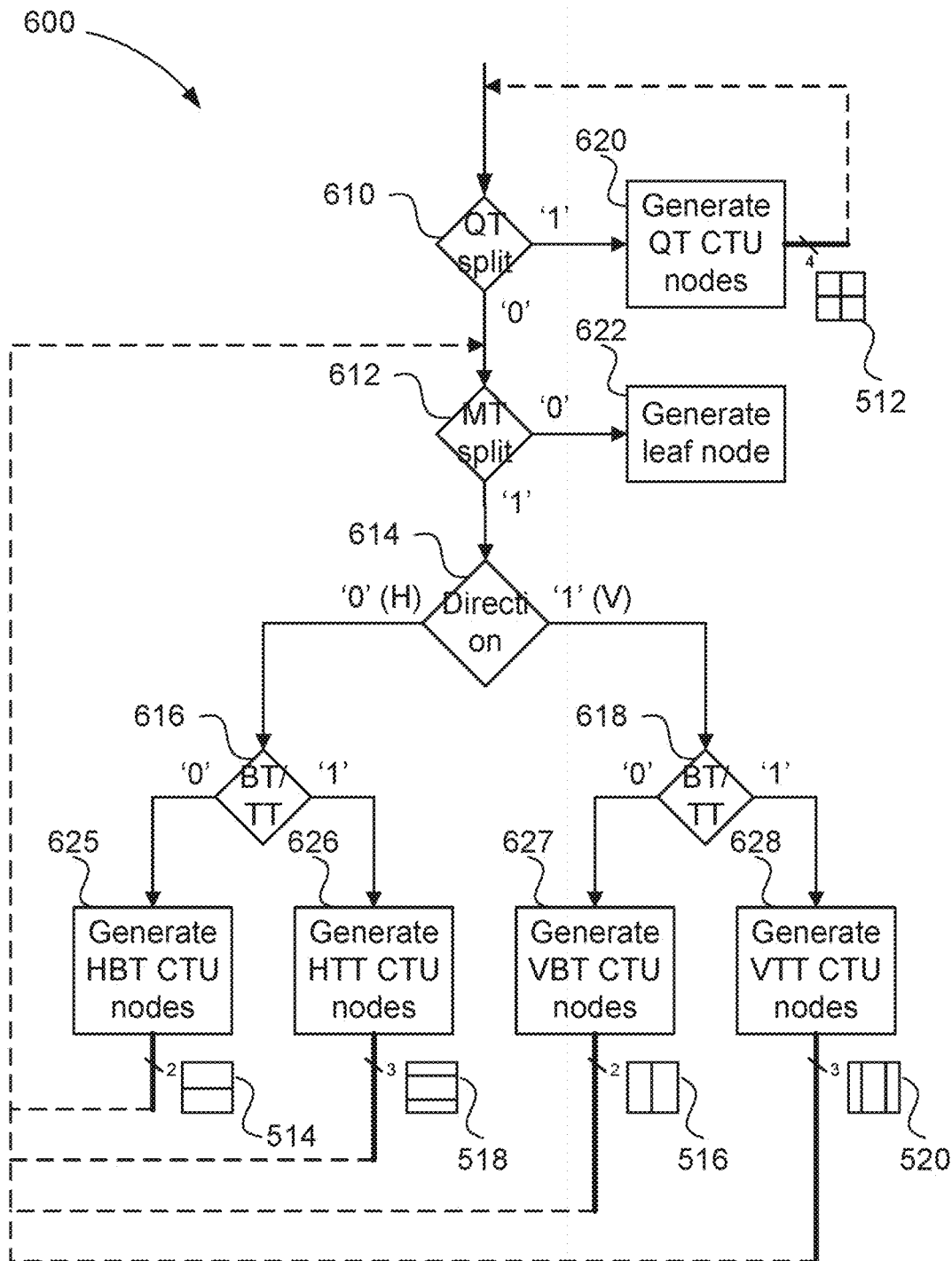
FIG. 6 is a schematic illustration of a dataflow to achieve permitted divisions of a block into one or more blocks in a tree structure of versatile video coding.

FIG. 6 is a schematic flow diagram illustrating a data flow 600 of a QTBTTT (or 'coding tree') structure used in versatile video coding. The QTBTTT structure is used for each CTU to define a division of the CTU into one or more CUs. The QTBTTT structure of each CTU is determined by the block partitioner 310 in the video encoder 114 and encoded into the bitstream 115 or decoded from the bitstream 133 by the entropy decoder 420 in the video decoder 134. The data flow 600 further characterises the permissible combinations available to the block partitioner 310 for dividing a CTU into one or more CUs, according to the divisions shown in FIG. 5.

Starting from the top level of the hierarchy, that is at the CTU, zero or more quad-tree divisions are first performed. Specifically, a Quad-tree (QT) split decision 610 is made by the block partitioner 310. The decision at 610 returning a '1' symbol indicates a decision to split the current node into four sub-nodes according to the quad-tree split 512. The result is the generation of four new nodes, such as at 620, and for each new node, recursing back to the QT split decision 610. Each new node is considered in raster (or Z-scan) order. Alternatively, if the QT split decision 610 indicates that no further split is to be performed (returns a '0' symbol), quad-tree partitioning ceases and multi-tree (MT) splits are subsequently considered.

Firstly, an MT split decision 612 is made by the block partitioner 310. At 612, a decision to perform an MT split is indicated. Returning a '0' symbol at decision 612 indicates that no further splitting of the node into sub-nodes is to be performed. If no further splitting of a node is to be performed, then the node is a leaf node of the coding tree and corresponds to a CU. The leaf node is output at 622. Alternatively, if the MT split 612 indicates a decision to perform an MT split (returns a '1' symbol), the block partitioner 310 proceeds to a direction decision 614.

The direction decision 614 indicates the direction of the MT split as either horizontal ('H' or '0') or vertical ('V' or '1'). The block partitioner 310 proceeds to a decision 616 if the decision 614 returns a '0' indicating a horizontal direction. The block partitioner 310 proceeds to a decision 618 if the decision 614 returns a '1' indicating a vertical direction.

At each of the decisions 616 and 618, the number of partitions for the MT split is indicated as either two (binary split or 'BT' node) or three (ternary split or 'TT') at the BT/TT split. That is, a BT/TT split decision 616 is made by the block partitioner 310 when the indicated direction from 614 is horizontal and a BT/TT split decision 618 is made by the block partitioner 310 when the indicated direction from 614 is vertical.

The BT/TT split decision 616 indicates whether the horizontal split is the binary split 514, indicated by returning a '0', or the ternary split 518, indicated by returning a '1'. When the BT/TT split decision 616 indicates a binary split, at a generate HBT CTU nodes step 625 two nodes are generated by the block partitioner 310, according to the binary horizontal split 514. When the BT/TT split 616 indicates a ternary split, at a generate HTT CTU nodes step 626 three nodes are generated by the block partitioner 310, according to the ternary horizontal split 518.

The BT/TT split decision 618 indicates whether the vertical split is the binary split 516, indicated by returning a '0', or the ternary split 520, indicated by returning a '1'. When the BT/TT split 618 indicates a binary split, at a generate VBT CTU nodes step 627 two nodes are generated by the block partitioner 310, according to the vertical binary split 516. When the BT/TT split 618 indicates a ternary split, at a generate VTT CTU nodes step 628 three nodes are generated by the block partitioner 310, according to the vertical ternary split 520. For each node resulting from steps 625-628 recursion of the data flow 600 back to the MT split decision 612 is applied, in a left-to-right or top-to-bottom order, depending on the direction 614. As a consequence, the binary tree and ternary tree splits may be applied to generate CUs having a variety of sizes.

The sets of allowed and disallowed splits at each node of a coding tree are further described with reference to FIG. 9.

Figure 7A:
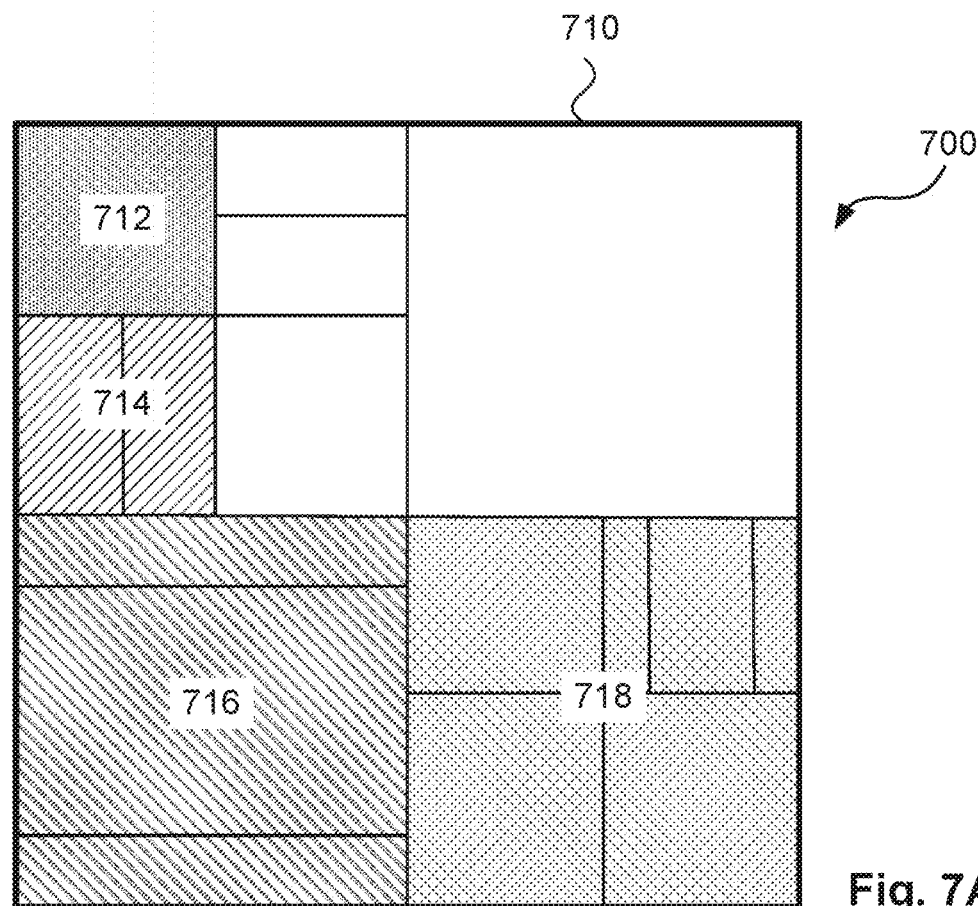
FIGS. 7A and 7B show an example division of a coding tree unit (CTU) into a number of coding units (CUs)
Figure 7B:
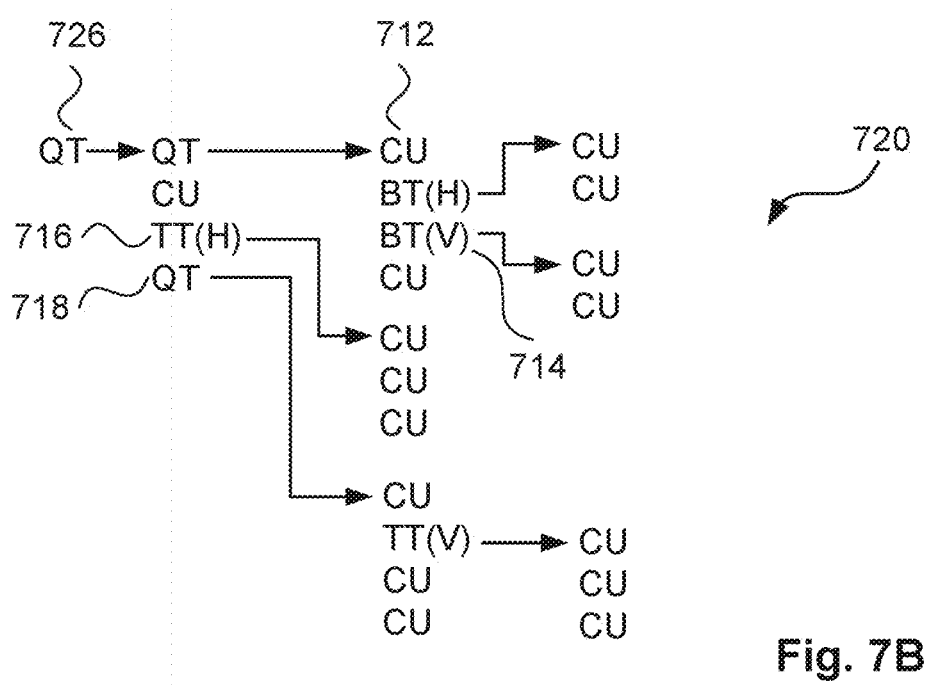

FIGS. 7A and 7B provide an example division 700 of a CTU 710 into a number of CUs or CBs. An example CU 712 is shown in FIG. 7A. FIG. 7A shows a spatial arrangement of CUs in the CTU 710. The example division 700 is also shown as a coding tree 720 in FIG. 7B.

At each non-leaf node in the CTU 710 of FIG. 7A, for example nodes 714, 716 and 718, the contained nodes (which may be further divided or may be CUs) are scanned or traversed in a 'Z-order' to create lists of nodes, represented as columns in the coding tree 720. For a quad-tree split, the Z-order scanning results in top left to right followed by bottom left to right order. For horizontal and vertical splits, the Z-order scanning (traversal) simplifies to a top-to-bottom scan and a left-to-right scan, respectively. The coding tree 720 of FIG. 7B lists all nodes and CUs according to the applied scan order. Each split generates a list of two, three or four new nodes at the next level of the tree until a leaf node (CU) is reached.

Having decomposed the image into CTUs and further into CUs by the block partitioner 310, and using the CUs to generate each residual block (324) as described with reference to FIG. 3, residual blocks are subject to forward transformation and quantisation by the video encoder 114. The resulting TBs 336 are subsequently scanned to form a sequential list of residual coefficients, as part of the operation of the entropy coding module 338. An equivalent process is performed in the video decoder 134 to obtain TBs from the bitstream 133.

The example of FIGS. 7A and 7B describes a coding tree applicable to both the luma channel and the chroma channel. However, the example of FIGS. 7A and 7B also illustrates behaviour in terms of traversal of a coding tree applicable to just the luma channel or a coding tree applicable to just the chroma channels. For coding trees with many nested splits, the available split options at deeper levels are constrained by restrictions on available block sizes for the corresponding small regions. Restrictions on available block sizes for small regions are imposed to prevent a worst case of block processing rate being so high as to impose unreasonable burden on implementations. In particular, a constraint that block sizes are to be a multiple of 16 (sixteen) samples in chroma enables implementations to process samples at a granularity of 16 (sixteen) samples. Constraining block sizes to multiples of sixteen samples is particularly relevant to the 'intra reconstruction' feedback loop, that is the path in the video decoder 134 of FIG. 4 involving the modules 450, 460, 468, 476, and 484, and an equivalent path in the video encoder 114. In particular, constraining the block size to a multiple of 16 (sixteen) samples assists in maintaining throughput in intra prediction mode. For example, 'simultaneous data multiple instruction' (SIMD) microprocessor architectures commonly operate on wide words that may contain 16 samples. Also, hardware architectures may use wide busses, such as busses with a width of 16 samples to transfer samples along the intra reconstruction feedback loop. Were a smaller block size used, for example four samples, the bus would be underutilised, for example only one quarter of the bus width containing sample data. Although an underutilised bus could handle smaller blocks (that is, less than sixteen samples), in worst-case scenarios, such as many or all blocks being of relatively small size, the underutilisation could result in preventing real-time operation of an encoder (114) or decoder (134). For inter prediction, each block depends on reference samples obtained from a frame buffer (such as the buffer 372 or 496). As the frame buffer is populated with reference samples when processing a preceding frame, there is no feedback dependency loop affecting block-by-block operation for producing inter predicted blocks. In addition to the feedback dependency loop that relates to intra frame reconstruction, an additional and concurrent feedback loop exists that relates to determination of the intra prediction mode 458. The intra prediction mode 458 is determined by selecting a mode from a most probable mode list, or selecting a mode from a remaining mode list. Determination of the most probable mode list and the remaining mode list requires the intra prediction modes of neighbouring blocks. When relatively small block sizes are used, the most probable mode list and the remaining mode list need to be determined more frequently, that is, at a frequency governed by the block size in samples and the sampling rate of the channel.

Figure 8A:
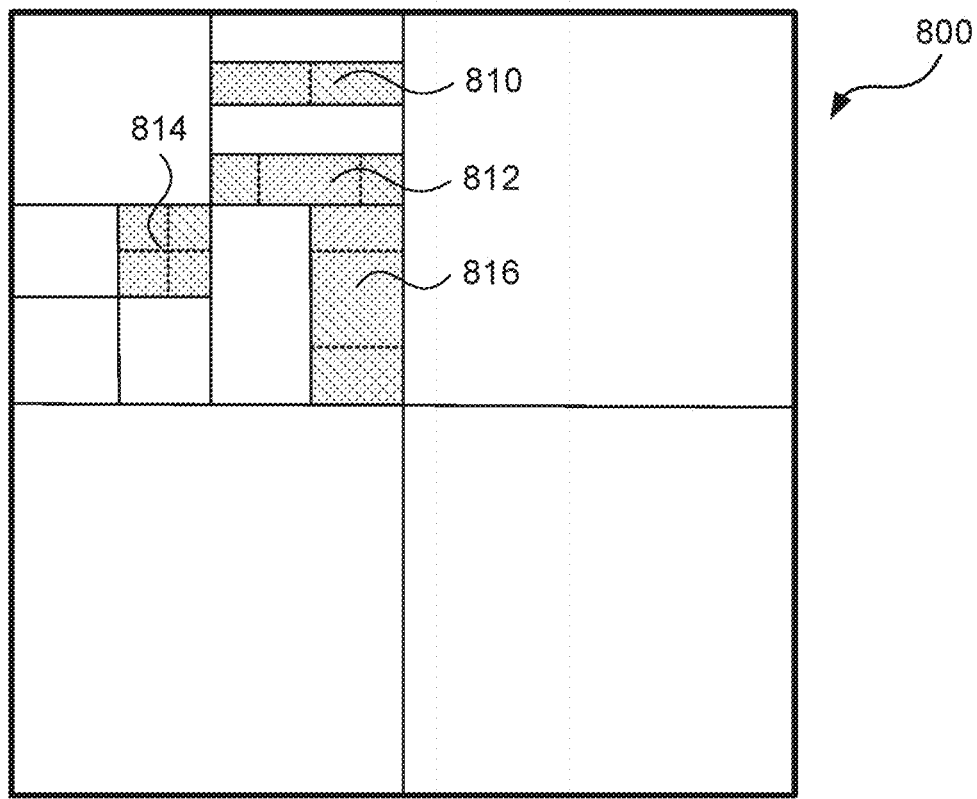
FIGS. 8A, 8B, and 8C show an example division of a coding tree unit (CTU) into a number of coding blocks (CBs) in luma and chroma channels.
Figure 8B:
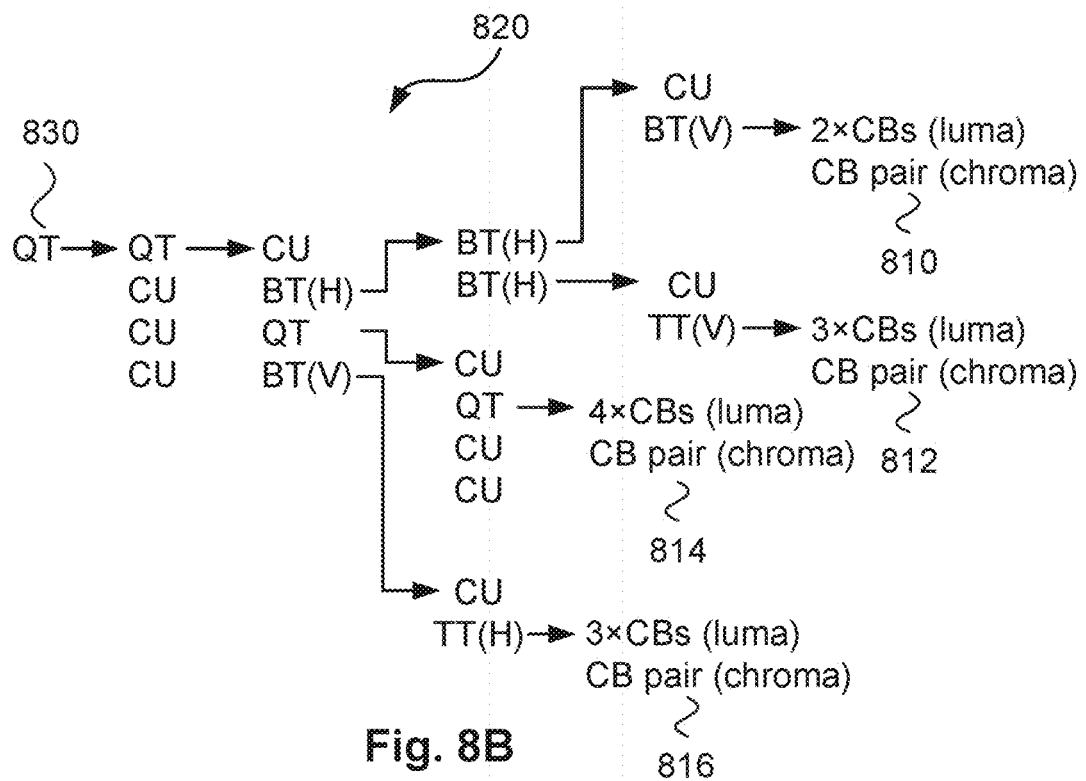
Figure 8C:
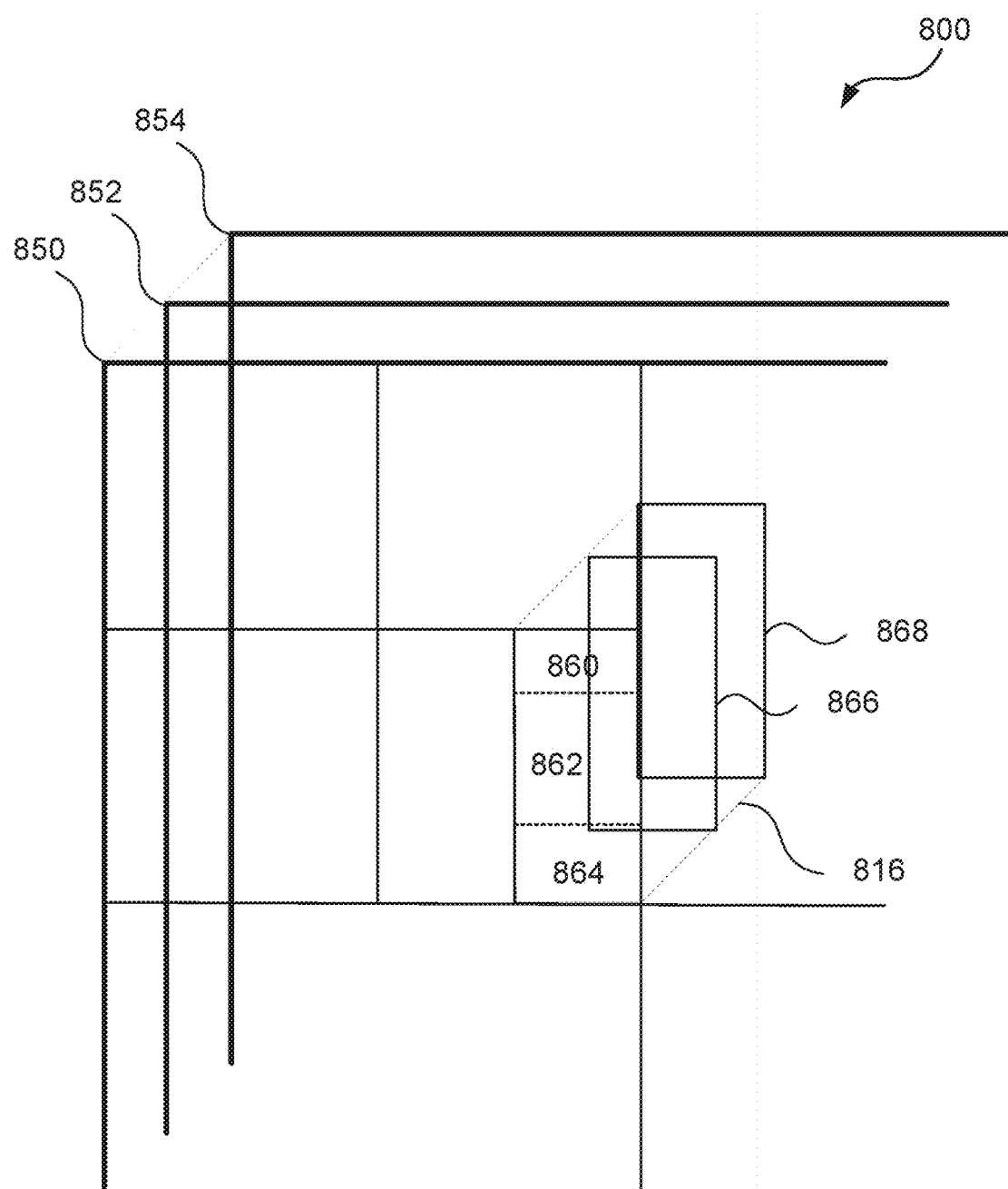

FIGS. 8A, 8B, and 8C provide an example division of a CTU 800 (8A) according to a coding tree 820 (FIG. 8B) with chroma splits terminated prior to luma splits and using the 4:2:0 chroma format. Where chroma splitting terminates a pair of CBs is used, one for each chroma channel. For illustrative convenience, the CTU 800 of size 64×64 luma samples. The CTU 800 is equivalent to a CTU size of 128×128 and a coding tree having one additional quad-tree split included. A quadtree split is applied to an 8×8 luma region 814. The 8×8 luma region 814 is split into four 4×4 luma CBs however no splitting occurs in the chroma channels. Instead, a predetermined minimum size (16 in the example described) pair of chroma CBs is used, one corresponding to each chroma channel. The pair of chroma CBs is typically of minimum size that corresponds to a minimum granularity for the number of samples that can desirably be processed simultaneously. For example, many implementations of the video encoder 114 and the video encoder 134 will operate on sets of 16 samples, for example due to use of a correspondingly wide internal bus in a hardware implementation. Further, each luma CB resulting from the split overlaps at least partially with the pair of chroma CBs and the collective luma CBs fully overlap the pair of chroma CBs. In the example of the region 814, a pair of 4×4 chroma CBs is generated. FIG. 8C shows examples of how the resultant luma CBs and chroma CBs are related.

Referring back to 8A, a vertical binary split is applied to a 16×4 luma region 810. The 16×4 luma region 810 is split into two 8×4 luma CBs however no splitting occurs in the chroma channels, resulting in a pair of 8×2 chroma CBs. A vertical ternary split is applied to the 16×4 luma region 812. The 16×4 luma region 812 is split into a 4×4, a 4×8, and a 4×4 luma CB however no splitting occurs in the chroma channels, resulting in a pair of 8×2 chroma CBs. A horizontal binary split is applied to an 8×16 luma region 816. The 8×16 luma region 816 is split into an 8×4, an 8×8, and an 8×4 luma CB however no splitting occurs in the chroma channels, resulting in a pair of 4×8 chroma CBs. Accordingly, chroma CBs are at least 16 samples in area.

FIG. 8C shows a portion of the CTU 800 with three colour planes shown in an 'exploded' (or separated) manner to exemplify different block structures in the different planes. A luma sample plane 850, a first chroma sample plane 852, and a second chroma sample plane 854 are shown. When a 'YCbCr' colour space is in use the luma sample plane 850 contains the Y samples of the image frame, the first chroma sample plane 852 contains the Cb samples of the image frame, and the second chroma sample plane 854 contains the Cr samples of the image frame. Use of the 4:2:0 chroma format results in the first chroma sample plane 852 and second chroma sample plane 854 having half the sample density horizontally and vertically with respect to the luma sample plane 850. As a consequence, CB dimensions of chroma blocks in samples are typically half the dimension of the corresponding luma CB. That is, for a 4:2:0 chroma format the chroma CB width and height are each half that of the collocated luma CB. For a 4:2:2 chroma format the chroma CB height is half that of the collocated luma CB while the width is the same as that of the collocated luma CB. For clarity, only the parent splits in the coding tree of the 8×16 luma region 816 are shown, and splits are only shown in the luma sample plane 850. When chroma splitting is terminated, a plurality of luma CBs are collocated with a pair of chroma CBs. For example, the coding tree of the CTU 800 includes a horizontal ternary split applied to the 8×16 luma region 816. The horizontal ternary split results in 8×4 luma CB 860, an 8×8 luma CB 862, and an 8×4 luma CB 864, present in the luma sample plane 850. As the 8×16 luma region 816 corresponds to an area of 4×8 chroma samples in the chroma sample planes (852 and 854) the ternary split of the coding tree is not applied for the chroma sample planes (852 and 854). Accordingly, the area of 4×8 chroma samples forms a leaf node for chroma, resulting in a pair of chroma CBs, that is, a chroma CB 866 for the first chroma sample plane 852 and a chroma CB 868 for the second chroma sample plane 854. In the example of the horizontal ternary split being applied in the luma plane only, a minimum chroma CB size of 32 samples is achieved. Other example luma areas (810, 812, and 814) result in a minimum chroma CB size of 16, which corresponds to the minimum luma block size and the desired granularity of sample processing.

Figure 9:
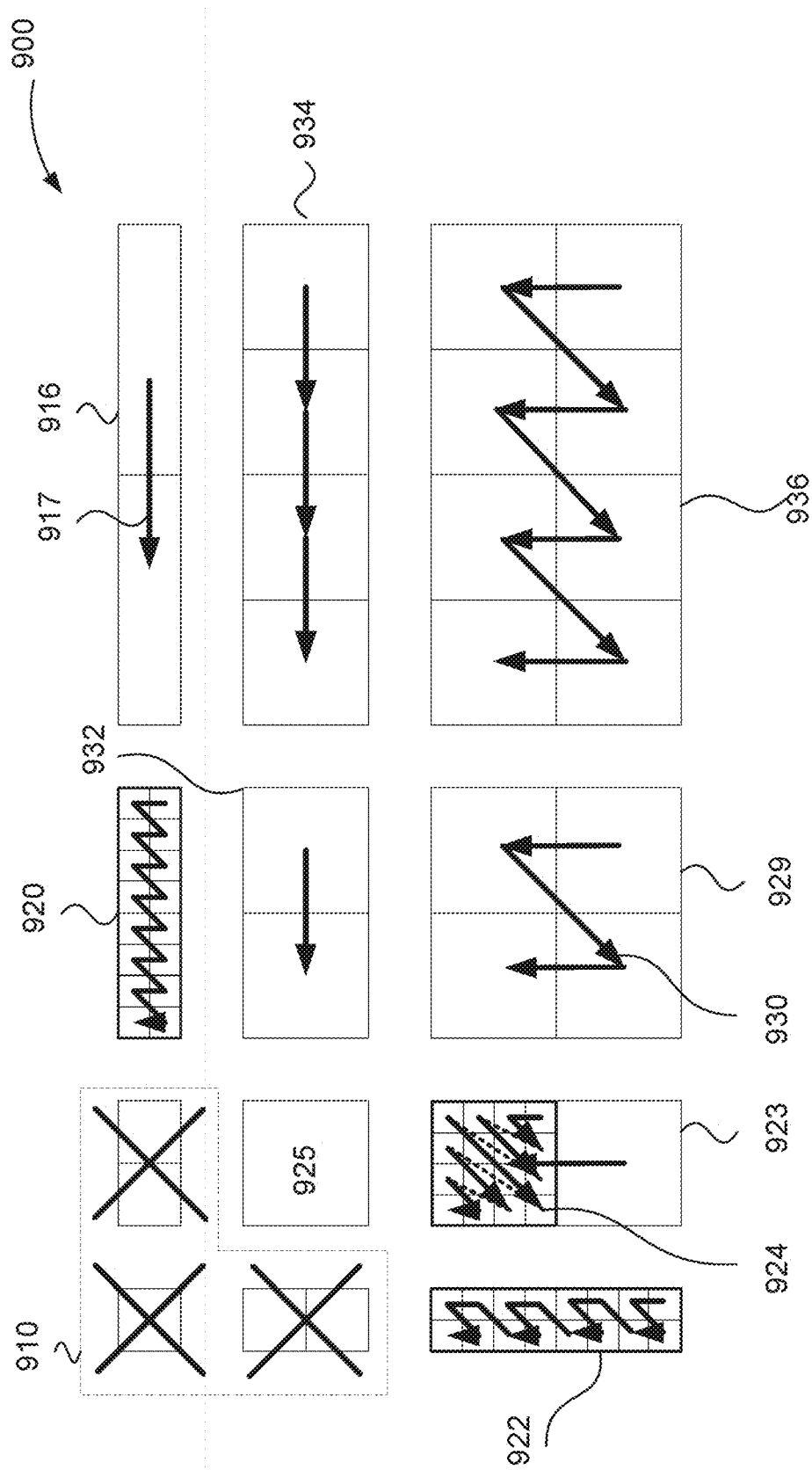
FIG. 9 shows a collection of transform block sizes and associated scan patterns.

FIG. 9 shows a collection 900 of transform block sizes and associated scan patterns for the chroma channels that result from the use of a 4:2:0 chroma format. The collection 900 may also be used for the 4:2:2 chroma format. The arrangements described are suitable for use with image frames having a chroma format wherein chroma channels of the image frame are subsampled relative to a luma channel of the image frame, in particular for 4:2:0 and 4:2:2 formats. The collection 900 does not include all possible chroma transform block sizes. Only chroma transform blocks with a width of less than or equal to sixteen or a height of less than or equal to eight are shown in FIG. 9. Chroma block with greater width and height may occur but are not shown in FIG. 9 for ease of reference.

A set of prohibited transform sizes 910 includes transform block sizes 2×2, 2×4, and 4×2, all of which have areas of less than sixteen samples. In other words, in the example of FIG. 9, a minimum transform size of 16 (sixteen) chroma samples results from operation of the arrangements described, in particular for intra predicted CBs. Instances of the prohibited transform sizes 910 are avoided by determining split options as described with reference to FIG. 10. Residual coefficients in transforms are scanned in a two layer approach where the transform is divided into 'sub-blocks' (or 'coefficient groups'). Scanning takes place along a scan path from the last significant (non-zero) coefficient back towards the DC (top left) coefficient. The scan path is defined as the progression within each sub-block (the 'lower layer') and the progression from one sub-block to the next (the 'upper layer'). In the collection 900, an 8×2 TB 920 uses an 8×2 sub-block, i.e. a sub-block containing sixteen residual coefficients. A 2×8 TB 922 uses a 2×8 sub-block, i.e. also containing sixteen residual coefficients.

TBs having a width or height of two, and the other dimension a multiple of eight, use multiple 2×8 or 8×2 sub-blocks. Accordingly, chroma blocks in some instances having a width of two samples are coded using a division of the block into sub-blocks, each of size 2×8 samples and chroma blocks having a height of two samples are in some instances coded using a division of the block into sub-blocks, each of size 8×2 samples. For example, a 16×2 TB 916 has two 8×2 sub-blocks, each sub-block being scanned as shown for to the TB 920. The progression of scanning from one sub-block to the next as shown in sub-block progression 917.

A 2×32 TB (not shown in FIG. 9) uses four 2×8 sub-blocks, arranged as a one by four array. Residual coefficients in each sub-block are scanned as shown for the 2×8 TB 922, with sub-blocks progressing from the lowest sub-block up to the uppermost sub-block of the one by four array.

Larger TBs follow a similar scan progression. For all TBs with width and height each being greater than or equal to four, a 4×4 sub-block scan is used. For example, a 4×8 TB 923 uses a 4×4 sub-block scan 924, with a progression from the lower sub-block to the upper sub-block. A 4×4 TB 925 can be scanned in a similar manner. An 8×8 TB 929 uses a progression 930 for the four 4×4 sub-blocks. In all cases the scan within a sub-block and the progression from sub-block to sub-block follows a backward diagonal scan, i.e. the scan progresses from the 'last' significant residual coefficient back towards the top-left residual coefficient of the TB. FIG. 9 also shows scan order across an 8×4 TB 932, a 16×4 TB 934 and a 16×8 TB 936 for example. Moreover, depending on the position of the last significant coefficient along the scan path, only the portion of the sub-block containing the last significant residual coefficient from the last significant coefficient position back to the top-left residual coefficient of the sub-block needs to be scanned. Sub-blocks further along the scan path in a forward direction (i.e. closer to the bottom right of the block) do not need to be scanned. The collection 900 and in particular the prohibited transform sizes 910 impose restrictions on the ability to split regions (or nodes) of a coding tree in chroma into sub-regions (or sub-nodes), as described with reference to FIG. 10.

In a VVC system using 2×2, 2×4 and 4×2 TBs (the set of TBs 910), a 2×2 sub-block may be employed for TBs of width and/or height of two samples. As described above, use of TBs 910 increases throughput constraints in the intra reconstruction feedback dependency loop. Moreover, use of a sub-block with only four coefficients increases the difficulty of parsing residual coefficients at higher throughput. In particular, for each sub-block a 'significance map' indicates the significance of each residual coefficient contained therein. Coding of a one-valued significance flag establishes the magnitude of the residual coefficient as being at least one and coding of a zero-valued flag establishes the magnitude of the residual coefficient as zero. Residual coefficient magnitude (from one onwards) and sign is only coded for 'significant' residual coefficients. No significance bit is coded and a magnitude (from zero) is always coded for the DC coefficient. High-throughput encoders and decoders may need to encode or decode multiple significance map bins per clock cycle to maintain real-time operation. The difficulty of multi-bin encoding and decoding per cycle is increased when inter-bin dependencies are more numerous, for example when a smaller sub-block size is used. In the system 100 sub-block sizes are 16 (notwithstanding the exception of the sub-block containing the last significant coefficient), regardless of block size.

FIG. 10 shows a set of rules 1000 for generating lists of allowed splits in a chroma coding tree. Other frames may allow a mixture of inter predicted and intra predicted blocks. Although the full set of available splits of a coding tree has been described with reference to FIG. 6, restrictions on available transform sizes impose constraints on the specific split options for a given region size. As described below, split options for each of the chroma channels are determined according to dimensions of a region of a corresponding coding tree unit.

The rules 1020 for the chroma region show allowed splits of different areas. The allowed splits of the rules 1020 are expressed in units of luma samples, even though the chroma channels are under consideration, as different chroma formats may be in use.

In traversing the nodes of a coding tree, a list of allowed splits for chroma is obtained by checking availability of a set of split options with a region size of the coding tree. Split options that result in regions that may be coded using CBs are added to the list of allowed splits. For a region to be coded using a CB, the region size must enable coding with an integer number of transforms of a particular size from the collection 900. The particular size is selected to be the largest size that does not exceed the region size (considering both width and height). As such, for smaller regions a single transform is used. Where the region size exceeds that of the largest available transform, the largest available transform is tiled to occupy the entirety of the region.

When considering a node in the coding tree that has a given area (expressed in luma samples), the ability to perform a given type of split is determined according to the split type and the chroma region area. As shown in FIG. 10, a split option is tested against the region size to determine if the split option would result in sub-regions of a prohibited size. Split options resulting in sub-regions of allowed sizes, are deemed an allowed chroma split 1070.

For example, as shown as rule 1021*a* for chroma regions, if in QT mode (corresponding to the decision 610 of FIG. 6), quadtree splits are not allowed if the region is of size 8×8 in 4:2:0 format or 8×8 in 4:2:2 format as the split would result in transform sizes of 2×2 or 2×4 respectively for the chroma channels. The region sizes that are allowable are indicated by an arrow 1021. Similarly, other allowable splits for the chroma rule set 1020 are indicated by arrows 1022, 1023, 1024, 1025 and 1026 and as discussed in relation to FIGS. 13 and 14 below. The arrows 1021, 1022, 1023, 1024, 1025 and 1026 each reference an allowed chroma split list 1070.

Region sizes for the chroma channels are described in terms of the luma sample grid. For example, a 8×4 region corresponds to a 4×2 transform for the chroma channels when the 4:2:0 chroma format is in use. When the 4:2:2 chroma format is in use, a 8×4 region corresponds to a 4×4 transform in chroma. When the 4:4:4 chroma format is in use, chroma is not subsampled with respect to luma and so the transform size in chroma corresponds to the region size.

The allowable split options are further described in relation to FIGS. 13 and 14 below.

FIG. 11 shows a method 1100 for encoding coding trees of an image frame into a video bitstream. The method 1100 may be embodied by apparatus such as a configured FPGA, an ASIC, or an ASSP. Additionally, the method 1100 may be performed by video decoder 114 under execution of the processor 205. As such, the method 1100 may be stored on computer-readable storage medium and/or in the memory 206. The method 1100 commences at a determine chroma format step 1105.

At the determine chroma format step 1105 the processor 205 determines the chroma format of the frame data 113 as one of the 4:2:0 chroma format or the 4:2:2 chroma format. The chroma format is a property of the frame data and does not change during operation of the method 1100. The method 1100 continues under control of the processor 205 from step 1105 to a divide frame into CTUs step 1110.

At the divide frame into CTUs step 1110 the block partitioner 310, under execution of the processor 205, divides a current frame of the frame data 113 into an array of CTUs. A progression of encoding over the CTUs resulting from the division commences. Control in the processor progresses from the step 1110 to a determine coding tree step 1120.

At the determine coding tree step 1120 the video encoder 114, under execution of the processor 205, tests various prediction modes and split options in combination to arrive at a coding tree for a CTU. Also derived are prediction modes and residual coefficients for each CU of the coding tree for the CTU. Generally, a Lagrangian optimisation is performed to select the optimal coding tree and CUs for the CTU. When evaluating use of inter prediction, a motion vector is selected from a set of candidate motion vectors. Candidate motion vectors are generated according to a search pattern. When testing distortion of fetched reference blocks for candidate motion vectors are being evaluated, the application of prohibited chroma splitting in the coding tree is considered. When a split is prohibited in chroma and allowed in luma, the resulting luma CBs may use inter prediction. Motion compensation is applied to the luma channel only and so the distortion computation considers the luma distortion and not the chroma distortion. The chroma distortion is not considered as motion compensation is not performed in the chroma channel when the chroma split was prohibited. For chroma, the distortion resulting from the considered intra prediction mode and a coded chroma TB (if any) is considered. When considering both luma and chroma, the inter prediction search may firstly select a motion vector based on luma distortion and then 'refine' the motion vector by also considering chroma distortion. Refinement generally considers small variation on motion vector value, such as sub-pixel displacements. When chroma splitting is prohibited and an evaluation of inter prediction on small luma blocks is performed, chroma refinement is not needed. Control in the processor 205 progresses from the step 1120 to an encode coding tree step 1130.

Figure 13:
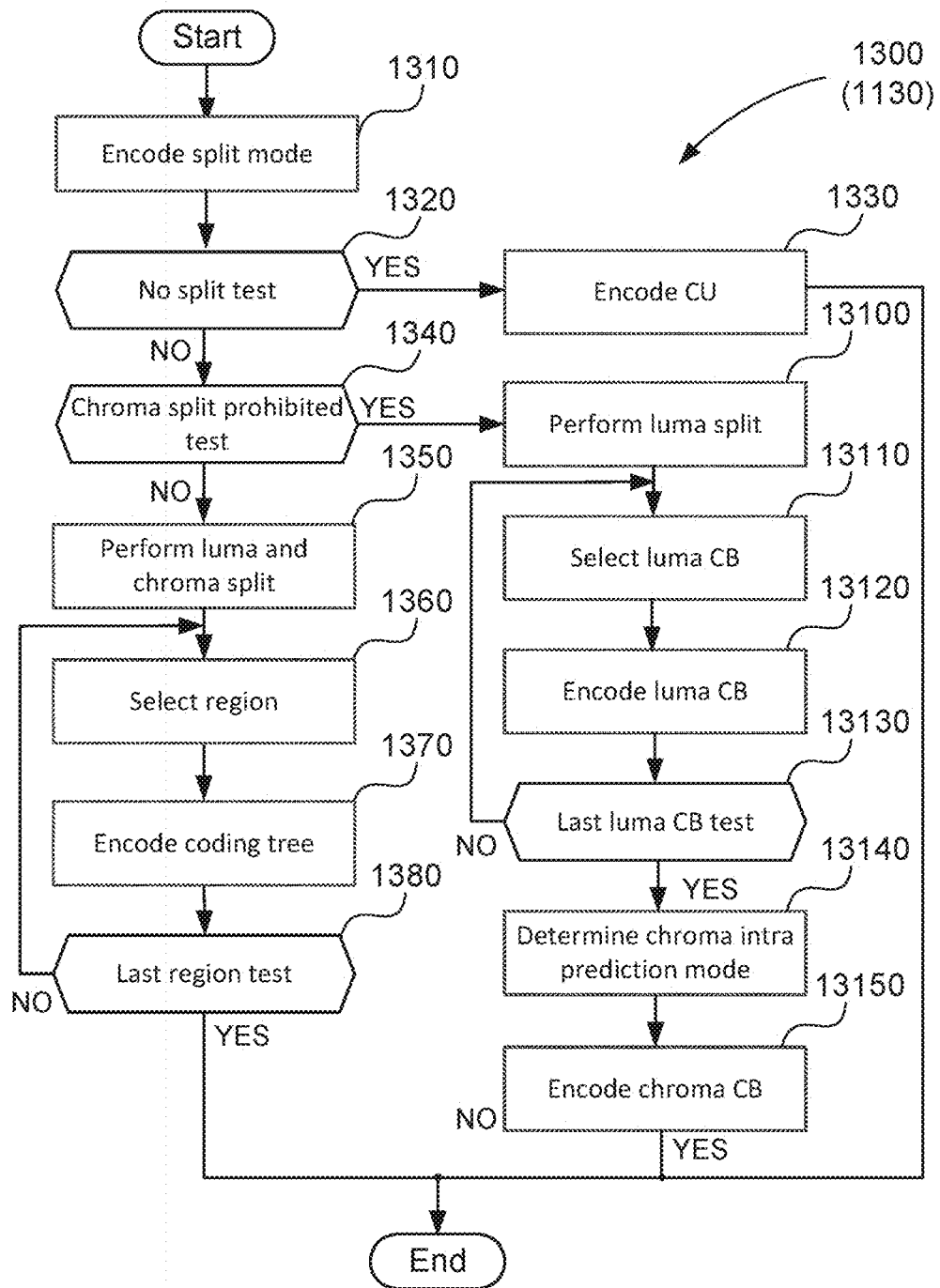
FIG. 13 shows a method for encoding a coding tree of an image frame into a video bitstream.

At the encode coding tree step 1130 the video encoder 114, under execution of the processor 205, performs a method 1300, to be described in relation to FIG. 13, to encode the coding tree of the current CTU into the bitstream 115. Step 1130 executes to encode the current CTU into the bitstream. Control in the processor 205 progresses from the step 1130 to a last CTU test step 1140.

At the last CTU test step 1140 the processor 205 tests if the current CTU is the last CTU in the slice or frame. If not ("NO" at step 1140), the video encoder 114 advances to the next CTU in the frame and control in the processor 205 progresses from the step 1140 back to the step 1120 to continue processing remaining CTUs in the frame. If the CTU is the last one in the frame or slice, the step 1140 returns "YES" and the method 1100 terminates. As a result of the method 1100, an entire image frame is encoded as a sequence of CTUs into a bitstream.

Figure 12:
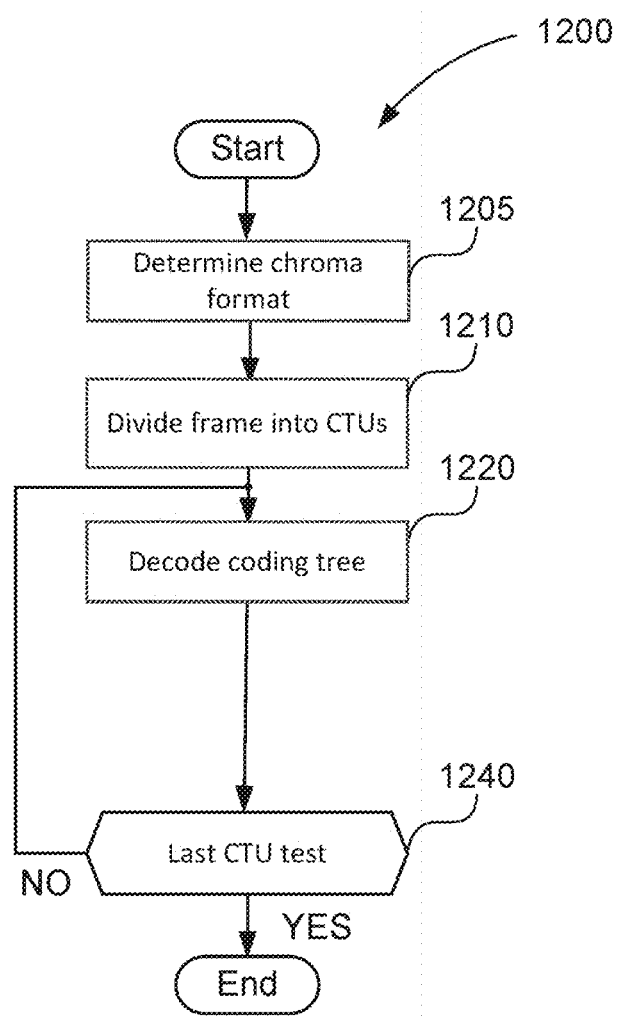
FIG. 12 shows a method for decoding coding trees of an image frame from a video bitstream.

FIG. 12 shows a method 1200 for decoding coding trees of an image frame from a video bitstream. The method 1200 may be embodied by apparatus such as a configured FPGA, an ASIC, or an ASSP. Additionally, the method 1200 may be performed by video decoder 134 under execution of the processor 205. As such, the method 1200 may be stored on computer-readable storage medium and/or in the memory 206. The method 1200 commences at a determine chroma format step 1205.

At the determine chroma format step 1205 the processor 205 determines the chroma format of the frame data 113 as one of the 4:2:0 chroma format or the 4:2:2 chroma format. The chroma format is a property of the frame data and does not change during operation of the method 1200. The video decoder 134 may determine the chroma format by virtue of the profile of the bitstream 133. A profile defines a set of coding tools that may be used by a particular bitstream 133 and may constrain the chroma format to particular values, such as 4:2:0. The profile is determined by decoding, for example, a "profile_idc" syntax element from the bitstream 133, or by decoding one or more constraint flags from the bitstream 133, each of which constrain the use of particular tools in the bitstream 133. Where the chroma format is not fully specified by the profile, further syntax such as a "chroma_format_idc" may be decoded to determine the chroma format. The method 1200 continues under execution of the processor 205 from step 1205 to a divide frame into CTUs step 1210.

At the divide frame into CTUs step 1210 the video decoder 134, under execution of the processor 205, determines a division of a current frame of the frame data 133 that is to be decoded into an array of CTUs. A progression of decoding over the CTUs resulting from the determined division commences. Control in the processor progresses from the step 1210 to a decode coding tree step 1220.

At the decode coding tree step 1220 the video decoder 134, under execution of the processor 205, performs a method 1400 for the current CTU to decode the coding tree of the current CTU from the bitstream 133. The current CTU is a selected one of the CTUs resulting from execution of step 1210. Control in the processor 205 progresses from the step 1220 to a last CTU test step 1240.

At the last CTU test step 1240 the processor 205 tests if the current CTU is the last one in the slice or frame. If not ("NO" at step 1240), the video decoder 134 advances to the next CTU in the frame and control in the processor 205 progresses from the step 1240 back to the step 1220 to continue decoding CTUs from the bitstream. If the CTU is the last one in the frame or slice, the step 1240 returns "YES" and the method 1300 terminates.

FIG. 13 shows the method 1300 of encoding a coding tree of an image frame into a video bitstream. The method 1300 may be embodied by apparatus such as a configured FPGA, an ASIC, or an ASSP. Additionally, the method 1300 may be performed by video encoder 114 under execution of the processor 205. As such, the method 1300 may be stored on computer-readable storage medium and/or in the memory 206. The method 1300 results in encoding blocks into the bitstream 115 such that each block is at smallest a minimum area. The arrangements described use a predetermined minimum size of samples. The minimum size used in the examples described is 16 samples, which is preferable in terms of some hardware and software implementations. However, a different minimum size could nonetheless be used. For example, a processing granularity of 32 or 64 and corresponding minimum block area of 32 or 64 samples respectively is possible. Encoding blocks that have a minimum area is advantageous for implementation feasibility, both in hardware and in software implementations. For software implementations, the minimum area of 16 samples aligns with typical single instruction multiple data (SIMD)

instruction sets, such as AVX-2 and SSE4. The method 1300, invoked initially at the root node of the coding tree of a current CTU, commences at an encode split mode step 1310.

At the encode split mode step 1310 the entropy encoder 338, under execution of the processor 205, encodes the split mode at the current node of the coding tree into the bitstream 115. The split mode is one of the splits as described with reference to FIG. 5 and the step of encoding a split mode only allows coding of splits that are possible. For example, the quadtree split 512 is only possible at the root node of the coding tree or underneath other quad-tree splits in the coding tree. Splits that would result in a luma CB having a width or height of less than four samples are prohibited, as shown in relation to the set 910. Other constraints regarding the maximum depth of binary and/or ternary splits may also be in effect, for example based on the rule set 1010. Control in the processor 205 progresses from step 1310 to a no split test step 1320.

At the no split test step 1320 the processor 205 tests if the current split is a 'no split' (i.e. 510). If the current split is the no split 510 ("YES" at step 1320), control in the processor 205 progresses from step 1320 to an encode CU step 1330. Otherwise, if the current split is not 510 ("NO" at step 1320) control in the processor 205 progresses to a chroma split prohibited test step 1340.

At the encode CU step 1330 the entropy encoder 338, under execution of the processor 205, encodes the prediction mode of the CU and the residual of the CU into the bitstream 115. As the step 1330 is reached at each leaf node of the coding tree, the method 1300 terminates upon completion step 1330, returning to the parent invocation in the coding tree traversal. Once all nodes of the coding tree have been traversed, the entire CTU is encoded in the bitstream 115 and control returns to the method 1100, progressing to the next CTU in the image frame.

At the chroma split prohibited test step 1340 the processor 205 determines if the split for the current node in the coding tree, as per the step 1310, is allowed to be applied to the chroma channel, in accordance with the chroma region 1020 split rule set of FIG. 10. If the current node in the coding tree covers a luma area of 128 luma samples (32×4 or 4×32 or 16×8 or 8×16) then a ternary split in the corresponding chroma region (16×2, 2×16, 8×4, 4×8 chroma samples, respectively) is prohibited as shown in the rule set 1020. If a ternary split were allowed, the resulting block sizes would include prohibited block sizes (for example 2×4 or 4×2). When the current node in the coding tree covers a luma area of 64 luma samples then binary, ternary and quadtree splits are prohibited as shown in the rule set 1020. Implementing binary, ternary and quadtree splits for a luma area of 64 luma samples would result in prohibited chroma block sizes (2×2, 2×4, 4×2). If the split is not prohibited (i.e., the split is an allowed chroma split of the list 1070), the step 1340 returns "NO" and control in the processor 205 progresses from step 1340 to a perform luma and chroma split step 1350. Otherwise, if the split is prohibited ("YES" at 1340), control in the processor 205 progresses to a perform luma split step 13100.

At the perform luma and chroma split step 1350 the processor 205 applies the split to divide the current region associated with the current node of the coding tree into sub-regions associated with sub-nodes of the coding tree. The split is applied in accordance with the description of FIGS. 5 and 6. Control in the processor 205 progresses from step 1350 to a select region step 1360.

At the select region step 1360 the processor selects one of the sub-regions resulting from the step 1350. The sub-region is selected in accordance with a Z-order scan of the regions. The selection progresses through the sub-regions on subsequent iterations of the step 1360. Control in the processor 205 progresses from step 1360 to an encode coding tree step 1370.

At the encode coding tree step 1370 the processor 205 recursively invokes the method 1300 for the selected region resulting from the step 1360. The step 1370 further operates to encode luma and chroma blocks, and associated prediction modes and residual coefficients, for each region to the bitstream. Control in the processor 205 progresses from step 1370 to a last region test step 1380.

At the last region test step 1380 the processor 205 tests if the selected region, as selected at the step 1360, is the last one of the regions resulting from the split mode division, as implemented at step 1350. If the region is not the last region ("NO" at step 1380) control in the processor 205 progresses from step 1380 to the step 1360, to continue progressing through the regions of the split. Otherwise, step 1380 returns "YES", the method 1300 terminates and control in the processor 205 progresses to the parent invocation of the method 1300.

At the perform luma split step 13100 the split mode as encoded at the step 1310 is performed in the luma channel only by the processor 205. As a consequence, the current node of the coding tree is divided into multiple luma CBs in accordance with the split mode. Only a pair of chroma CBs, that is, one chroma CB per chroma channel is generated. Each resulting luma CB partially overlaps (is collocated with) the pair of chroma CBs and collectively the resultant luma CBs The collective luma CBs exactly cover the area of the pair of chroma CBs. with the area of the pair of chroma CBs. Moreover, the smallest area of each luma CB and the chroma CBs is a minimum size, for example 16 samples.

Steps 13100 and 1350 each operate to determine a size of a chroma coding block for the chroma channels Cb and Cr. At step 1350 the chroma coding block size for a chroma channel is determined based upon the split mode determined at step 1310. At step 13100 the chroma coding block size for a chroma channel is determined based upon the predetermined minimum chroma block size. As described above, the step 1350 is implemented based upon the chroma split being prohibited for the coding tree unit. As indicated in the rule set 1020 of FIG. 10, the allowable splits, and accordingly the size of the chroma coding block, are determined based upon the chroma format determined at step 1105.

Control in the processor 205 progresses from step 13100 to a select luma CB step 13110.

At the select luma CB step 13110 the processor 205 selects a next luma CB of the CBs resulting from the step 13100. The method 13100 initially selects the first CB, that is the top-left luma CB of the CBs resulting from the luma split. Upon subsequent invocation of the step 13110, each 'next' luma CB is selected in accordance with a Z-order scan over the luma CBs resulting from the step 13100. Control in the processor 205 progresses from step 13110 to an encode luma CB step 13120.

At the encode luma CB step 13120 the entropy encoder 338, under execution of the processor 205, encodes the selected luma CB into the bitstream 115. Generally, the prediction mode and residual coefficients are encoded for the selected luma CB. The prediction mode encoded for the luma CB may use inter prediction or intra prediction. For example, "cu_skip_flag" is encoded to indicate use of inter prediction without any residual, otherwise "pred_mode_f- lag" and optionally a "pred_mode_ibc_flag" are encoded to indicate use of intra prediction, inter prediction, or intra-block copy, each with optional residual coefficients. When a residual may be present, a "cu_cbf" flag signals the presence of at least one significant (nonzero) residual coefficient in any TB of the CB. When the CB is indicated to use inter prediction, the associated motion vector is applicable to the luma CB only. That is, the motion vector is not also applied to generate any PB associated with any partially collocated chroma CBs. When the CB is indicated to use intra-block copy the associated block vector is associated only with the luma CB and not with any partially collocated chroma CBs. Control in the processor 205 progresses from step 13120 to a last luma CB test step 13130.

At the last luma CB test step 13130 the processor 205 tests if the luma CB selected at the step 13110 is the last luma CB according to a Z-order iteration of the luma CBs of the split performed at the step 13100. If the selected luma CB is not the last one ("NO" at step 13130), control in the processor 205 progresses from step 13130 to the step 13120. Otherwise, the step 13130 returns "YES" and control in the processor 205 progresses to a determine chroma intra prediction mode step 13140.

At the determine chroma intra prediction mode 13140 the video encoder 114, under execution of the processor 205, determines an intra prediction mode for the pair of chroma CBs collocated with the luma CBs of the step 13100. Step 13140 effectively determines that the chroma block is encoded using intra prediction. The determination is made if the region occupied by the chroma CB is further split in the luma channel into multiple luma CBs. The size of the chroma block for a channel is the predetermined minimum (for example 16 samples) as determined by operation of step 1350. The intra prediction mode for the pair of chroma CBs is determined even if the corresponding luma CBs were encoded using inter prediction at step 13120. In one arrangement, a single prediction mode, such as DC intra prediction, is applied to each chroma CB. Use of a single prediction mode allows the mode to be determined by virtue of the prohibition of splitting chroma (a 'YES' outcome at the step 1340) and does not entail additional searching to determine which one mode of multiple possible modes is to be used. Moreover, the bitstream 115 does not require additional signalling for this case, that is, there is no need to encode an additional "intra_chroma_pred_mode" synax element. Arrangements may however achieve higher compression performance by signalling one intra prediction mode out of several possible intra prediction modes by including an "intra_chroma_pred_mode" syntax element in the bitstream 115 when a chroma split has been prohibited ("YES" at the step 1340). The video encoder 114 determines which intra prediction mode is to be used. The intra prediction mode is generally determined according to consideration of coding cost in comparison to distortion. However higher compression performance is generally obtained compared to using a single intra prediction mode for such chroma CBs. Control in the processor 205 progresses from step 13140 to an encode chroma CB step 13150.

At the encode chroma CB step 13150 the entropy encoder 338, under execution of the processor 205, encodes the intra prediction mode for the chroma CBs into the bitstream 115, using an "intra_chroma_pred_mode" syntax element when multiple intra prediction modes are available for use. When one intra prediction mode, for example DC intra prediction, is possible, "intra_chroma_pred_mode" is not coded into the bitstream 115. Available intra prediction modes for chroma intra prediction may include DC, planar, and the following angular prediction modes: horizontal, vertical, up-right diagonal. Available intra prediction modes may also include the "direct mode" (DM_CHROMA), whereby the chroma intra prediction mode is obtained from a collocated luma CB, generally the lowermost and rightmost of the luma CBs resulting from the step 13100. When 'cross-component linear model' intra prediction is available, the chroma CB may be predicted from samples from the luma CB. Residual coefficients of chroma TBs associated with the chroma CBs may also be coded into the bitstream 115, as described with reference to step 14150 of FIG. 14. Once the step 13150 is executed by the processor 205 the method 1300 terminates and control in the processor 205 returns to a parent invocation of the method 1300.

Figure 14:
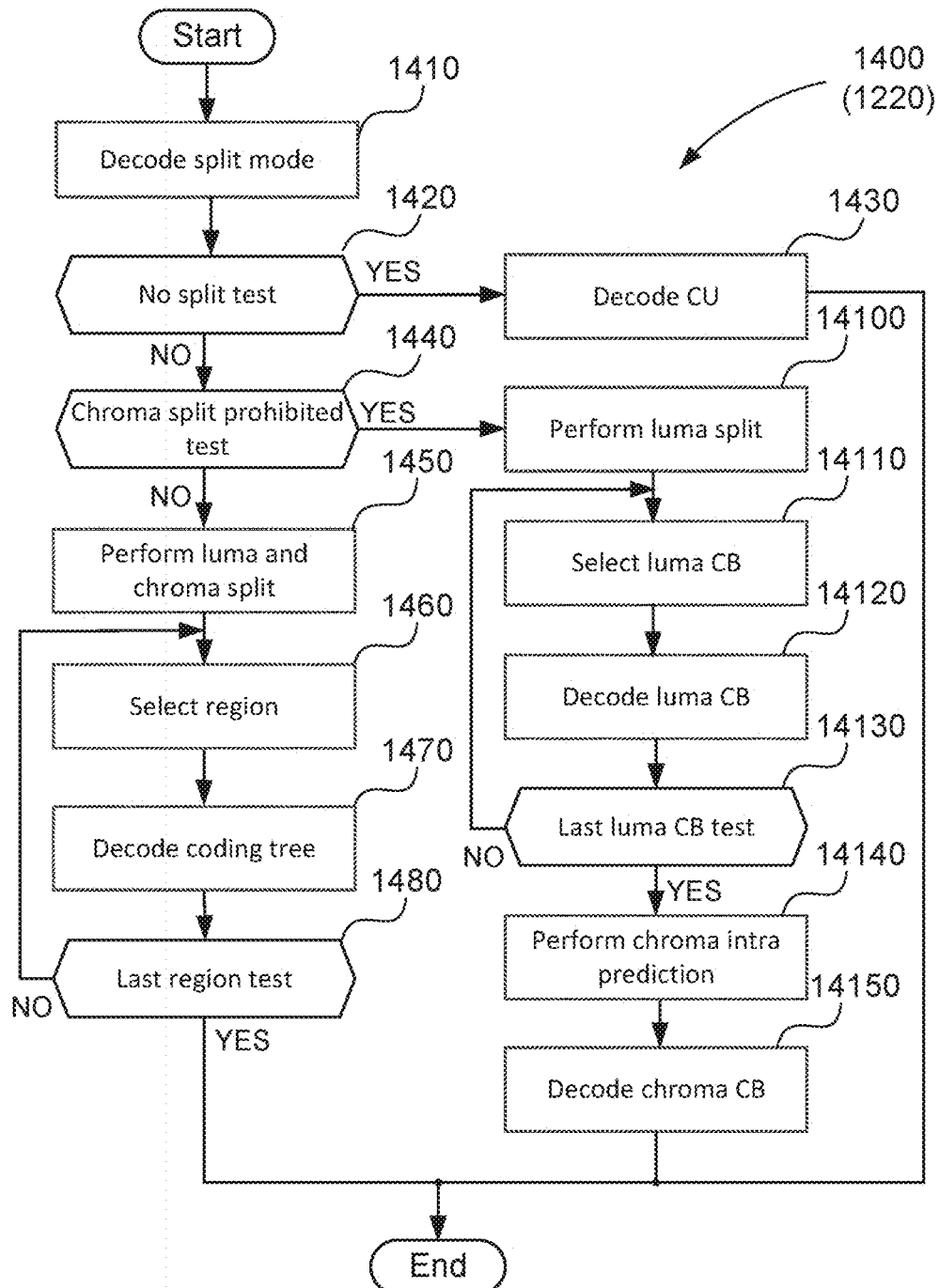
FIG. 14 shows a method for decoding a coding tree of an image frame from a video bitstream.

FIG. 14 shows the method 1400 of decoding a coding tree of an image frame from a video bitstream, as implemented at step 1220 of the method 1200. The method 1400 may be embodied by apparatus such as a configured FPGA, an ASIC, or an ASSP. Additionally, the method 1400 may be performed by video decoder 134 under execution of the processor 205. As such, the method 1400 may be stored on computer-readable storage medium and/or in the memory 206. The method 1400 results in decoding blocks from the bitstream 133 such that each block is no smaller than a minimum area, such as 16 samples, which is advantageous for implementation feasibility, both in the hardware case and in the software case. For the software case, the minimum area of 16 samples aligns with typical single instruction multiple data (SIMD) instruction sets, such as AVX-2 and SSE4. The method 1400, invoked initially at the root node of the coding tree of a current CTU, commences at a decode split mode step 1410.

At the decode split mode step 1410 the entropy decoder 420, under execution of the processor 205, decodes the split mode at the current node of the coding tree into the bitstream 133. The split mode is one of the splits as described with reference to FIG. 5 and the method of coding a split mode only allows coding of splits that are allowed, that is, allowed in the luma channel even if the split is prohibited in the chroma channels. For example, the quadtree split 512 is only possible at the root node of the coding tree or underneath other quad-tree splits in the coding tree. Splits that would result in a luma CB having a width or height of less than four samples are prohibited. As such, the minimum luma CB size is 16 samples. Other constraints regarding the maximum depth of binary and/or ternary splits may also be in effect. Control in the processor 205 progresses from step 1410 to a no split test step 1420.

At the no split test step 1420 the processor 205 tests if the current split is a 'no split' (i.e. 510). If the current split is the no split 510 ("YES" at 1420), control in the processor 205 progresses from step 1420 to a decode CU step 1430. Otherwise, the step 1420 returns "NO" and control in the processor 205 progresses to a chroma split prohibited test step 1440.

At the decode CU step 1430 the entropy decoder 420, under execution of the processor 205, decodes the prediction mode of the CU and the residual coefficients of the CU of the bitstream 115. Step 1430 operates to decode the coding unit using the residual coefficients and the prediction mode determined from the bitstream by the entropy decoder 420. As the step 1430 is reached at each leaf node of the coding tree, the method 1400 terminates upon completion of step 1430, returning to the parent invocation in the coding tree traversal. Once all nodes of the coding tree have been traversed, the entire CTU is decoded from the bitstream 133 and control returns to the method 1200, progressing to the next CTU in the image frame.

At the chroma split prohibited test step 1440 the processor 205 determines if the split for the current node in the coding tree, as per the step 1410, is allowed to be applied to the chroma channel, in accordance with the chroma region 1020 split rule set of FIG. 10. The step 1440 determines whether the split test is prohibited in a similar manner to step 1340 of the method 1300. Operation of step 1440 prevents prohibited block sizes from occurring. When the chroma region is already at a minimum size, for example 16 chroma samples, further splitting of any type is not allowed as the resulting regions would be smaller than the allowed minimum. When the chroma region size is 32 samples and the corresponding split is a ternary split (irrespective of being horizontal or vertical ternary split), further splitting is also disallowed to avoid chroma blocks of area 8 chroma samples. If the split is not prohibited (i.e., the split is allowed), step 1450 returns "NO" and control in the processor 205 progresses from step 1440 to a perform luma and chroma split step 1450. Otherwise, if the split is prohibited ("YES" at step 1450), control in the processor 205 progresses to a step determine chroma intra prediction mode step 14100.

At the perform luma and chroma split step 1450 the processor 205 applies the split to divide the current region associated with the current node of the coding tree into sub-regions associated with sub-nodes of the coding tree. The split is applied as described in relation to FIGS. 5 and 6.

Steps 14100 and 1450 each operate to determine a size of a chroma coding block for the chroma channels Cb and Cr. At step 1450 the chroma coding block size for a chroma channel is determined based upon the split mode decoded at step 1410. At step 14100 the chroma coding block size for a chroma channel is determined based upon the predetermined minimum chroma block size. As described above, the step 1450 is implemented based upon the chroma split being prohibited for the coding tree unit, which corresponds to a minimum chroma CB size of 16 (and 32 in case of a ternary split of luma area 128 samples). As indicated in the rule set 1020 of FIG. 10, the allowable splits, and accordingly the size of the chroma coding block, are determined based upon the chroma format determined at step 1205.

Control in the processor 205 progresses from step 1450 to a select region step 1460.

At the select region step 1460 the processor 205 selects one of the sub-regions resulting from the step 1450, in accordance with a Z-order scan of the regions. Step 1460 operates progress selection through the sub-regions on subsequent iterations. Control in the processor 205 progresses from step 1460 to a decode coding tree step 1470.

At the decode coding tree step 1470 the processor 205 recursively invokes the method 1400 for the selected region resulting from operation of step 1460. The step 1470 further operates to decode each region of the coding tree using residual coefficients and a prediction mode determined from the bitstream. Control in the processor 205 progresses from step 1470 to a last region test step 1480.

At the last region test step 1480 the processor 205 tests if the selected region, as preselected at the last iteration of the step 1460, is the last one of the regions resulting from the split mode division implemented at step 1450. If the region is not the last region ("NO" at step 1480), control in the processor 205 progresses from step 1480 to the step 1460, to continue progressing through the regions of the split. Otherwise, the step 1480 returns "YES", the method 1400 terminates and control in the processor 205 progresses to the parent invocation of the method 1400.

At the perform luma split step 14100, the split mode as encoded at the step 1410 is performed in the luma channel only by the processor 205. As a consequence, the current node of the coding tree is divided into multiple luma CBs in accordance with the split mode. Step 14100 operates to generate only a pair of chroma CBs, that is, one chroma CB per chroma channel. Each resulting luma CB partially overlaps (is at least partially collocated with) the pair of chroma CBs and collectively the luma CBs fully overlap the pair of chroma CBs. Moreover, the smallest area of each luma CB and the chroma CBs is 16 samples. Control in the processor 205 progresses from step 14100 to a select luma CB step 14110.

At the select luma CB step 14110 the processor 205 selects a next luma CB of the CBs resulting from the step 14100. Selection of the next luma CB starts with a first CB, that is the top-left luma CB of the CBs resulting from the luma split. Upon subsequent invocation of the step 14110, each 'next' luma CB is selected in accordance with a Z-order scan over the luma CBs resulting from the step 14100. Control in the processor 205 progresses from step 14110 to a decode luma CB step 14120.

At the decode luma CB step 14120 the entropy decoder 420, under execution of the processor 205, decodes the selected luma CB into the bitstream 115. Generally, the prediction mode and residual is decoded for the selected luma CB. For example, "cu_skip_flag" is decoded to indicate use of inter prediction without any residual, otherwise "pred_mode_flag" and optionally a "pred_mode_ibc_flag" are decoded to indicate use of intra prediction, inter prediction, or intra-block copy, each with optional residual coefficients. When a residual may be present, a "cu_cbf" flag signals the presence of at least one significant (nonzero) residual coefficient in any TB of the CB. When the CB is indicated to use inter prediction, the associated motion vector is applicable to the luma CB only, that is, the motion vector is not also applied to generate any PB associated with any partially collocated chroma CBs. When the CB is indicated to use intra-block copy the associated block vector is associated only with the luma CB and not with any partially collocated chroma CBs. Control in the processor 205 progresses from step 14120 to a last luma CB test step 14130.

At the last luma CB test step 14130 the processor 205 tests if the luma CB selected at the step 14110 is the last luma CB according to a Z-order iteration of the luma CBs of the split performed at the step 14100. If the selected luma CB is not the last one, control in the processor 205 progresses from step 14130 to the step 14110. Otherwise, control in the processor 205 progresses to a determine chroma intra prediction mode step 14140.

At the determine chroma intra prediction mode 14140 the video decoder 134, under execution of the processor 205, determines an intra prediction mode for the pair of chroma CBs collocated with the luma CBs of the step 14100. Step 14140 effectively determines that the chroma block has been encoded using intra prediction, and accordingly is to be decoded using intra prediction, if the chroma block is the result of a cessation of splitting the coding tree for chroma while splitting the coding tree for luma has taken place, as determined by operation of step 1440. The intra prediction mode for the pair of chroma CBs is determined even if the corresponding luma CBs were decoded using inter prediction at step 14120. In one arrangement, a single prediction mode, such as DC intra prediction, is applied to each chroma CB. Use of a single prediction mode allows the mode to be determined by virtue of the prohibition of splitting chroma (a 'YES' outcome at the step 1440) and does not entail additional searching to determine which one mode of multiple possible modes is to be used. Moreover, the bitstream 134 does not require additional signalling for this case, that is, there is no need to encode an additional "intra_chroma_pred_mode" synax element. Arrangements may however achieve higher compression performance by signalling one intra prediction mode out of several possible intra prediction modes by including an "intra_chroma_pred_mode" syntax element in the bitstream 134 when a chroma split has been prohibited ("YES" at the step 1440). The video decoder 134 needs to determine which intra prediction mode is to be used, using the entropy decoder 420 to decode an "intra_chroma_pred_mode" syntax element from the bitstream 134. Control in the processor 205 progresses from step 14140 to a decode chroma CB step 14150.

At the decode chroma CB step 14150 the entropy decoder 420, under execution of the processor 205, determines the intra prediction mode for the chroma CBs from the bitstream 420, generally according to a decoded "intra_chroma_pred_mode" syntax element. Decoding "intra_chroma_pred_mode" is performed when multiple intra prediction modes are available. When only one intra prediction mode is available, for example DC intra prediction, the mode is inferred without decoding additional syntax elements from the bitstream 133. Available intra prediction modes for chroma intra prediction may include DC, planar, the following angular prediction modes: horizontal, vertical, up-right diagonal. Available intra prediction modes may also include the "direct mode" (DM_CHROMA), whereby the chroma intra prediction mode is obtained from a collocated luma CB, generally the lowermost and rightmost of the luma CBs resulting from the step 14100. When 'cross-component linear model' intra prediction is available, the chroma CB may be predicted from samples from the luma CB. For the pair of chroma CBs a 'cu_cbf' flag signals the presence of at least one significant residual coefficient in either one of the pair of chroma CBs. If at least one significant residual coefficient is present in either one of the pair of chroma CBs then "tu_cbf_cb" and "tu_cbf_cr" signal the presence of at least one significant coefficient in the chroma CBs for Cb and Cr channels, respectively. For chroma CBs having at least one significant residual coefficient a "residual_coding" sequence of syntax elements is decoded to determine the residual coefficients of the respective chroma CB. The residual coding syntax codes the residual coefficients as a sequence of values populating a transform block from a last significant coefficient position to the top-left ("DC") coefficient position according to a backward diagonal scan. The backward diagonal scan performs a scan of the transform block as a sequence of 'sub-blocks' (or 'coefficient groups'), generally of size 4×4 but sizes of 2×2, 2×4, 2×8, 8×2, 4×2 also being possible. Scanning within each coefficient group is in a backward diagonal direction and scanning from one sub-block to the next sub-block is also in a backward diagonal direction. Once the step 14150 is executed by the processor 205 the method 1400 terminates and control in the processor 205 returns to a parent invocation of the method 1400.

The coding tree approach of the methods 1300 and 1400, whereby a minimum block area of 16 samples is maintained for 4:2:0 chroma format video data, facilitates high throughput implementation both in software and hardware. Moreover, the restriction of inter prediction to luma CBs for small CB sizes reduces the memory bandwidth of this worst case for motion compensation memory bandwidth by avoiding the need to also fetch samples for producing motion compensated chroma CBs. Especially if the minimum chroma CB size were 2×2 and the additional samples required to provide filter support for sub-sample interpolation of chroma CBs, a substantial increase in memory bandwidth would be seen compared to only performing inter prediction in the luma channel for small block sizes. The coding gain of motion compensation appears substantially in the luma channel so omitting small blocks from also being motion compensated achieves a memory bandwidth reduction for relatively little coding performance impact. Moreover, the memory bandwidth reduction contributes towards the feasibility of performing motion compensation on the 4×4 luma CBs and achieving the resulting coding gain.

In one arrangement of the video encoder 114 and the video decoder 134, more than one luma split can occur in the coding tree from the point at which chroma splitting of the coding tree terminates. For example, an 8×16 luma area is not split in the chroma channels, resulting in a pair of 4×8 chroma CBs. In the luma channel, the 8×16 luma area is firstly split with a horizontal ternary split and then one of the resulting luma CBs is further split. For example, a resulting 8×4 luma CB is vertically binary split into two 4×4 luma CBs. Arrangements with more than one luma split in the coding tree from the point at which chroma splitting of the coding tree terminates reinvoke the methods 1300 and 1400 in the video encoder 114 and video decoder 134 respectively within the chroma split prohibited area, with the modification that on subsequent invocations no further chroma CBs are needed. On the invocation of the methods 1300 and 1400 where the pair of chroma CBs are created, the entire chroma area is covered by the created chroma CBs, so recursive invocations of the methods 1300 and 1400 do not need to create additional chroma CBs.

Figure 15:
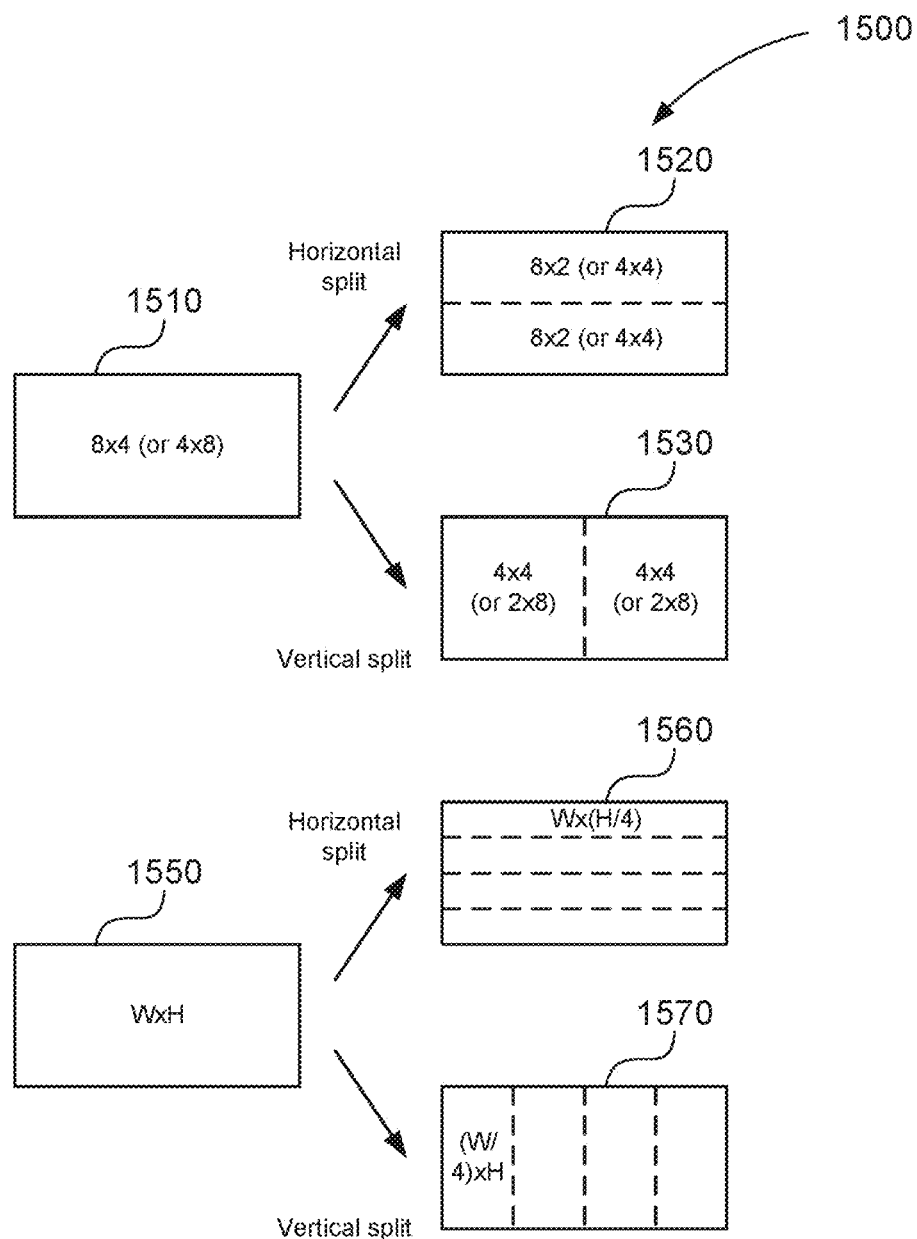
FIG. 15 shows a collection of transform block partitionings of an intra predicted coding unit.

FIG. 15 shows a collection 1500 of transform block partitionings of an intra predicted coding unit. A luma CB may be partitioned into one luma TB of the same size ("ISP_NO_SPLIT"). Luma CBs of size 4×4 have an area of 16 samples and are not further partitioned, resulting in one luma TB also of size 4×4. Luma CBs having an area of 32 samples may be partitioned into two partitions. For example, an 8×4 luma CB 1510 may be partitioned either horizontally ("ISP_HOR_SPLIT") into two 8×2 luma TBs 1520 or vertically ("ISP_VER_SPLIT") into two 4×4 luma TBs 1530. If the luma CB 1510 is a 4×8 luma CB, the block can be partitioned horizontally into two 4×4 luma TBs at 1520 or vertically into two 2×8 luma TBs at 1530.

Luma CBs of area 64 sample or larger are partitioned into one partition for into four partitions. A luma CB 1550 of width W and height H having an area of 64 samples of greater may be partitioned horizontally into four luma TBs 1560 of size W×(H/4) or may be partitioned vertically into four (W/4)×H luma TBs. 1570. As shown in the collection 1500, dividing luma CBs into multiple partitions results in more and smaller luma TBs. Intra prediction is performed to generate a PB for each luma TB and the intra reconstruction process is performed within the luma CB from one partition to the next partition.

Figure 16:
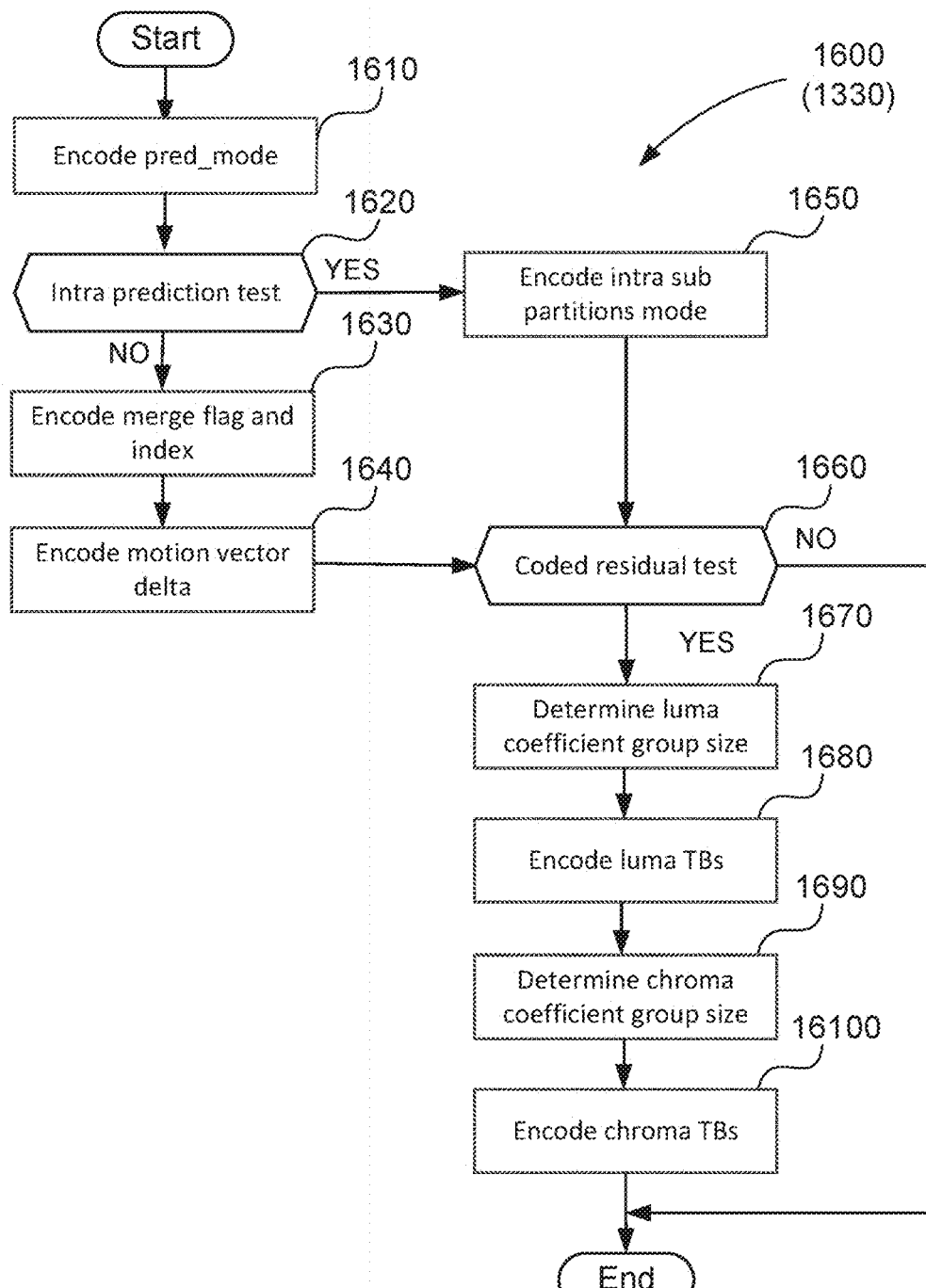
FIG. 16 shows a method for encoding a coding unit of an image frame into a video bitstream.

FIG. 16 shows a method 1600 for encoding a coding unit of an image frame into a video bitstream 115. The method 1600 may be embodied by apparatus such as a configured FPGA, an ASIC, or an ASSP. Additionally, the method 1600 may be performed by video encoder 114 under execution of the processor 205. As such, the method 1600 may be stored on computer-readable storage medium and/or in the memory 206. The method 1600 results in encoding blocks into the bitstream 115 such that the coefficient group size is determined based only on the transform block size and not further differentiated between luma and chroma channels. As entropy coding is a critical feedback loop in the video encoder 114, reducing memory access or computations required for coefficient group size determination is advantageous. The method 1600, invoked for each coding unit in the coding tree, that is, invoked at step 1330 of FIG. 13, commences at an encode pred_mode step 1610. As described above, the step 1330 is executed when the step 1320 determines that the current split is the no split 510.

At the encode pred_mode step 1610 the entropy encoder 338, under execution of the processor 205, encodes the prediction mode of the CU into the bitstream 115. Control in the processor 205 progresses from step 1610 to an intra prediction test step 1620.

At the intra prediction test step 1620 the processor 205 tests the prediction mode of the CU. If the prediction mode is intra prediction ("YES" at step 1620) control in the processor 205 progresses from step 1620 to an encode intra sub partitions mode step 1650. Otherwise if the prediction mode is not intra prediction ("No" at step 1620), control in the processor 205 progresses from step 1620 to an encode merge flag and index step 1630.

At the encode merge flag and index step 1630 the entropy encoder 338, under execution of the processor 205, encodes a merge flag into the bitstream 115 signalling use (or not) of a 'merge mode' for inter prediction. The merge mode causes the motion vector of the CU to be obtained from a spatially (or temporally) neighbouring block, out of a set of candidate spatially (or temporally) neighbouring blocks. If merge mode is used, one candidate is selected with a corresponding 'merge index'. The merge index is encoded in the bitstream 115 along with the merge flag. A similar encoding is performed if 'motion vector prediction' is used, whereby one out of several possible candidate motion vectors is signalled as a predictor using a flag. Control in the processor 205 progresses from step 1630 to an encode motion vector delta step 1640.

At the encode motion vector delta step 1640 the entropy encoder 338, under execution of the processor 205, encodes a motion vector delta into the bitstream 115. The step 1640 is performed when motion vector prediction is used for the CU. The motion vector delta specifies a delta between a motion vector predictor encoded at the step 1630 and the motion vector to be used for motion compensation. Control in the processor 205 progresses from step 1640 to a coded residual test step 1660. If motion vector prediction is not used for the CU, the step 1640 is not implemented and the method 1600 proceeds directly to step 1660.

At the encode intra sub partitions mode step 1650 the entropy encoder 338, under execution of the processor 205, encodes a decision of whether or not to use intra sub partitions into the bitstream 115 with a context-coded "intra_subpartitions_mode_flag" syntax element. Intra sub partitions are available to the luma channel when the luma CB size is larger than the minimum luma transform block size, that is, larger than 16 luma samples. Intra sub partitions divide a coding unit into multiple luma transform blocks as shown in the collection 1500. If the luma CB is partitioned into multiple TBs, an "intra_subpartitions_split_flag" signals whether the division of the luma CB into multiple luma TBs occurs horizontally or vertically. Collectively, "intra_subpartitions_mode_flag" and "intra_subpartitions_split_flag" encode three possible partitions, enumerated as "ISP_NO_SPLIT", "ISP_HOR_SPLIT", and "ISP VER SPLIT".

Control in the processor 205 progresses from step 1650 to the coded residual test step 1660.

At the coded residual test step 1660 the processor 205 determines if at least one residual coefficient in any transform block of the coding block is significant. The determination includes all luma TBs resulting from application of intra sub partitions and the pair of chroma TBs associated with the two chroma channels. If at least one residual coefficient in any of the luma and chroma TBs is significant, the entropy encoder 338, under execution of the processor 205, arithmetically encodes a 'one' for the 'cu_cbf' syntax element, the step 1660 returns "YES" and the processor 205 progresses to a determine luma coefficient group size step 1670. If no significant residual coefficients are present in any TB of the CU, the step 1660 returns "NO", a 'zero' is arithmetically encoded for cu_cbf and the method 1600 terminates, with the processor 205 progressing to the next CU in the CTU.

At the determine luma coefficient group size step 1670 the processor determines a coefficient group size for the one or more luma TBs (transform blocks) associated with the CU. If intra sub partitions are not in use one luma TB is present. If intra sub partitions are in use either two or four luma TBs are present. The size of the luma TBs is dependent on the intra sub partitioning being performed horizontally or vertically, and the number of luma TBs, and is accordingly dependent upon the luma CU size, as shown in the collection 1500.

The coefficient group size is determined using the luma TB width and height, as shown in Table 1 below. Table 1 shows transform block (TB) size to coefficient group mapping table for luma and chroma channels having the same sized coefficient groups for TBs irrespective of the TB being for a luma channel or a chroma channel. The TB width and height are powers of two and thus Table 1 considers the log2 of the TB width and height, that is 'log2TBwidth' and 'log2TBheight' form the first two indices into the three dimensions of Table 1. The final dimension of the table distinguishes the width and height of the coefficient groups. The coefficient group dimensions are stored as log2 width and log2 height. For example, a TB of size 16×16 results in indexing (4, 4) in Table 1, which returns (2, 2), indicating a coefficient group size of 4×4. A TB of size (2×32) results in indexing (1, 5) in Table 1, which returns (1, 3), indicating a coefficient group size of 2×8. The minimum area of a luma TB is 16 samples and so cases where log2width+log2height is less than four in Table 1 are not accessed. Where intra sub partitions are used for a CU, each luma TB has the same size and so the coefficient group size determination for the luma TBs is performed once for the CU.

Table 2 below shows mapping of transform block (TB) size to coefficient group size for luma and chroma channels having different coefficient group sizes for the same size TB in luma compared to chroma. Were Table 2 to be used, an additional dimension, that is, distinguishing luma from chroma, would be required and the table size is double compared to Table 1. Coefficient group sizes as defined in Table 1 result in sizes being the largest possible size that fits within the TB width and height while not exceeding 16 samples in area. Table 1 provides a set of coefficient group sizes from which a coefficient group size is selected. The selected coefficient group aspect ratio of width versus height is kept as close to 1:1 as possible within the constraints of the TB width and height. Control in the processor 205 progresses from step 1670 to an encode luma TBs step 1680.

At the encode luma TBs step 1680 the entropy encoder 338, under execution of the processor 205, encodes the residual coefficients of the one or more luma TBs of the CU into the bitstream 115. The determined coefficient group size of the step 1670 is used for each luma TB. For each luma TB, a coded block flag is encoded into the bitstream 115 indicating the presence of at least one significant coefficient in the luma TB. If at least one significant coefficient is present in the luma TB then a last significant position is coded into the bitstream. The last significant position is defined as the last significant coefficient along a scan path progressing from the DC (top left) coefficient to the bottom right coefficient of the TB. The scan path is defined as a diagonal scan within a division of the TB into an array of non-overlapping sub-blocks, each sized as the coefficient group size, and occupying the entirety of the TB. The progression from one sub-block to the next in the scan order also follows a diagonal scan. For each coefficient group other than the top-left coefficient group and the coefficient group containing the last significant coefficient, the entropy encoder 338 encodes a 'coded sub block flag'. The coded sub-block flag indicates the presence of at least one significant residual coefficient in the sub-block. If there are no significant residual coefficients in a sub-block, the diagonal scan of residual coefficients in the TB skips that sub-block. If there is at least one significant residual coefficient in a sub-block then all locations within that sub-block are scanned and magnitude of each residual coefficient is encoded, and sign of each significant residual coefficient is encoded. Control in the processor 205 progresses from step 1680 to a determine chroma coefficient group size step 1690.

At the determine chroma coefficient group size step 1690 the processor 205 determines a coefficient group size for the pair of chroma transform blocks associated with the CU. One chroma CB for each chroma channel is associated with the CU, independent of whether the luma CB is divided into multiple luma TBs or not. The coefficient group size is determined using the chroma TB width and height, as shown in Table 1. The TB width and height are powers of two and thus Table 1 considers the log2 of the TB width and height, that is 'log2TBwidth' and 'log2TBheight' form the first two indices into the three dimensions of Table 1. The final dimension of the table distinguishes the width and height of the coefficient groups. The coefficient group dimensions are stored as log2 width and log2 height. For example, a TB of size 16×16 results in indexing (4, 4) in Table 1, which returns (2, 2), indicating a coefficient group size of 4×4. A TB of size (2×32) results in indexing (1, 5) in Table 1, which returns (1, 3), indicating a coefficient group size of 2×8. Each chroma TB has the same size and so the coefficient group size determination for the pair of chroma TBs is performed once for the CU. Were Table 2 to be used, an additional dimension, that is, distinguishing luma from chroma, would be required and the table size is double compared to that of Table 1.

As described in relation to steps 1670 and 1690, the coefficient group size is determined based only on the transform block size and not further differentiated between luma and chroma channels. The coefficient group size is accordingly determined independently of whether the chroma format is 4:2:2 or 4:2:0. As described in relation to Table 1 the coefficient group size is based on a largest area of the coefficient group being up to 16 samples. Step 1690 operates to determine the coefficient group size for a TB irrespective of the colour plane (Y or Cb or Cr) of the transform block or subsampling in the colour plane (applicable to Cb and Cr channels) due to the chroma format. Table 1 is used in both step 1670 and step 1690. Accordingly, a single table is used for transform blocks belonging to the luma plane and each of the chroma colour planes. Control in the processor 205 progresses from step 1690 to an encode chroma TBs step 16100.

At the encode chroma TBs step 16100 the entropy encoder 338, under execution of the processor 205, encodes the residual coefficients of the pair of chroma TBs of the CU into the bitstream 115. The determined coefficient group size of the step 1690 is used for the pair of chroma TBs. For each chroma TB, a coded block flag is encoded into the bitstream 115 indicating the presence of at least one significant coefficient in the chroma TB. The remainder of the encoding step for each chroma TB accords with the encoding process for luma TBs, as described with reference to step 1680. The method 1600 terminates upon execution of the step 16100 and control in the processor 205 progresses to the next CU of the CTU.

Figure 17:
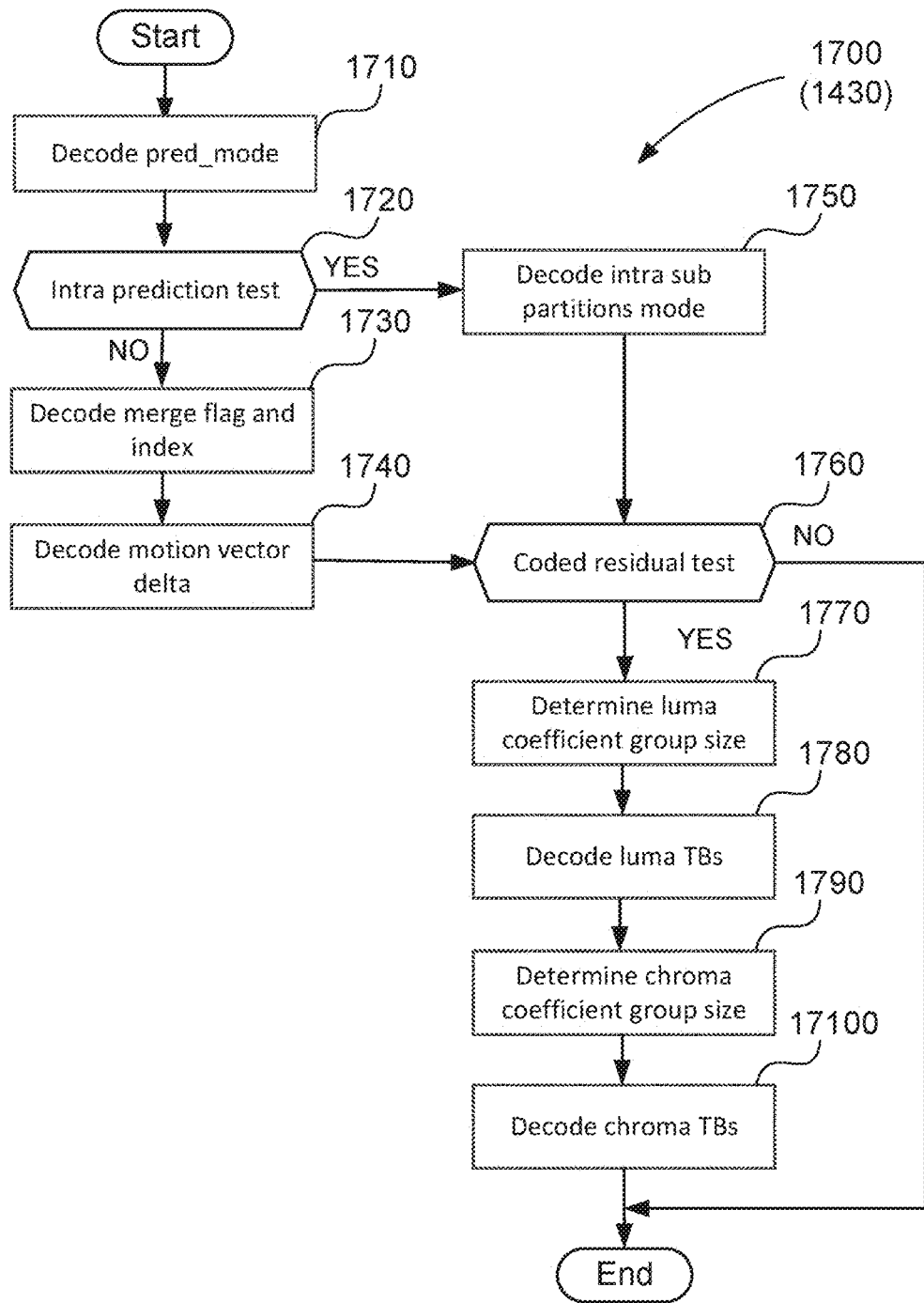
FIG. 17 shows a method of decoding a coding unit of an image frame from a video bitstream.

FIG. 17 shows a method 1700 of decoding a coding unit of an image frame from a video bitstream 133. The method 1700 may be embodied by apparatus such as a configured FPGA, an ASIC, or an ASSP. Additionally, the method 1700 may be performed by video decoder 134 under execution of the processor 205. As such, the method 1700 may be stored on computer-readable storage medium and/or in the memory 206. The method 1700 results in decoding blocks from the bitstream 133 such that the coefficient group size is determined based only on the transform block size and not further differentiated between luma and chroma channels. As entropy decoding is a critical feedback loop in the video encoder 134, reducing memory access or computations required for coefficient group size determination is advantageous. The method 1700, invoked for each coding unit in the coding tree, that is, invoked at step 1430 of FIG. 14. As described above, the step 1430 is executed if the current split is the no split 510. The method 1700 commences at a decode pred_mode step 1710.

At the decode pred_mode step 1710 the entropy decoder 420, under execution of the processor 205, decodes the prediction mode of the CU from the bitstream 133. Control in the processor 205 progresses from step 1710 to an intra prediction test step 1720.

At the intra prediction test step 1720 the processor 205 tests the prediction mode of the CU, as decoded at the step 1710. If the prediction mode is intra prediction, the step 1720 returns "YES" and control in the processor 205 progresses from step 1720 to a decode intra sub partitions mode step 1750. Otherwise, if not intra prediction, the step 1720 returns "NO" and control in the processor 205 progresses from step 1720 to a decode merge flag and index step 1730.

At the decode merge flag and index step 1730 the entropy decoder 420, under execution of the processor 205, decodes a merge flag from the bitstream 133 signalling whether or not a 'merge mode' is used in the bitstream for inter prediction. A merge mode causes the motion vector of the CU to be obtained from a spatially (or temporally) neighbouring block, out of a set of candidate spatially or temporally neighbouring blocks. If merge mode is used, one candidate is selected with a 'merge index', also decoded from the bitstream 133. A similar decoding is performed if 'motion vector prediction' is used, whereby one out of several possible candidate motion vectors is signalled as a predictor by a flag in the bitstream. Control in the processor 205 progresses from step 1730 to a decode motion vector delta step 1740.

At the decode motion vector delta step 1740 the entropy decoder 420, under execution of the processor 205, decodes a motion vector delta from the bitstream 133. The step 1740 is performed when motion vector prediction is used for the CU. The motion vector delta specifies a delta between a motion vector predictor encoded at the step 1730 and the motion vector to be used for motion compensation. Control in the processor 205 progresses from step 1740 to a coded residual test step 1760. If motion vector prediction is not used for the CU the step 1740 is not implemented and control in the processor 205 progresses directly to step 1760.

At the decode intra sub partitions mode step 1750 the entropy decoder 420, under execution of the processor 205, decodes a decision of whether or not to use intra sub partitions from the bitstream 133 using a context-coded "intra_subpartitions_mode_flag" syntax element. Intra sub partitions are available to the luma channel when the luma CB size is larger than the minimum luma transform block size, that is, larger than 16 luma samples. Intra sub partitions divide a coding unit into multiple luma transform blocks as shown in the collection 1500. If the luma CB is partitioned into multiple TBs, an "intra_subpartitions_split_flag" signals whether the division of the luma CB into multiple luma TBs occurs horizontally or vertically. Collectively, "intra_subpartitions_mode_flag" and "intra_subpartitions_split_flag" encode three possible partitions, enumerated as "ISP_NO_SPLIT", "ISP_HOR_SPLIT", and "ISP_VER_SPLIT". Control in the processor 205 progresses from step 1750 to the coded residual test step 1760.

At the coded residual test step 1760 the processor 205 determines if at least one residual coefficient in any transform block of the coding block is significant. The determination includes all luma TBs resulting from application of intra sub partitions and the pair of chroma TBs associated with the two chroma channels. The entropy encoder 420, under execution of the processor 205, arithmetically decodes a 'cu_cbf' syntax element and the processor 205 determines if at least one residual coefficient in any of the TBs of the CU are significant. If at least one residual coefficient in any of the luma and chroma TBs is significant, the step 1760 returns "YES" and control in the processor 205 progresses to a determine luma coefficient group size step 1770. If no significant residual coefficients are present in any TB of the CU, as indicated by a 'zero' being arithmetically decoded for cu_cbf, the step 1760 returns "NO" and the method 1700 terminates, with the processor 205 progressing to the next CU in the CTU.

At the determine luma coefficient group size step 1770 the processor 205 determines a coefficient group size for the one or more luma transform blocks associated with the CU. The determination of the step 1770 operates in the same manner as the determination of the step 1670. Control in the processor 205 progresses from step 1770 to a decode luma TBs step 1780.

At the decode luma TBs step 1780 the entropy decoder 420, under execution of the processor 205, decodes the residual coefficients of the one or more luma TBs of the CU from the bitstream 133. The determined coefficient group size of the step 1770 is used for each luma TB. For each luma TB, a coded block flag is decoded from the bitstream 133 indicating the presence of at least one significant coefficient in the luma TB. If at least one significant coefficient is present in the luma TB then a last significant position is decoded from the bitstream. The last significant position is defined as the last significant coefficient along a scan path progressing from the DC (top left) coefficient to the bottom right coefficient of the TB. The scan path is defined as a diagonal scan within a division of the TB into an array of non-overlapping sub-blocks, each sized as the coefficient group size, and occupying the entirety of the TB. The progression from one sub-block to the next in the scan order also follows a diagonal scan. For each coefficient group other than the top-left coefficient group and the coefficient group containing the last significant coefficient, the entropy encoder 338 encodes a 'coded sub block flag'.

The coded sub-block flag indicates the presence of at least one significant residual coefficient in the sub-block. If there are no significant residual coefficients in a sub-block, the diagonal scan of residual coefficients in the TB skips that sub-block. If there is at least one significant residual coefficient in a sub-block then all locations within that sub-block are scanned and magnitude of each residual coefficient is encoded, and sign of each significant residual coefficient is encoded. Control in the processor 205 progresses from step 1780 to a determine chroma coefficient group size step 1790.

At the determine chroma coefficient group size step 1790 the processor 205 determines a coefficient group size for the pair of chroma transform blocks associated with the CU. The determination made in the step 1790 operates in the same manner as the determination made in the step 1690.

Similarly to step 1690, the coefficient group size is determined at step 1790 based on the transform block size and not further differentiated between luma and chroma channels. The coefficient group size is accordingly determined independently of whether the chroma format is 4:2:2 or 4:2:0 or the corresponding sub sampling in each colour plane. As described in relation to Table 1 the coefficient group size is based on a largest area of the TB being up to 16 samples. Step 1690 operates to determine the coefficient group size for a TB irrespective of the colour plane (Cb or Cr) of the transform block. Control in the processor 205 progresses from step 1790 to a decode chroma TBs step 17100.

At the decode chroma TBs step 17100 the entropy decoder 420, under execution of the processor 205, decodes the residual coefficients of the pair of chroma TBs of the CU from the bitstream 133. The determined coefficient group size of the step 1790 is used for the pair of chroma TBs. For each chroma TB, a coded block flag is decoded from the bitstream 133 indicating the presence of at least one significant coefficient in the chroma TB. The remainder of the decoding process for each chroma TB operates in the same manner as for luma TBs, as described with reference to the step 1780. The method 1700 terminates upon execution of step 17100 and control in the processor 205 progresses to the next CU of the CTU.

Table 3 shows coding performance results obtained under the JVET 'common test conditions' (CTC)—'All Intra Main 10' configuration when using Table 1. The results of Table 3 were obtained with the 'VVC Test Model' (VTM) software implementing the methods 1600 and 1700 compared against a baseline VTM-4.0 that does not implement the methods 1600 and 1700. Overall, there is no coding impact from the change, and even some small gain is seen in the chroma channels, demonstrating simplifying the transform block size to coefficient group size mapping table is not detrimental to coding performance.

The video encoder 115 and the video decoder 134, using the methods 1600 and 1700 respectively, achieve a memory reduction in the residual encoding/decoding process by harmonising the coefficient group size of luma TBs and chroma TBs. As a consequence, chroma TBs have access to coefficient group sizes such as 2×8, 8×2, 2×4, 4×2 instead of only 2×2 and 4×4. For luma TBs, sizes of 16×1 and 1×16 are possible when intra sub-partitions are used. Although the sizes 16×1 and 1×16 are available to chroma by virtue of their presence in Table 1, the minimum width and height of chroma blocks is two samples and so the sizes 16×1 and 1×16 are not used in chroma TBs. As residual encoding and decoding is part of a feedback loop in the design, the memory reduction corresponds with an improvement in, for example, cache performance in software implementations or critical path reduction in hardware implementations.

TABLE 1

Transform block size to coefficient group mapping table for luma and chroma channels (having the same sized coefficient groups for TBs irrespective of the TB being for a luma channel or a chroma channel)

```
uint32_t g_log2SbbSize[MAX_CU_DEPTH + 1][MAX_CU_DEPTH + 1][2] =
// ==== luma/chroma ====
{
  { { 0, 0 },{ 0, 1 },{ 0, 2 }, { 0, 3 }, { 0, 4 }, { 0, 4 },{ 0, 4 }, { 0, 4 } },
  { { 1, 0 },{ 1, 1 },{ 1, 2 }, { 1, 3 }, { 1, 3 }, { 1, 3 },{ 1, 3 }, { 1, 3 } },
  { { 2, 0 },{ 2, 1 },{ 2, 2 }, { 2, 2 }, { 2, 2 }, { 2, 2 },{ 2, 2 }, { 2, 2 } },
  { { 3, 0 },{ 3, 1 },{ 2, 2 }, { 2, 2 }, { 2, 2 }, { 2, 2 },{ 2, 2 }, { 2, 2 } },
  { { 4, 0 },{ 3, 1 },{ 2, 2 }, { 2, 2 }, { 2, 2 }, { 2, 2 },{ 2, 2 }, { 2, 2 } },
  { { 4, 0 },{ 3, 1 },{ 2, 2 }, { 2, 2 }, { 2, 2 }, { 2, 2 },{ 2, 2 }, { 2, 2 } },
  { { 4, 0 },{ 3, 1 },{ 2, 2 }, { 2, 2 }, { 2, 2 }, { 2, 2 },{ 2, 2 }, { 2, 2 } },
  { { 4, 0 },{ 3, 1 },{ 2, 2 }, { 2, 2 }, { 2, 2 }, { 2, 2 },{ 2, 2 }, { 2, 2 } }
};
```

TABLE 2

Conventional mapping of transform block size to coefficient group size for luma and chroma channels (having different coefficient group sizes for the same size TB in luma vs chroma)

```
uint32_t g_log2SbbSize[2][MAX_CU_DEPTH+1][MAX_CU_DEPTH+1]
[2] =
{
  //==== luma ====
  {
    { {0, 0}, {0, 1}, {0, 2}, {0, 3}, {0, 4}, {0, 4}, {0, 4}, {0, 4} },
    { {1, 0}, {1, 1}, {1 ,2}, {1, 3}, {1, 3}, {1, 3}, {1, 3}, {1, 3} },
    { {2, 0}, {2, 1}, {2, 2}, {2, 2}, {2, 2}, {2, 2}, {2, 2}, {2, 2} },
    { {3, 0}, {3, 1}, {2, 2}, {2, 2}, {2, 2}, {2, 2}, {2, 2}, {2, 2} },
    { {4, 0}, {3, 1}, {2, 2}, {2, 2}, {2, 2}, {2, 2}, {2, 2}, {2, 2} },
    { {4, 0}, {3, 1}, {2, 2}, {2, 2}, {2, 2}, {2, 2}, {2, 2}, {2, 2} },
    { {4, 0}, {3, 1}, {2, 2}, {2, 2}, {2, 2}, {2, 2}, {2, 2}, {2, 2} },
    { {4, 0}, {3, 1}, {2, 2}, {2, 2}, {2, 2}, {2, 2}, {2, 2}, {2, 2} }
  },
  //==== chroma ====
  {
    { {0, 0}, {0, 0}, {0, 0}, {0, 0}, {0, 0}, {0, 0}, {0, 0}, {0, 0} },
    { {0, 0}, {1, 1}, {1, 1}, {1, 1}, {1, 1}, {1, 1}, {1, 1}, {1, 1} },
    { {0, 0}, {1, 1}, {2, 2}, {2, 2}, {2, 2}, {2, 2}, {2, 2}, {2, 2} },
    { {0, 0}, {1, 1}, {2, 2}, {2, 2}, {2, 2}, {2, 2}, {2, 2}, {2, 2} },
    { {0, 0}, {1, 1}, {2, 2}, {2, 2}, {2, 2}, {2, 2}, {2, 2}, {2, 2} },
    { {0, 0}, {1, 1}, {2, 2}, {2, 2}, {2, 2}, {2, 2}, {2, 2}, {2, 2} },
    { {0, 0}, {1, 1}, {2, 2}, {2, 2}, {2, 2}, {2, 2}, {2, 2}, {2, 2} },
    { {0, 0}, {1, 1}, {2, 2}, {2, 2}, {2, 2}, {2, 2}, {2, 2}, {2, 2} }
  },
};
```

TABLE 3

Coding performance resulting from having the same sized coefficient groups for TBs irrespective of the TB being for a luma channel or a chroma channel.

| | All Intra Main10 Over VTM-4.0 | | | | |
|---|---|---|---|---|---|
| | Y | U | V | EncT | DecT |
| Class A1 | −0.01% | −0.03% | 0.00% | 97% | 97% |
| Class A2 | −0.02% | 0.05% | −0.04% | 95% | 91% |
| Class B | 0.00% | −0.02% | −0.03% | 95% | 93% |
| Class C | 0.01% | −0.16% | −0.03% | 97% | 94% |
| Class E | 0.00% | −0.01% | −0.14% | 97% | 95% |
| Overall | 0.00% | −0.04% | −0.05% | 96% | 94% |
| Class D | 0.01% | −0.06% | −0.23% | 97% | 91% |
| Class F | 0.01% | −0.07% | −0.13% | 97% | 94% |

INDUSTRIAL APPLICABILITY

The arrangements described are applicable to the computer and data processing industries and particularly for the digital signal processing for the encoding a decoding of signals such as video and image signals, achieving high compression efficiency.

In contract to HEVC, VVC systems allow use of separate coding trees for luma and chroma channels for increased flexibility. However, as discussed above, a resultant issue can occur due use of smaller chroma blocks affecting throughput. The arrangements described herein determine appropriate rules as each coding tree unit is processed to assist in avoiding throughput issues. Additionally, as described above, the arrangements described can assist in providing improved efficiency and accuracy of arithmetic coding of context coded bins used to describe each coding trees, given the rules for avoiding throughput issues.

The foregoing describes only some embodiments of the present invention, and modifications and/or changes can be made thereto without departing from the scope and spirit of the invention, the embodiments being illustrative and not restrictive.

The invention claimed is:

1. A method of decoding, from a bitstream, a transform block of an image frame, the method comprising:
determining a chroma format of the image frame from a plurality of chroma formats including a 4:2:0 chroma format and a 4:2:2 chroma format;
splitting a coding tree unit into one or more coding units each of which includes a luma coding block and a chroma coding block;
determining a sub-block of the transform block which is a luma transform block for a luma coding block or a chroma transform block for a chroma coding block; and
decoding the transform block, from the bitstream, using the sub-block,
wherein in a case where a block size of a chroma coding block of a given coding unit including a luma coding block and the chroma coding block in the coding tree unit having the 4:2:0 chroma format is 8×2, a vertical ternary split is not allowed for the chroma coding block in the given coding unit even if a vertical ternary split for the luma coding block in the given coding unit is performed,
wherein in a case where the luma coding block in the given coding unit is split by a vertical ternary split and the chroma coding block in the given coding unit is not split by a vertical ternary split, the chroma coding block in the given coding unit is arranged at a position corresponding to three luma coding blocks obtained by a vertical ternary split for the luma coding block in the given coding unit, wherein, the transform block is decoded based on (i) a width and a height of the transform block, and (ii) whether the transform block is the luma transform block or the chroma transform block, and wherein in a case where base-2 log of the width of the transform block is 4 and base-2 log of the height of the transform block is 4, base-2 log of a width of the sub-block of the transform block and base-2 log of a height of the sub-block of the transform block are determined from (i) base-2 log of the width of the transform block and base-2 log of the height of the transform block, and determined independently of both (ii) whether the transform block is the luma transform block or the chroma transform block and (iii) the chroma format of the image frame, when determining base-2 log of the width of the sub-block of the transform block and base-2 log of the height of the sub-block of the transform block.

2. The method according to claim 1, wherein in a case where the block size of the chroma coding block of the given coding unit in the coding tree unit having the 4:2:0 chroma format is the predetermined size, a further split for the chroma coding block of the given coding unit is not allowed even if the luma coding block of the given coding unit is split, and wherein in a case where the block size of the chroma coding block of the given coding unit is the predetermined size and a current splitting mode for the given coding unit is a quad split, intra prediction is determined to be used for the chroma coding block of the given coding unit.

3. The method according to claim 1, in a case where base-2 log of the width of the transform block is 4 and base-2 log of the height of the transform block is 4, the determined base-2 log of the width of the sub-block of the transform block is 2 and the determined base-2 log of the height of the sub-block of the transform block is 2.

4. The method according to claim 1, wherein the 8×2 indicates a width of 8 and a height of 2.

5. An apparatus for decoding, from a bitstream, a transform block of an image frame, the apparatus comprising:

a first determining unit configured to determine a chroma format of the image frame from a plurality of chroma formats including a 4:2:0 chroma format and a 4:2:2 chroma format;

a splitting unit configured to split a coding tree unit into one or more coding units each of which includes a luma coding block and a chroma coding block;

a second determining unit configured to determine a sub-block of the transform block which is a luma transform block for a luma coding block or a chroma transform block for a chroma coding block; and a decoding unit configured to decode the transform block, from the bitstream, using the sub-block, wherein in a case where a block size of a chroma coding block of a given coding unit including a luma coding block and the chroma coding block in the coding tree unit having the 4:2:0 chroma format is 8×2, a vertical ternary split is not allowed for the chroma coding block in the given coding unit even if a vertical ternary split for the luma coding block in the given coding unit is performed, wherein in a case where the luma coding block in the given coding unit is split by a vertical ternary split and the chroma coding block in the given coding unit is not split by a vertical ternary split, the chroma coding block in the given coding unit is arranged at a position corresponding to three luma coding blocks obtained by a vertical ternary split for the luma coding block in the given coding unit, wherein, the transform block is decoded based on (i) a width and a height of the transform block, and (ii) whether the transform block is the luma transform block or the chroma transform block, and wherein in a case where base-2 log of the width of the transform block is 4 and base-2 log of the height of the transform block is 4, base-2 log of a width of the sub-block of the transform block and base-2 log of a height of the sub-block of the transform block are determined from (i) base-2 log of the width of the transform block and base-2 log of the height of the transform block, and determined independently of both (ii) whether the transform block is the luma transform block or the chroma transform block and (iii) the chroma format of the image frame, when determining base-2 log of the width of the sub-block of the transform block and base-2 log of the height of the sub-block of the transform block.

6. A method of encoding, into a bitstream, a transform block of an image frame, the method comprising:

determining a chroma format of the image frame from a plurality of chroma formats including a 4:2:0 chroma format and a 4:2:2 chroma format;

splitting a coding tree unit into one or more coding units each of which includes a luma coding block and a chroma coding block;

determining a sub-block of the transform block which is a luma transform block for a luma coding block or a chroma transform block for a chroma coding block; and encoding the transform block, into the bitstream, using the sub-block, wherein in a case where a block size of a chroma coding block of a given coding unit including a luma coding block and the chroma coding block in the coding tree unit having the 4:2:0 chroma format is 8×2, a vertical ternary split is not allowed for the chroma coding block in the given coding unit even if a vertical ternary split for the luma coding block in the given coding unit is performed, wherein in a case where the luma coding block in the given coding unit is split by a vertical ternary split and the chroma coding block in the given coding unit is not split by a vertical ternary split, the chroma coding block in the given coding unit is arranged at a position corresponding to three luma coding blocks obtained by a vertical ternary split for the luma coding block in the given coding unit, wherein, the transform block is encoded based on (i) a width and a height of the transform block, and (ii) whether the transform block is the luma transform block or the chroma transform block, and wherein in a case where base-2 log of the width of the transform block is 4 and base-2 log of the height of the transform block is 4, base-2 log of a width of the sub-block of the transform block and base-2 log of a height of the sub-block of the transform block are determined from (i) base-2 log of the width of the transform block and base-2 log of the height of the transform block, and determined independently of both (ii) whether the transform block is the luma transform block or the chroma transform block and (iii) the chroma format of the image frame, when determining base-2 log of the width of the sub-block of the transform block and base-2 log of the height of the sub-block of the transform block.

7. The method according to claim 6,
wherein in a case where the block size of the chroma coding block of the given coding unit in the coding tree unit having the 4:2:0 chroma format is the predetermined size, a further split for the chroma coding block of the given coding unit is not allowed even if the luma coding block of the given coding unit is split, and
wherein in a case where the block size of the chroma coding block of the given coding unit is the predetermined size and a current splitting mode for the given coding unit is a quad split, intra prediction is determined to be used for the chroma coding block of the given coding unit.

8. The method according to claim 6, in a case where base-2 log of the width of the transform block is 4 and base-2 log of the height of the transform block is 4, the determined base-2 log of the width of the sub-block of the transform block is 2 and the determined base-2 log of the height of the sub-block of the transform block is 2.

9. The method according to claim 6, wherein the 8×2 indicates a width of 8 and a height of 2.

10. An apparatus for encoding, into a bitstream, a transform block of an image frame, the apparatus comprising:
a first determining unit configured to determine a chroma format of the image frame from a plurality of chroma formats including a 4:2:0 chroma format and a 4:2:2 chroma format;
a splitting unit configured to split a coding tree unit into one or more coding units each of which includes a luma coding block and a chroma coding block;
a second determining unit configured to determine a sub-block of the transform block which is a luma transform block for a luma coding block or a chroma transform block for a chroma coding block; and
an encoding unit configured to encode the transform block, into the bitstream, using the sub-block,
wherein in a case where a block size of a chroma coding block of a given coding unit including a luma coding block and the chroma coding block in the coding tree unit having the 4:2:0 chroma format is 8×2, a vertical ternary split is not allowed for the chroma coding block in the given coding unit even if a vertical ternary split for the luma coding block in the given coding unit is performed,
wherein in a case where the luma coding block in the given coding unit is split by a vertical ternary split and the chroma coding block in the given coding unit is not split by a vertical ternary split, the chroma coding block in the given coding unit is arranged at a position corresponding to three luma coding blocks obtained by a vertical ternary split for the luma coding block in the given coding unit,
wherein, the transform block is encoded based on (i) a width and a height of the transform block, and (ii) whether the transform block is the luma transform block or the chroma transform block, and
wherein in a case where base-2 log of the width of the transform block is 4 and base-2 log of the height of the transform block is 4, base-2 log of a width of the sub-block of the transform block and base-2 log of a height of the sub-block of the transform block are determined from (i) base-2 log of the width of the transform block and base-2 log of the height of the transform block, and determined independently of both (ii) whether the transform block is the luma transform block or the chroma transform block and (iii) the chroma format of the image frame, when determining base-2 log of the width of the sub-block of the transform block and base-2 log of the height of the sub-block of the transform block.

* * * * *